US011027781B2

United States Patent
Otsuka

(10) Patent No.: US 11,027,781 B2
(45) Date of Patent: Jun. 8, 2021

(54) HOT-STAMPING FORMED ARTICLE, STRUCTURAL MEMBER USING THE SAME, AND MANUFACTURING METHOD OF HOT-STAMPING FORMED ARTICLE

(71) Applicant: NIPPON STEEL & SUMITOMO METAL CORPORATION, Tokyo (JP)

(72) Inventor: Kenichiro Otsuka, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 356 days.

(21) Appl. No.: 16/315,959

(22) PCT Filed: Jul. 13, 2017

(86) PCT No.: PCT/JP2017/025605
§ 371 (c)(1),
(2) Date: Jan. 7, 2019

(87) PCT Pub. No.: WO2018/012603
PCT Pub. Date: Jan. 18, 2018

(65) Prior Publication Data
US 2019/0300060 A1 Oct. 3, 2019

(30) Foreign Application Priority Data

Jul. 13, 2016 (JP) .............................. JP2016-138963
Apr. 10, 2017 (JP) .............................. JP2017-077286

(51) Int. Cl.
*B60R 19/34* (2006.01)
*B62D 25/04* (2006.01)
(Continued)

(52) U.S. Cl.
CPC .......... *B62D 25/04* (2013.01); *B21D 22/022* (2013.01); *B21D 22/20* (2013.01); *B21D 22/26* (2013.01);
(Continued)

(58) Field of Classification Search
CPC . H01L 2924/00014; H01L 2224/48247; H01L 2924/00; H01L 2224/48091;
(Continued)

(56) References Cited

U.S. PATENT DOCUMENTS 3,827,740 A * 8/1974 Golze ..................... B60R 19/18
293/120
4,796,946 A * 1/1989 Wilson ................... B60J 5/0444
148/333

(Continued)

FOREIGN PATENT DOCUMENTS

CN 87103856 A 12/1987
CN 103085293 A 5/2013
(Continued)

OTHER PUBLICATIONS

Russian Office Action and Search Report for corresponding Russian Application No. 2019101909/02, dated Sep. 19, 2019, with English translation.
(Continued)

*Primary Examiner* — Kiran B Patel
(74) *Attorney, Agent, or Firm* — Birch, Stewart, Kolasch & Birch, LLP

(57) ABSTRACT

The present invention provides a hot-stamping formed article which is long and formed of a single steel sheet, the hot-stamping formed article including: two standing wall portions; a top sheet portion adjacent to the two standing wall portions; and a protrusion portion including an overlapping portion in which a portion of the steel sheet extending from at least one standing wall portion of the two standing wall portions and a portion of the steel sheet extending from the top sheet portion overlap, in which an angle between the top sheet portion and the protrusion portion in a case where a plane perpendicular to a longitu-
(Continued)

dinal direction of the hot-stamping formed article is viewed in a cross section is larger than 90°.

5 Claims, 28 Drawing Sheets

(51) Int. Cl.

| | | |
|---|---|---|
| *B21D 22/02* | (2006.01) | |
| *B21D 47/01* | (2006.01) | |
| *B21D 53/88* | (2006.01) | |
| *B60R 19/02* | (2006.01) | |
| *B62D 21/15* | (2006.01) | |
| *B62D 25/06* | (2006.01) | |
| *B62D 25/20* | (2006.01) | |
| *B21D 37/08* | (2006.01) | |
| *B21D 22/20* | (2006.01) | |
| *B21D 24/00* | (2006.01) | |
| *B21D 22/26* | (2006.01) | |

(52) U.S. Cl.
CPC ............ *B21D 24/00* (2013.01); *B21D 37/08* (2013.01); *B21D 47/01* (2013.01); *B21D 53/88* (2013.01); *B60R 19/023* (2013.01); *B62D 21/157* (2013.01); *B62D 25/06* (2013.01); *B62D 25/20* (2013.01)

(58) Field of Classification Search
CPC . H01L 2224/45144; H01L 2924/00015; H01L 2224/48463; B29C 66/71
See application file for complete search history.

(56) References Cited

U.S. PATENT DOCUMENTS

| | | | | |
|---|---|---|---|---|
| 5,080,427 A * | 1/1992 | Sturrus | ................. | B60J 5/0444 |
| | | | | 296/146.6 |
| 5,154,462 A * | 10/1992 | Carpenter | ............. | B29C 66/547 |
| | | | | 293/120 |
| 5,214,436 A * | 5/1993 | Hannan | ................. | H01Q 1/283 |
| | | | | 343/705 |
| 6,082,958 A * | 7/2000 | Jensen | ................. | B60P 1/4414 |
| | | | | 414/557 |
| 6,092,864 A * | 7/2000 | Wycech | ................ | B29C 44/188 |
| | | | | 296/187.02 |
| 6,341,467 B1 * | 1/2002 | Wycech | ................. | B29C 44/18 |
| | | | | 296/193.06 |
| 6,343,820 B1 * | 2/2002 | Pedersen | ................ | B21D 53/88 |
| | | | | 293/102 |
| 6,971,691 B1 * | 12/2005 | Heatherington | ........ | B60R 19/18 |
| | | | | 293/102 |
| 6,986,536 B1 * | 1/2006 | Heatherington | ........ | B60R 19/03 |
| | | | | 293/102 |
| 7,318,873 B2 * | 1/2008 | Czaplicki | ................ | B29C 70/70 |
| | | | | 156/293 |
| 10,464,511 B2 * | 11/2019 | Koga | ...................... | B60R 19/04 |
| 2004/0262931 A1 * | 12/2004 | Roussel | .................. | B60R 19/18 |
| | | | | 293/120 |
| 2013/0095347 A1 | 4/2013 | Kawasaki et al. | | |
| 2013/0106138 A1 | 5/2013 | Brockhoff et al. | | |
| 2015/0007911 A1 | 1/2015 | Murakami et al. | | |
| 2015/0224563 A1 | 8/2015 | Aso et al. | | |
| 2017/0081742 A1 | 3/2017 | Tabata et al. | | |
| 2017/0306437 A1 | 10/2017 | Nakagawa et al. | | |

FOREIGN PATENT DOCUMENTS

| | | |
|---|---|---|
| CN | 104527807 A | 4/2015 |
| CN | 104582870 A | 4/2015 |
| DE | 43 27 393 A1 | 2/1995 |
| DE | 19756459 A1 | 6/1999 |
| JP | 58-209615 A | 12/1983 |
| JP | 59-60019 U | 4/1984 |
| JP | 61-157427 A | 7/1986 |
| JP | 62-194117 U | 12/1987 |
| JP | 9-249155 A | 9/1997 |
| JP | 2001-507647 A | 6/2001 |
| JP | 3452441 B2 | 9/2003 |
| JP | 2008-155749 A | 7/2008 |
| JP | 2008-265609 A | 11/2008 |
| JP | 2010-75935 A | 4/2010 |
| JP | 2010-242168 A | 10/2010 |
| JP | 2011-67841 A | 4/2011 |
| JP | 2011-83807 A | 4/2011 |
| JP | 2012-121377 A | 6/2012 |
| JP | 2013-27894 A | 2/2013 |
| JP | 2013-185246 A | 9/2013 |
| RU | 2057808 C1 | 4/1998 |
| WO | WO 98/21060 A1 | 5/1998 |
| WO | WO 2015/037060 A1 | 3/2015 |
| WO | WO 2015/182591 A1 | 12/2015 |
| WO | WO 2016/063467 A1 | 4/2016 |

OTHER PUBLICATIONS

Chinese Office Action and Search Report for counterpart Chinese Application No. 201780042947.0, dated Oct. 15, 2019, with a partial English translation.
Extended European Search Report for counterpart European Application No. 17827726.5, dated Feb. 19, 2020.
Korean Office Action for counterpart Korean Application No. 10-2019-7002098 dated Feb. 27, 2020, with an English translation.
"Vickers hardness test—Test method", JIS Z 2244, 2009, total 98 pages.
International Search Report for PCT/JP2017/025605 dated Sep. 19, 2017.
Office Action for JP 2017-560345 dated Jul. 24, 2018.
Written Opinion of the International Searching Authority for PCT/JP2017/025605 (PCT/ISA/237) dated Sep. 19, 2017.

* cited by examiner

SAMPLE 1

SAMPLE 2

SAMPLE 3

SAMPLE 1

SAMPLE 2

SAMPLE 3

ANGLE X=105°

ANGLE X=120°

ANGLE X=105°

ANGLE X=120°

HOT-STAMPING FORMED ARTICLE, STRUCTURAL MEMBER USING THE SAME, AND MANUFACTURING METHOD OF HOT-STAMPING FORMED ARTICLE

TECHNICAL FIELD OF THE INVENTION

The present invention relates to a hot-stamping formed article, a structural member using the same, and a manufacturing method of a hot-stamping formed article.

Priority is claimed on Japanese Patent Application No. 2016-138963, filed on Jul. 13, 2016, and Japanese Patent Application No. 2017-077286, filed on Apr. 10, 2017, the contents of which are incorporated herein by reference.

RELATED ART

Structural members (particularly long members) of vehicles are required to have high characteristics in a three-point bending test in order to improve collision safety performance. Therefore, various proposals have hitherto been made.

In the drawings of Patent Document 1 (Japanese Unexamined Patent Application, First Publication No. 2008-265609) and Patent Document 2 (Japanese Unexamined Patent Application, First Publication No. 2008-155749), an impact absorption member including a portion where a steel sheet is folded in three layers is disclosed.

Patent Document 3 (Japanese Unexamined Patent Application, First Publication No. 2010-242168) discloses a method of forming a recessed part in a wall portion of a member having a substantially hat-shaped cross section. In this method, the recessed part is formed by pressing the wall portion with a power supply roller. Therefore, in this method, a portion protruding from the wall portion before forming the recessed part is not formed.

Patent Document 4 (Japanese Unexamined Patent Application, First Publication No. 2011-67841) discloses a hollow column-shaped component in which a connection region between a standing wall portion and a top wall portion extends outward. In order to increase the number of ridges in a cross section, the extending portion is not folded.

Patent Document 5 (Japanese Unexamined Patent Application, First Publication No. 2011-83807) discloses a method of manufacturing a component having a hat-shaped cross section in which a groove-shaped bead portion is formed along a longitudinal direction in a standing wall portion.

Patent Document 6 (Japanese Unexamined Patent Application, First Publication No. 2013-27894) discloses a frame component having a reinforcing portion formed at a connection portion between a top wall portion and a standing wall portion. The reinforcing portion is formed of an overlapping portion rounded in a semi-cylindrical shape ([0015] of the same document).

Patent Document 7 (Japanese Unexamined Patent Application, First Publication No. H9-249155) discloses a joining structural member in which a corner portion is formed in an elliptical concave shape or a convex shape.

PRIOR ART DOCUMENT

Patent Document

[Patent Document 1] Japanese Unexamined Patent Application, First Publication No. 2008-265609

[Patent Document 2] Japanese Unexamined Patent Application, First Publication No. 2008-155749

[Patent Document 3] Japanese Unexamined Patent Application, First Publication No. 2010-242168

[Patent Document 4] Japanese Unexamined Patent Application, First Publication No. 2011-67841

[Patent Document 5] Japanese Unexamined Patent Application, First Publication No. 2011-83807

[Patent Document 6] Japanese Unexamined Patent Application, First Publication No. 2013-27894

[Patent Document 7] Japanese Patent (Granted) Publication No. 3452441

DISCLOSURE OF THE INVENTION

Problems to be Solved by the Invention

In the techniques described in Patent Documents 1 to 7, the improvement in impact characteristics and compression characteristics is achieved compared to a hat-shaped structural member in the related art. However, currently, a structural member capable of further improving collision safety performance is required as a structural member of a vehicle such as a side sill. In other words, a press-formed article having higher strength and higher characteristics in a three-point bending test is required.

One of objects of the present invention made taking the foregoing circumstances into consideration is to provide a hot-stamping formed article having high strength and high characteristics in a three-point bending test, a structural member using the same, and a manufacturing method for manufacturing the hot-stamping formed article.

Means for Solving the Problem (1) According to an aspect of the present invention, a hot-stamping formed article which is long and formed of a single steel sheet, includes: two standing wall portions; a top sheet portion adjacent to the two standing wall portions; and a protrusion portion including an overlapping portion in which a portion of the steel sheet extending from at least one standing wall portion of the two standing wall portions and a portion of the steel sheet extending from the top sheet portion overlap, in which an angle between the top sheet portion and the protrusion portion in a case where a plane perpendicular to a longitudinal direction of the hot-stamping formed article is viewed in a cross section is larger than 90°.

The hot-stamping formed article having the above configuration has high strength and high characteristics in a three-point bending test.

(2) In the hot-stamping formed article according to (1), the portion of the steel sheet extending from the standing wall portion and the portion of the steel sheet extending from the top sheet portion may be in close contact with each other in the protrusion portion.

(3) In the hot-stamping formed article according to (1) or (2), an angle between the top sheet portion and the overlapping portion when viewed in the cross section may be larger than 90° and equal to or less than 180°.

(4) In the hot-stamping formed article according to any one of (1) to (3), a length from a boundary point where lines extending from the standing wall portion and the top sheet portion intersect to a tip end portion of the protrusion portion when viewed in the cross section may be 3 mm or more.

(5) In the hot-stamping formed article according to any one of (1) to (4), the steel sheet extending from the standing wall portion and the steel sheet extending from the top sheet portion may be joined to each other in the protrusion portion.

(6) The hot-stamping formed article according to any one of (1) to (5) may further include: two flange portions extending from end portions of the two standing wall portions.

(7) According to another aspect of the present invention, a structural member includes: the hot-stamping formed article according to any one of (1) to (6); and a steel sheet member fixed to the hot-stamping formed article, in which the hot-stamping formed article and the steel sheet member form a closed cross section when viewed in the cross section.

The structural member having the above configuration has high strength and high characteristics in a three-point bending test.

(8) The structural member according to (7) may further include: an auxiliary member joined to at least one of the two standing wall portions and the top sheet portion or to each of at least one standing wall portion of the two standing wall portions and the top sheet portion.

(9) According to another aspect of the present invention, a manufacturing method of a hot-stamping formed article is a manufacturing method of the hot-stamping formed article according to any one of (1) to (5), the manufacturing method including: a first step of deforming a base steel sheet including two standing wall portion equivalent portions which are to become the two standing wall portions, a top sheet portion equivalent portion which is to become the top sheet portion, and a protrusion portion equivalent portion which is to become the protrusion portion, thereby obtaining a deformed steel sheet in a state where the two standing wall portion equivalent portions are bent in the same direction with respect to the top sheet portion equivalent portion; and a second step of hot-press-forming the deformed steel sheet, thereby forming the hot-stamping formed article, in which, in the second step, the protrusion portion is formed by overlapping at least a portion of the protrusion portion equivalent portion.

By the manufacturing method of the hot-stamping formed article having the above configuration, it is possible to obtain a hot-stamping formed article having high strength and high characteristics in a three-point bending test.

(10) The manufacturing method according to (9) may further include: a heating step of heating the deformed steel sheet after the first step and before the second step, in which, in the second step, hot-press-forming is performed by a press die including an upper die and a lower die and two cam dies, the lower die has a protrusion, and the method further includes: a step of disposing the protrusion of the lower die and the deformed steel sheet so as not to be brought into contact with each other; (a) a step of pressing the top sheet portion equivalent portion using the upper die and the lower die; and (b) a step of pressing the two standing wall portion equivalent portions using the lower die and the two cam dies.

(11) In the manufacturing method according to (10), the angle between the top sheet portion and the overlapping portion may be larger than 90° and equal to or less than 135°, and in the second step, the step (b) may be completed after the step (a) is completed.

(12) In the manufacturing method according to (10), the angle between the top sheet portion and the overlapping portion may be equal to or more than 135°, and in the second step, the step (a) may be completed after the step (b) is completed.

(13) In the manufacturing method according to any one of (9) to (12), the hot-stamping formed article may include two flange portions extending from end portions of the two standing wall portions.

(14) In the manufacturing method according to (9), the hot-stamping formed article may include two flange portions extending from end portions of the two standing wall portions, the deformed steel sheet may further include two flange portion equivalent portions which protrude from the two standing wall portion equivalent portions and are to become the two flange portions, the first step and the second step may be performed by using a pressing apparatus including an upper die, a lower die, and two movable dies which are movable in a vertical direction and a horizontal direction, the lower die may include a punch die and two movable plates which are disposed with the punch die interposed therebetween and are movable at least in the vertical direction, the method may further include: a step of heating the base steel sheet before the first step, the first step may include (Ia) a step of disposing the base steel sheet between the upper die, the two movable dies, and the lower die in a state where the punch die and the base steel sheet are not in contact with each other, and (Ib) a step of lowering the two movable dies together with the two movable plates and moving the two movable dies toward the punch die, thereby obtaining the deformed steel sheet in a state where the two flange portion equivalent portions are interposed between the two movable dies and the two movable plates, in this order, and the second step may include (IIa) a step of further moving the two movable dies toward the punch die, thereby restraining the two standing wall portion equivalent portions by the two movable dies and side surface portions of the punch die while a state where an upper surface portion of the punch die and the deformed steel sheet are not in contact with each other is maintained, and (IIb) a step of pressing the top sheet portion equivalent portion against the upper die and the punch die by lowering the upper die, and overlapping at least a portion of the protrusion portion equivalent portion between the upper die and the movable dies, thereby forming the hot-stamping formed article, in this order.

(15) In the manufacturing method according to (9), the first step and the second step may be performed by using a pressing apparatus including an upper die, a lower die, and two movable dies which are movable in a vertical direction and a horizontal direction, the lower die may include a punch die and two movable plates which are disposed with the punch die interposed therebetween and are movable at least in the vertical direction, the method may further include: a step of heating the base steel sheet before the first step, the first step may include (Ia) a step of disposing the base steel sheet between the upper die, the two movable dies, and the lower die in a state where the punch die and the base steel sheet are not in contact with each other, and (Ib) a step of lowering the two movable dies together with the two movable plates and moving the two movable dies toward the punch die to cause an end portion of the base steel sheet to approach the punch die, thereby obtaining the deformed steel sheet, in this order, and the second step may include (IIa) a step of further moving the two movable dies toward the punch die, thereby restraining the two standing wall portion equivalent portions by the two movable dies and side surface portions of the punch die while a state where an upper surface portion of the punch die and the deformed steel sheet are not in contact with each other is maintained, and (IIb) a step of pressing the top sheet portion equivalent portion against the upper die and the punch die by lowering the upper die, and overlapping at least a portion of the protrusion portion equivalent portion between the upper die and the movable dies, thereby forming the hot-stamping formed article, in this order.

(16) In the manufacturing method according to (14) or (15), may further include: after the second step, a step of separating the hot-stamping formed article from the punch die by raising the movable plates in a state where the flange portions or the end portions of the standing wall portions are placed on the movable plates.

Effects of the Invention

According to the present invention, it is possible to obtain a hot-stamping formed article having high strength and high characteristics in a three-point bending test and a structural member using the same. Furthermore, according to the manufacturing method of the present invention, the hot-stamping formed article can be easily manufactured.

EMBODIMENTS OF THE INVENTION

Figure 1:
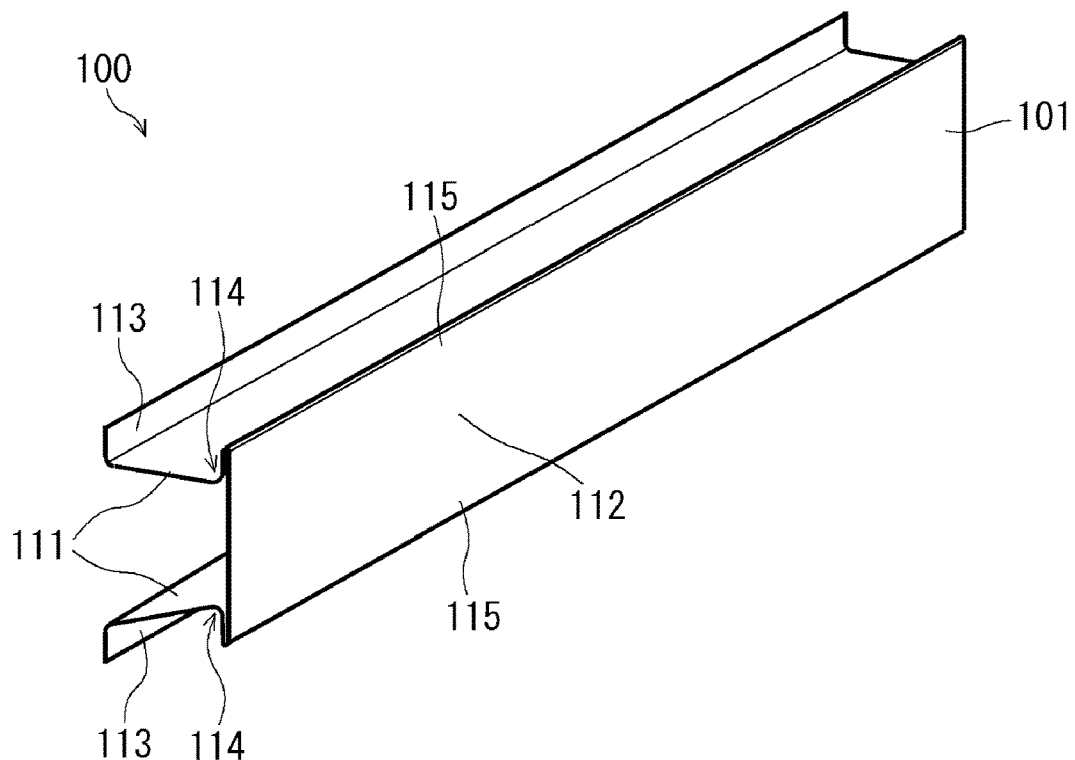
FIG. 1 is a perspective view schematically showing an example of a press-formed article of an embodiment.

The inventors intensively studied to obtain a hot-stamping formed article having high strength and high characteristics in a three-point bending test, and as a result, newly found that characteristics against collision are improved by a specific structure. Furthermore, the inventors newly found that by producing such a specific structure with a high strength steel sheet, a hot-stamping formed article having high strength and high characteristics in a three-point bending test is obtained. The present invention is based on the new findings.

Hereinafter, embodiments of the present invention will be described. In the following description, the embodiments of the present invention are described with reference to examples, but it is apparent that the present invention is not limited to the examples described below.

In the following description, specific numerical values and materials are exemplified sometimes, but other numerical values and materials can also be applied as long as the effect of the present invention can be obtained.

[Hot-Stamping Formed Article]

Hereinafter, a hot-stamping formed article according to the present invention will be described. In the following description, the hot-stamping formed article is referred to as a "press-formed article" or "press-formed article (P)" for description in some cases.

The press-formed article in the following embodiment is a press-formed article formed of a single steel sheet including two standing wall portions and a top sheet portion adjacent to the two standing wall portions. The press-formed article of the embodiment may have a long shape constituted by long standing wall portions and a long top sheet portion.

The press-formed article (P) has a protrusion portion in which a portion of the steel sheet extending from at least one standing wall portion of the two standing wall portions and a portion of the steel sheet extending from the top sheet portion overlap. In the protrusion portion, in a case where a plane perpendicular to the longitudinal direction of the long press-formed article is viewed in a cross section, the angle between the top sheet portion and the protrusion portion is larger than 90°.

There may be cases where the angle between the top sheet portion and the overlapping portion is hereinafter referred to as "angle X". Details of the angle X are described in a first embodiment. In a case where a portion of the top sheet portion is not in a flat plate shape due to the formation of fine convex and concave portions on the top sheet portion or the like, the angle formed when the entire top sheet portion is regarded as a flat sheet is referred to as the angle of the top sheet portion. However, in a case where large convex and concave portions are formed in a portion of the top sheet portion having a flat plate shape (examples of FIGS. 6E and 6F and the like), the angle of the top sheet portion is determined by using the portion excluding the convex and concave portions as the top sheet portion.

The press-formed article (P) of the following embodiment may include two flange portions extending from the end portions of the two standing wall portions (the end portions on the side opposite to the top sheet portion side).

In at least a portion of the protrusion portion, the portion of the steel sheet extending from the top sheet portion and the portion of the steel sheet extending from the standing wall portion overlap to form a double structure. In the following description, the portion of the protrusion portion in which the steel sheet overlaps in the double structure is referred to as "overlapping portion". The overlapping portion has a plate shape as a whole. The steel sheet is folded at the tip end portion of the protrusion portion.

There may be cases where the length from the boundary point to the tip end of the protrusion portion, which is the length of the protrusion portion, is hereinafter referred to as "length D". The length D is the length of the protrusion portion in the cross section perpendicular to the longitudinal direction.

The length of the overlapping portion in the cross section perpendicular to the longitudinal direction is 1 time the length D of the protrusion portion, and may be in a range of 0.1 to 1 times (for example, in a range of 0.5 to 1 times or a range of 0.3 to 0.8 times).

The press-formed article (P) of the following embodiment can be formed by deforming a single steel sheet (base steel sheet). Specifically, the press-formed article (P) can be manufactured by press-forming a single base steel sheet according to a manufacturing method of the following embodiment. The base steel sheet which is the material will be described later.

The press-formed article (P) of the following embodiment has an elongated shape (long shape) as a whole. The standing wall portions, the top sheet portion, the flange portions, and the protrusion portion all extend along the longitudinal direction of the press-formed article.

The protrusion portion may be formed entirely in the longitudinal direction of the press-formed article and may also be formed only partially in the longitudinal direction of the press-formed article.

Hereinafter, the region surrounded by the two standing wall portions, a virtual plane connecting the end portions of the two standing wall portions, and the top sheet portion is referred to as "the inside of the press-formed article (P)", and the region on the side opposite to the inside with the standing wall portions and the top sheet portion interposed therebetween is referred to as "the outside of the press-formed article (P)".

The top sheet portion connects the two standing wall portions. More specifically, the top sheet portion connects the two standing wall portions via the protrusion portion. From another viewpoint, the top sheet portion is a transverse wall portion connecting the two standing wall portions. Therefore, in this specification, it is possible to read the top sheet portion as the transverse wall portion. In a case where the press-formed article is disposed with the transverse wall portion (the top sheet portion) facing downward, the transverse wall portion can also be called a bottom sheet portion. However, in this specification, the transverse wall portion is referred to as the top sheet portion with reference to a case where the transverse wall portion is disposed on the upper side.

In a case where a plane perpendicular to the longitudinal direction of the press-formed article is viewed in a cross section, the angles Y between the top sheet portion and the standing wall portions are usually about 90°. The angle Y will be described in the first embodiment. The angle Y may be less than 90°, but is usually 90° or more or may also be in a range of 90° to 150°. The two angles Y may be different, but are preferably substantially the same (the difference between the two is within 10°) or may be the same.

In the press-formed article (P) of the following embodiment, protrusion portions may protrude from two boundary portions. In this case, a single protrusion portion protrudes from each of the two boundary portions. In the two protrusion portions, the angles X are preferably substantially the same (the difference between the two is within 10°) may be the same. It is preferable that the two protrusion portions are formed so that their shapes have line symmetry in a cross section perpendicular to the longitudinal direction. However, the shapes thereof may not be formed to have line symmetry.

The angle X between the top sheet portion and the protrusion portion may be 95° or more, 105° or more, or 135° or more. The angle X may be 180° or less.

An angle X of 180° means that the top sheet portion and the protrusion portion are parallel. The angle X may be larger than 90° and equal to or less than 180°.

In the press-formed article (P) of the following embodiment, in a case where a plane perpendicular to the longitudinal direction of the press-formed article is viewed in a cross section, in the length of the protrusion portion, the length from the boundary point where lines extending from the standing wall portion and the top sheet portion intersect to the tip end portion of the protrusion portion may be 3 mm or more (for example, 5 mm or more, 10 mm or more, or 15 mm or more). The upper limit of the length is not particularly limited, but may be, for example, 25 mm or less. In a case where the press-formed article (P) includes two protrusion portions, the lengths of the two protrusion portions may be the same or may be different.

In the press-formed article (P) of the following embodiment, in the protrusion portion, a portion of the steel sheet extending from the standing wall portion and a portion of the steel sheet extending from the top sheet portion may be fixed by a joining method, and the joining method may be, for example, welding. For example, the steel sheet which forms a double structure at the overlapping portion may be welded by resistance spot welding or laser welding. In addition, in the root of the protrusion portion (the boundary between the top sheet portion and the standing wall portion, and the protrusion portion), the portion of the steel sheet extending from the standing wall portion and the portion of the steel sheet extending from the top sheet portion may be subjected to arc welding (fillet welding). The joining method may be any of an adhesive, brazing, riveting, bolting, and friction stir welding.

The tensile strength of the steel sheet forming the press-formed article (P) of the following embodiment may be 590 MPa or more, 780 MPa or more, 980 MPa or more, or 1200 MPa or more. The upper limit of the tensile strength of the press-formed article (P) is not particularly limited, but is, for example, 2500 MPa. In a case where a second step of the manufacturing method described later is performed by hot stamping, the tensile strength of the press-formed article (P) can be made higher than the tensile strength of the steel sheet (blank) as a material.

The fact that tensile strength of the press-formed article (P) is not less than the above-mentioned value means, in other words, a metallographic structure in which the martensite structure in the metallographic structure of the press-formed article (P) accounts for 20% or more in terms of volume percentage, and accounts for 90% or more in a case where the tensile strength of the press-formed article (P) is 1310 MPa or more or in a case where hot stamping is performed.

In the press-formed article (P) of the following embodiment, for example, in a case where the tensile strength of the press-formed article (P) is 1500 MPa or more and the martensite structure accounts for 90% or more in terms of volume percentage, the Vickers hardness of the portion of the steel sheet extending from the top sheet portion, that is, the protrusion portion may be 454 or more. Furthermore, the ratio of the Vickers hardness of the protrusion portion to the Vickers hardness of the standing wall portion at this time may be 0.95 or more.

In the press-formed article (P) of the following embodiment, a portion of the steel sheet extending from the standing wall portion and a portion of the steel sheet extending from the top sheet portion may be in close contact with each other in the protrusion portion. Therefore, the protrusion portion is different from the corner portion formed in an elliptical concave shape or a convex shape described in FIGS. 1 and 2 of Patent Document 7.

The structure in which the portion of the steel sheet extending from the standing wall portion and the portion of the steel sheet extending from the top sheet portion are in close contact with each other can be produced by a manufacturing method of a press-formed article according to the present invention, which will be described later.

First Embodiment

Hereinafter, a more specific example of the press-formed article according to the present invention will be described as the first embodiment.

Figure 2:
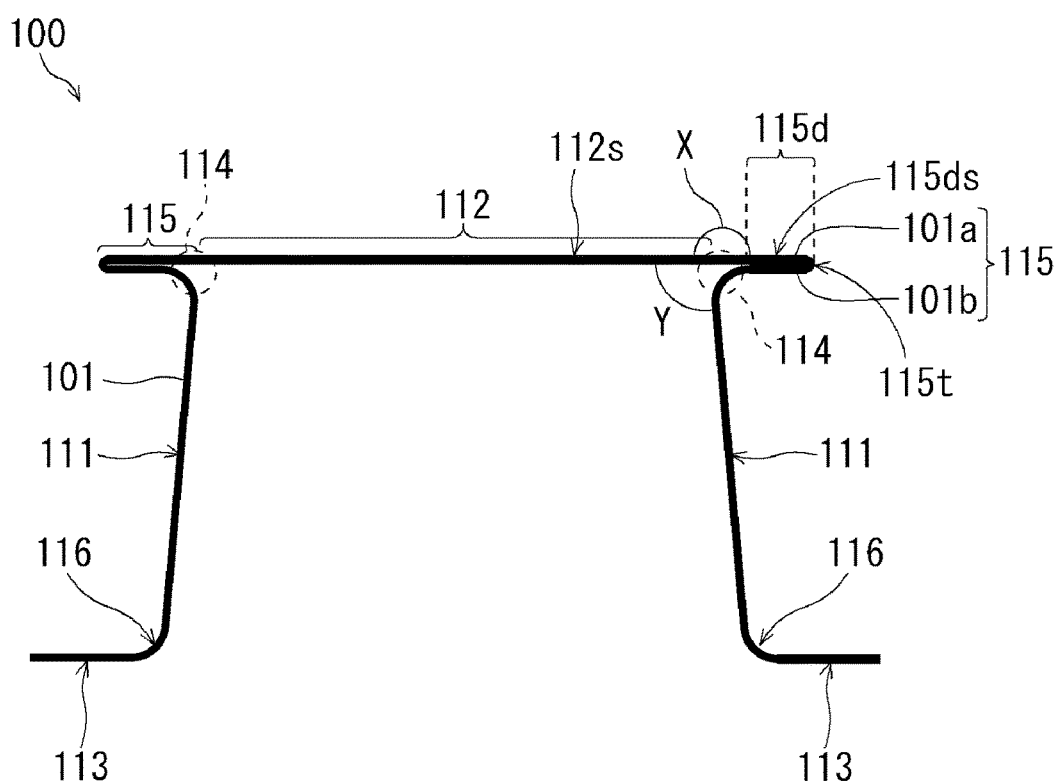
FIG. 2 is a cross-sectional view schematically showing the press-formed article shown in FIG. 1.

A perspective view of a press-formed article 100 (the press-formed article (P)) of the first embodiment is schematically shown in FIG. 1. A cross-sectional view of a plane perpendicular to the longitudinal direction of the press-formed article 100 is schematically shown in FIG. 2. Hereinafter, the upper side (top sheet portion side) in FIG. 2 is referred to as the upper side of the press-formed article (P) of the embodiment, and the lower side (flange portion side) in FIG. 2 is referred to as the lower side of the press-formed article (P) of the embodiment in some cases.

The press-formed article 100 is formed of a single steel sheet 101. In FIGS. 1 and 2, the press-formed article 100 having a long shape includes two standing wall portions 111, a top sheet portion 112, two flange portions 113, and two protrusion portions 115. Each of the standing wall portion 111, the top sheet portion 112, and the flange portion 113 has a long and flat plate shape. The top sheet portion 112 connects the two standing wall portions 111 adjacent to the top sheet portion 112 via the two protrusion portions 115.

In the example shown in FIG. 2, the two flange portions 113 extend substantially horizontally outward from the lower end portions of the two standing wall portions 111. That is, the flange portion 113 is substantially parallel to the top sheet portion 112.

The protrusion portion 115 protrudes outward from a boundary portion 114 of a corner portion connecting the standing wall portion 111 and the top sheet portion 112. An overlapping portion 115*d* is present at least on a tip end portion 115*t* side of the protrusion portion 115. In the overlapping portion 115*d*, a steel sheet 101*a* extending from the top sheet portion 112 (a portion of the steel sheet extending from the top sheet portion 112) and a steel sheet 101*b* extending from the standing wall portion 111 (a portion of the steel sheet extending from the standing wall portion 111) may overlap in close contact with each other.

Each of the steel sheet 101*a* and the steel sheet 101*b* is a portion of the steel sheet 101. The steel sheet (the steel sheet 101*a*) extending from the top sheet portion 112 is bent in the opposite direction at the tip end portion 115*t* and becomes the steel sheet 101*b*. The overlapping portion 115*d* has a flat plate shape as a whole. The cross section of the press-formed article 100 excluding the protrusion portion 115 (cross section perpendicular to the longitudinal direction) has a substantially hat shape.

As shown in FIG. 2, the angle between the top sheet portion 112 and the protrusion portion 115 is referred to as an angle X. More specifically, the angle X means the angle between a plane including an outer surface 112*s* of the top sheet portion 112 and a plane including a surface 115*ds* of the overlapping portion 115*d* which is a portion of the protrusion portion 115 (a surface of the steel sheet 101*a* in the overlapping portion 115*d*).

FIGS. 1 and 2 show the case where the angle X is 180°. In this case, the top sheet portion 112 and the protrusion portion 115 are parallel. In a preferable example of the case where the angle X is 180°, there is no stepped portion between the steel sheet 101*a* extending from the top sheet portion 112 and the top sheet portion 112. From another viewpoint, the state where the angle X is 180° can also be regarded as a state where the angle between the top sheet portion 112 and the protrusion portion 115 is 0°.

Figure 3A:
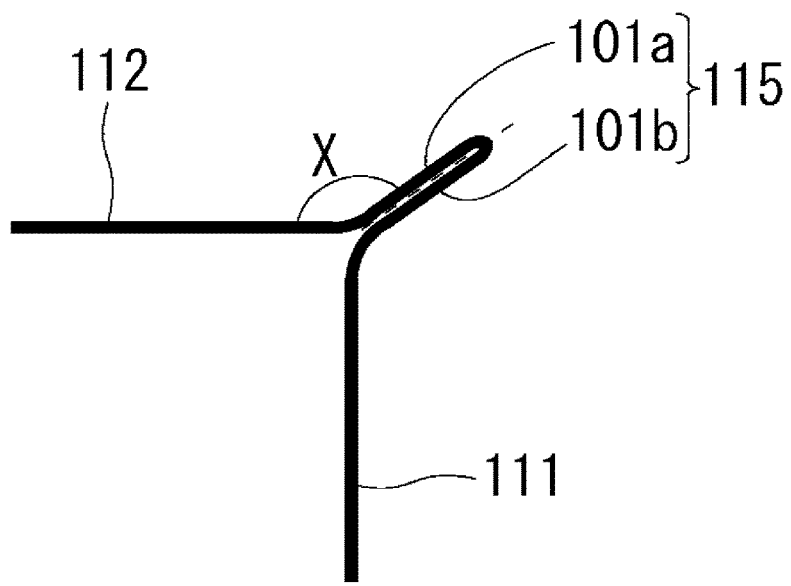
FIG. 3A is a cross-sectional view schematically showing another example of the press-formed article of the embodiment.
Figure 3B:
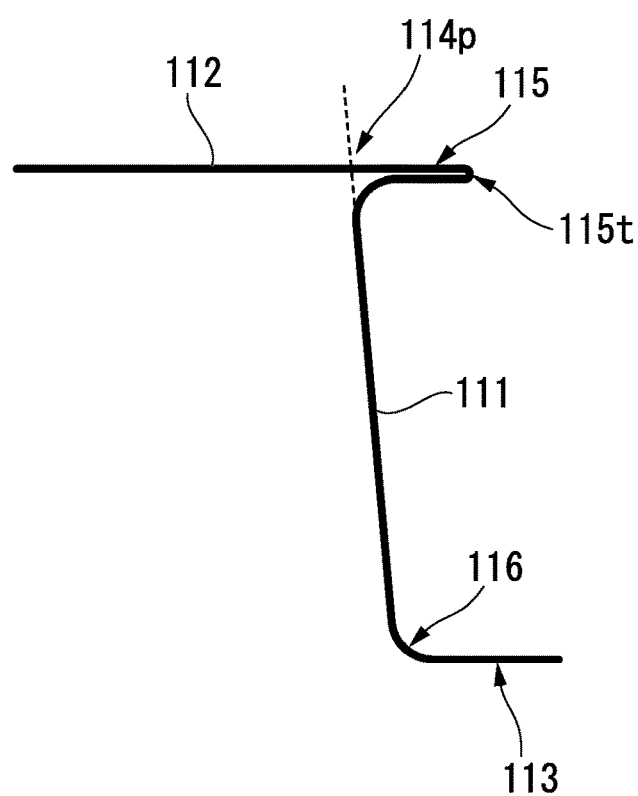
FIG. 3B is a schematic cross-sectional view showing a protrusion portion of the press-formed article of the embodiment.

The angle X may be in the above-mentioned range. A cross-sectional view of an example of a case where the angle X is 145° is shown in FIG. 3.

In a case where the angle X is larger than 90°, when the press-formed article 100 is viewed from above the top sheet portion 112, the steel sheet 101*b* forming the protrusion portion 115 is not seen by the steel sheet 101*a*. Such a portion is sometimes called a negative angle portion. From another viewpoint, the negative angle portion is a portion which has a reverse gradient when press forming is to be performed only with an upper die and a lower die.

In a case where the press-formed article (P) of the embodiment is used as a structural member, there may be cases where the top sheet portion 112 and the flange portion 113 are respectively fixed to portions of other members. In this case, the angle X is preferably 180° in some cases. Since the angle X is 180° and the surface of the top sheet portion 112 and the surface of the protrusion portion 115 are flush with each other, the top sheet portion 112 side is easily fixed to another member in some cases. In addition, when a load is applied from the top sheet portion 112 side, it is easy for the top sheet portion 112 and the protrusion portion 115 to support the load as a whole.

In a case where a plane perpendicular to the longitudinal direction of the press-formed article is viewed in a cross section in the length of the protrusion portion 115, a length D (see FIG. 3B or FIG. 14A) from a boundary point 114*p* where lines extending from the standing wall portion 111 and the top sheet portion 112 intersect to a tip end portion 115*t* of the protrusion portion 115 may be in the above-described range.

The overlapping portion 115*d* is not rounded in a cylindrical shape. Therefore, the protrusion portion 115 is different from the reinforcing portion rounded in the cylindrical shape as described in FIG. 6 of Patent Document 6.

In a region other than the tip end portion 115*t*, a portion of the steel sheet forming the protrusion portion 115 is curved, but is not folded. That is, in the protrusion portion 115 excluding the tip end portion 115*t*, there is no ridge portion protruding toward the outside of the protrusion portion 115. From this viewpoint, the press-formed article 100 is different from the components described in Patent Documents 4 and 5.

Furthermore, in the protrusion portion 115, the two steel sheets (the steel sheet 101*b* which is a portion of the steel sheet extending from the standing wall portion 111 and the steel sheet 101*a* which is a portion of the steel sheet extending from the top sheet portion 112) may be in close contact with each other. With such a configuration, it is possible to further improve the strength of the protrusion portion 115.

FIG. 2 shows an example of a case where the angle Y between the standing wall portion 111 and the top sheet portion 112 is larger than 90°. Here, the angle Y is the angle shown in FIG. 2, that is, the angle between the standing wall portion 111 and the top sheet portion 112 inside the press-formed article 100.

As shown in FIG. 2, it is preferable that a corner portion 116 connecting the standing wall portion 111 and the flange portion 113 has a rounded shape. Since the corner portion 116 has a rounded shape, buckling at the corner portion 116 can be suppressed.

It is preferable that the corner portion at the boundary between the steel sheet 101*b* and standing wall portion 111 in the protrusion portion 115 has a curved surface in a case where the plane perpendicular to the longitudinal direction of the press-formed article is viewed in a cross section. By causing the corner portion to have a curved surface, buckling at the corner portion can be suppressed.

The radius of curvature of the corner portion in the plane perpendicular to the longitudinal direction may be in a range of 0.1 to 1 times the length D (for example, in a range of 0.2 to 0.8 times or a range of 0.2 to 0.5 times). For example, in a case where the angle X is smaller than 180°, the corner portion at the boundary between the steel sheet 101a of the protrusion portion 115 and the top sheet portion 112 may have a curved surface.

Figure 4A:
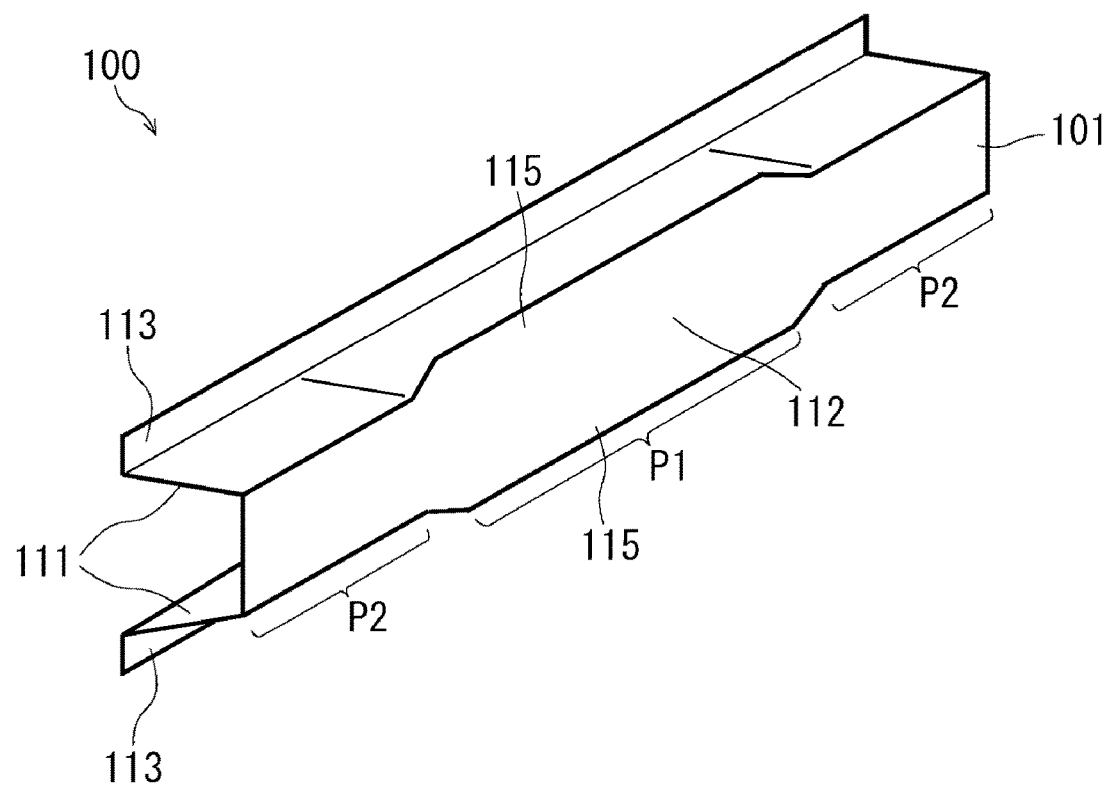
FIG. 4A is a perspective view schematically showing another example of the press-formed article of the embodiment.

Not the entire press-formed article (P) in the longitudinal direction may have the protrusion portion formed therein. A perspective view of an example of the press-formed article (P) which has the protrusion portion formed only partially in the longitudinal direction is schematically shown in FIG. 4A. In the press-formed article 100 in FIG. 4A, the protrusion portion 115 is not formed in regions P2 at both ends in the longitudinal direction, and the protrusion portion 115 is formed in a central region P1 in the longitudinal direction. With such a configuration, in a case where the press-formed article is combined with another member to form a structural member, it is possible to obtain desired collision safety performance without restrictions on the shape of the member.

The press-formed article (P) having the protrusion portion formed only partially in the longitudinal direction as shown in FIG. 4A can be manufactured only by "a manufacturing method by two steps", which will be described later. Alternatively, the press-formed article (P) as shown in FIG. 4A or 4B can be manufactured by joining a press-formed article with no protrusion portion to both ends of a press-formed article in the longitudinal direction, which has a protrusion portion formed entirely in the longitudinal direction, by welding or the like.

Figure 4B:
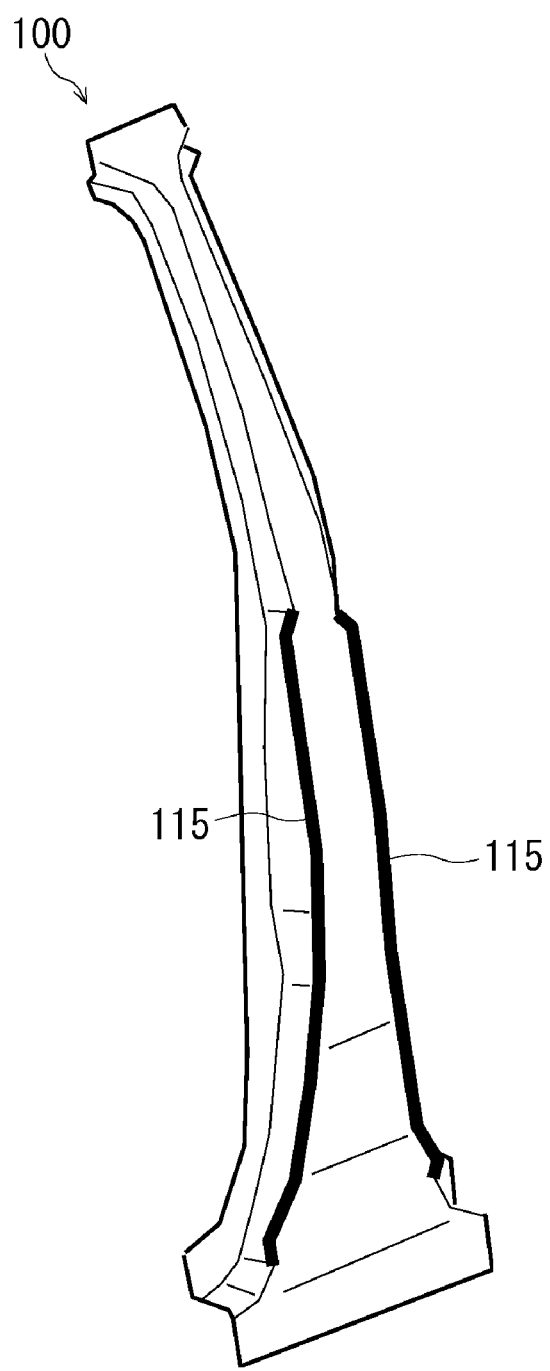
FIG. 4B is a perspective view schematically showing another example of the press-formed article of the embodiment.

A perspective view of an example of another press-formed article (P) which has a protrusion portion formed only partially in a longitudinal direction is schematically shown in FIG. 4B. A press-formed article 100 in FIG. 4B is an example of a center pillar. In FIG. 4B, the outer edges of the protrusion portions 115 are indicated by bold lines. In the press-formed article 100 in FIG. 4B, the protrusion portion 115 is formed only in a partial region in the longitudinal direction, and the protrusion portion 115 is not formed in other regions.

Figure 5:
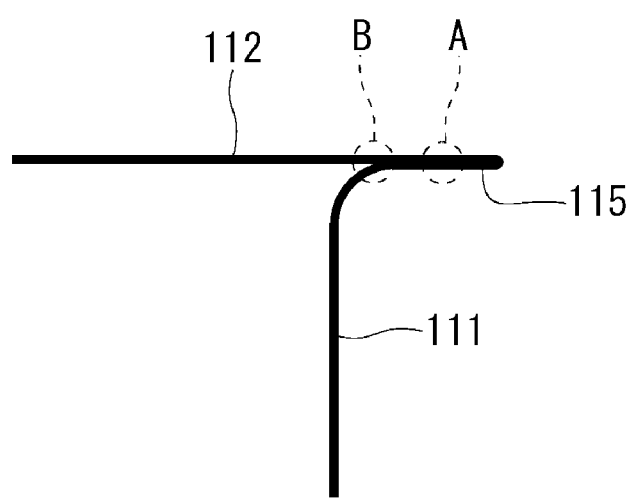
FIG. 5 is a schematic cross-sectional view showing a modification example of the press-formed article of the embodiment.

Steel sheets overlapping in a double structure in the protrusion portion 115 may be joined by welding or the like. For example, a region A and/or a region B shown in FIG. 5 may be welded. A welding method is not particularly limited, but welding of the region A which is not the end portion of the protrusion portion may be resistance spot welding or laser welding. Welding (fillet welding) of the region B at the boundary between the protrusion portion 115 and another portion may be arc welding. The steel sheets may be joined by any of an adhesive, brazing, riveting, bolting, and friction stir welding.

The press-formed article (P) of the embodiment can be sued for various applications. For example, the press-formed article (P) can be used in a structural member of various moving units (vehicles, two-wheeled motor vehicles, railway vehicles, ships, and airplanes) or a structural member of various machines. Examples of the structural member of a vehicle include a side sill, a pillar (a front pillar, a lower front pillar, a center pillar, and the like), a roof rail, a roof arch, a bumper, a beltline reinforcement, and a door impact beam, or may be another structural member.

[Structural Member]

Hereinafter, a structural member using the press-formed article according to the present invention will be described.

The press-formed article (P) according to the present invention can be used as it is as various structural members. Alternatively, the press-formed article (P) according to the present invention can be used in combination with another member (for example, a steel sheet member).

Here, the steel sheet member is a member formed of a steel sheet. A structural member described in the following embodiment includes the press-formed article (P) of the embodiment described above. A structural member for a vehicle described below can be used as a structural member of a product other than a vehicle.

An example of a structural member of the following embodiment may be configured to include the press-formed article (P) of the embodiment described above and a steel sheet member fixed to the press-formed article (P) so as to form a closed cross section with the press-formed article (P). That is, the press-formed article (P) and the steel sheet member may constitute a hollow body.

An example of the structural member of the following embodiment includes the press-formed article (P) of the embodiment described above and a single steel sheet member fixed to the two flange portions of the press-formed article (P). In other words, the steel sheet member is fixed to the two flange portions so as to connect the two flange portions of the press-formed article (P).

Another member may be further fixed to the flange portion. An example of the steel sheet member is the press-formed article (P) of the embodiment described above. In an example of the case, the two press-formed articles (P) which are fixed to each other are fixed so as to face each other so that the insides thereof face each other. The example of the steel sheet member may include a steel sheet (back sheet) and a formed article which is not the press-formed article of the embodiment described above.

In a case where the press-formed article (P) does not include a flange portion, the steel sheet member may be fixed to the standing wall portion of the press-formed article (P) so as to form a closed cross section. For example, a flange portion may be provided at an end portion of the steel sheet member, and the flange portion and the standing wall portion of the press-formed article (P) may be fixed to each other.

A method of fixing the press-formed article (P) and the steel sheet member to each other is not particularly limited, and an appropriate fixing method may be selected depending on the situation. Examples of the fixing method include at least one selected from the group consisting of welding, an adhesive, brazing, riveting, bolting, and friction stir welding. Among these, welding is easy to perform. Examples of the welding include resistance spot welding and laser welding.

Furthermore, in the vehicle component of the present embodiment, only a portion of the flange portion of the press-formed article (P) of the embodiment may be fixed to another steel sheet member. In this case, the other portions of the flange portion are not fixed to the steel sheet member. For example, only the flange portions in the vicinity of both end portions in the longitudinal direction in the flange portions of the press-formed article of the embodiment are fixed to another steel sheet member, and the other flange portions may not be fixed to the steel sheet member.

Second Embodiment

In a second embodiment, an example of a structural member using the press-formed article (P) according to the present invention will be described. FIGS. 6A to 6D are views schematically showing cross sections perpendicular to the longitudinal direction of a structural member 200. The structural member described in the second embodiment can be used in the above-described applications (a vehicle component and other applications).

Figure 6A:
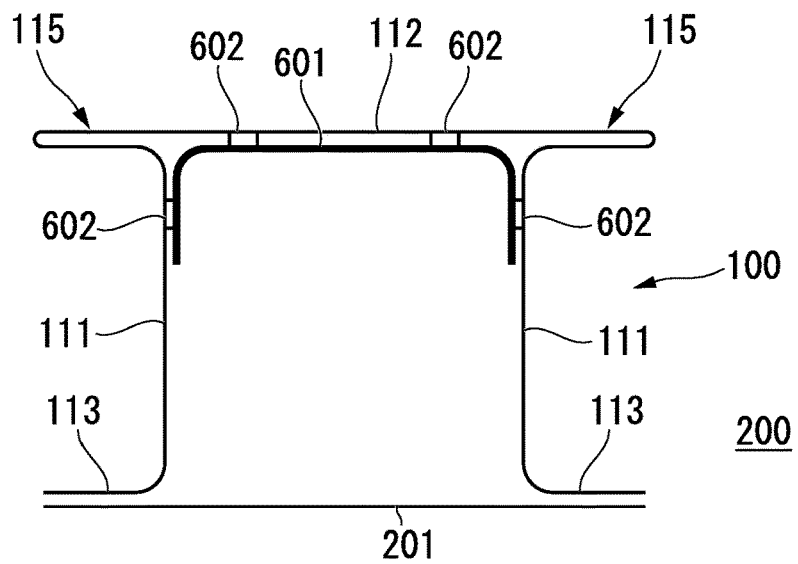
FIG. 6A is a cross-sectional view schematically showing an example of a structural member using the press-formed article of the embodiment.

The structural member 200 shown in FIG. 6A includes the press-formed article 100 and a back sheet (steel sheet) 201. The back sheet 201 is welded to the two flange portions 113 of the press-formed article 100. The structural member 200 shown in FIG. 6A includes an auxiliary member 601 joined to each of both the two standing wall portions 111 and the top sheet portion 112 via a joint portion 602. The auxiliary member 601 is a long member and may be disposed so that the longitudinal direction of the press-formed article 100 and the longitudinal direction of the auxiliary member 601 are substantially parallel to each other. In the examples of FIGS. 6A to 6D, the auxiliary member 601 has a U-shaped cross-sectional shape in a cross section perpendicular to the longitudinal direction.

Figure 6B:
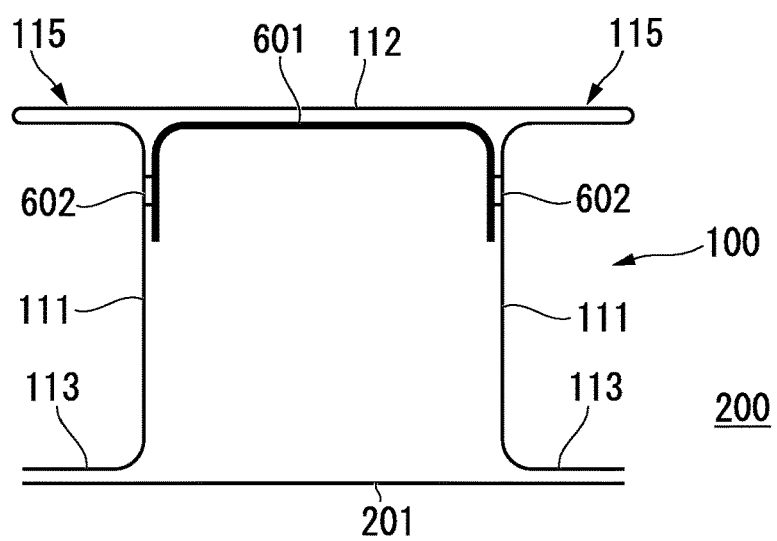
FIG. 6B is a cross-sectional view schematically showing an example of a structural member using the press-formed article of the embodiment.

The structural member 200 shown in FIG. 6B includes the auxiliary member 601 joined to each of the two standing wall portions 111 via the joint portion 602. The joint portion 602 is not provided between the top sheet portion 112 and the auxiliary member 601. The top sheet portion 112 and the auxiliary member 601 may be disposed in close contact with each other or may be disposed with a gap therebetween.

Figure 6C:
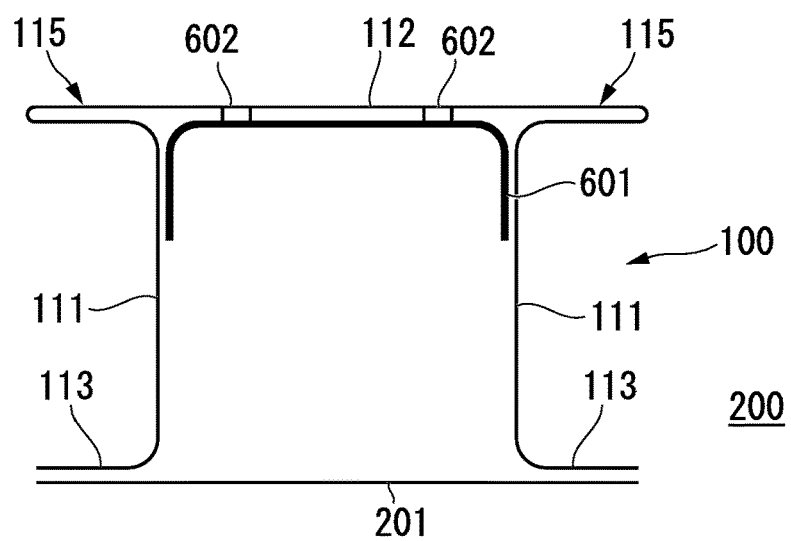
FIG. 6C is a cross-sectional view schematically showing an example of a structural member using the press-formed article of the embodiment.

The structural member 200 shown in FIG. 6C includes the auxiliary member 601 joined to the top sheet portion 112 via the joint portion 602. The joint portion 602 is not provided between the two standing wall portions 111 and the auxiliary member 601. The standing wall portion 111 and the auxiliary member 601 may be disposed in close contact with each other or may be disposed with a gap therebetween.

Figure 6D:
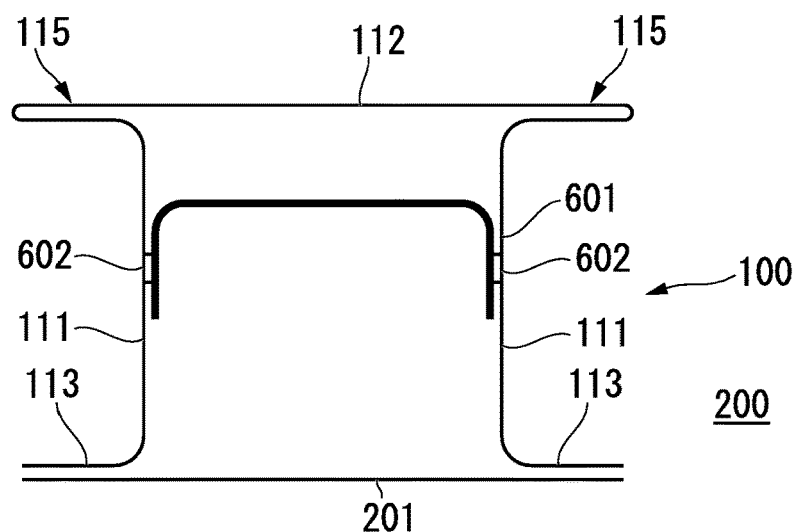
FIG. 6D is a cross-sectional view schematically showing an example of a structural member using the press-formed article of the embodiment.

The structural member 200 shown in FIG. 6D includes the auxiliary member 601 joined to each of the two standing wall portions 111 via the joint portion 602. In the example of FIG. 6D, a space is provided between the top sheet portion 112 and the upper surface of the auxiliary member 601.

Figure 7A:
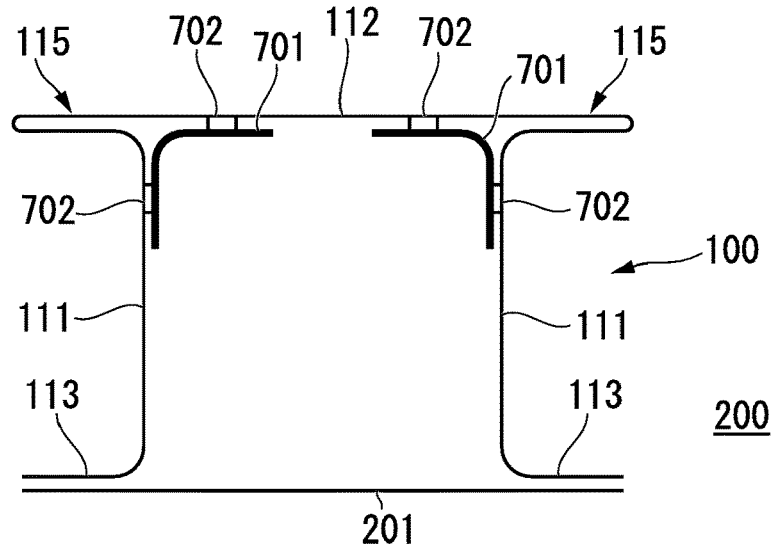
FIG. 7A is a cross-sectional view schematically showing an example of a structural member using the press-formed article of the embodiment.
Figure 7B:
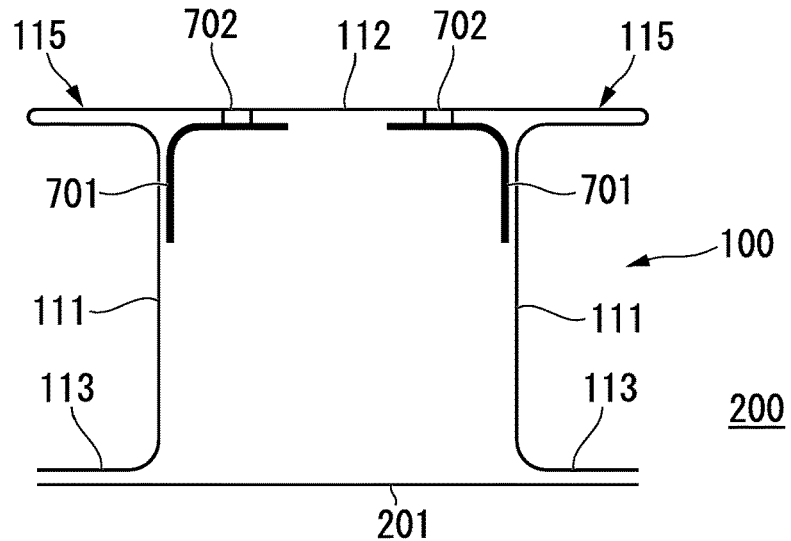
FIG. 7B is a cross-sectional view schematically showing an example of a structural member using the press-formed article of the embodiment.

FIGS. 7A and 7B are views schematically showing cross sections perpendicular to the longitudinal direction of the structural member 200 showing another form of the auxiliary member. In the examples of FIGS. 7A and 7B, an auxiliary member 701 has an L-shaped cross-sectional shape in a cross section perpendicular to the longitudinal direction. The auxiliary member 701 is a long member and may be disposed so that the longitudinal direction of the press-formed article 100 and the longitudinal direction of the auxiliary member 701 are substantially parallel to each other.

The structural member 200 shown in FIG. 7A includes two auxiliary members 701 joined to one of the two standing wall portions 111 and the top sheet portion 112 via the joint portions 602. The structural member 200 shown in FIG. 7B includes the two auxiliary members 701 joined to the top sheet portion 112 via the joint portions 702. The joint portion 702 is not provided between the two standing wall portions 111 and the auxiliary member 701. The standing wall portion 111 and the auxiliary member 701 may be disposed in close contact with each other or may be disposed with a gap therebetween.

The auxiliary member 601 or 701 described above may be disposed entirely in the longitudinal direction of the structural member 200 or may be disposed only partially in the longitudinal direction. The joint portion 602 or 702 may be formed by any of welding, an adhesive, brazing, riveting, bolting, and friction stir welding as described above.

In the structural member including the press-formed article having the protrusion portion described above, since the standing wall portions fall so as to move inward, by adding the auxiliary member, it is possible to suppress the falling, and further improve collision characteristics.

It is preferable that the strength of the auxiliary member 601 or 701 is high. However, in order to contribute to suppression of the inward falling described above, the material of the auxiliary member 601 or 701 may be a non-metallic material such as a polymer material or a foamed resin.

Third Embodiment

Figure 8A:
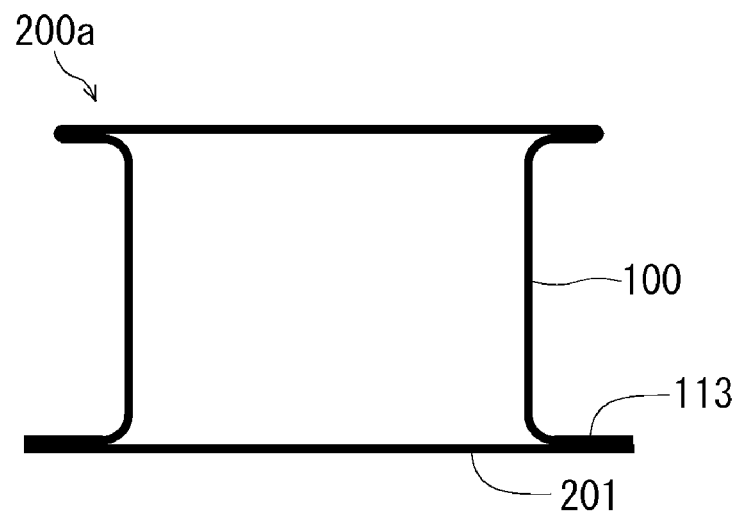
FIG. 8A is a cross-sectional view schematically showing an example of a structural member using the press-formed article of the embodiment.
Figure 8B:
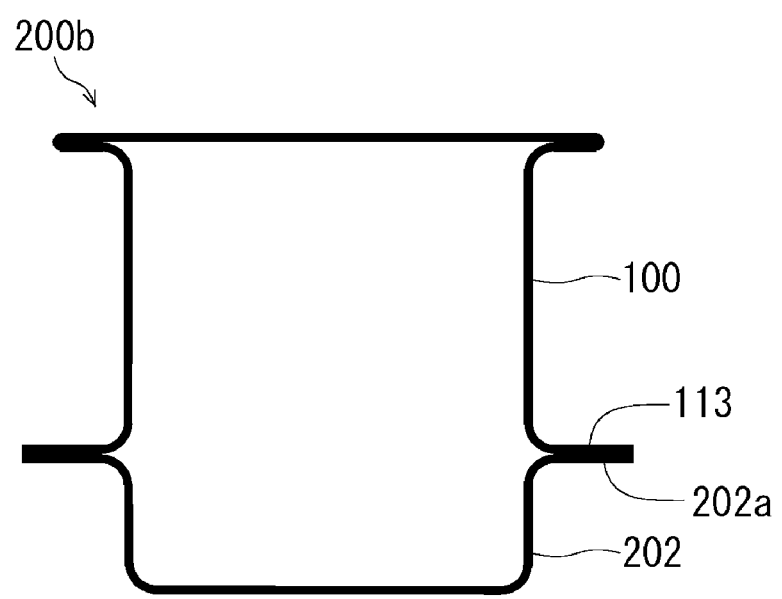
FIG. 8B is a cross-sectional view schematically showing another example of a structural member using the press-formed article of the embodiment.
Figure 8C:
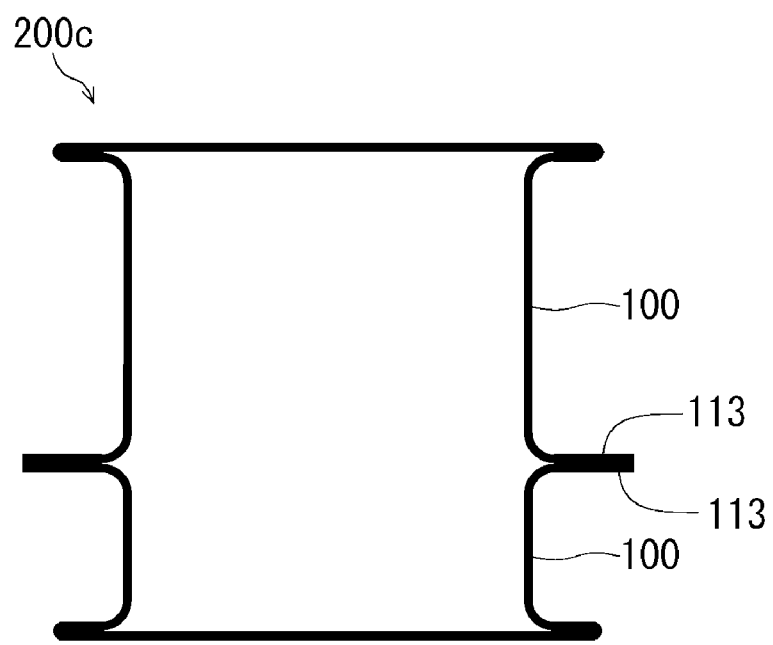
FIG. 8C is a cross-sectional view schematically showing another example of a structural member using the press-formed article of the embodiment.

In a third embodiment, an example of the structural member using the press-formed article (P) of the embodiment described above will be described. Examples of the structural member are shown in FIGS. 8A to 8C. FIGS. 8A to 8C are views schematically showing cross sections perpendicular to the longitudinal direction of the structural member. The structural member described in the second embodiment can be used in the above-described applications (a vehicle component and other applications).

A structural member 200a shown in FIG. 8A includes the press-formed article 100 and the back sheet (steel sheet) 201. The back sheet 201 is welded to the two flange portions 113 of the press-formed article 100. A structural member 200b shown in FIG. 8B includes the press-formed article 100 and another press-formed article 202. The press-formed article 202 has a substantially hat-shaped cross section. The press-formed article 100 and the press-formed article 202 are disposed so as to cause the inner regions thereof to face each other, and the flange portions 113 of the press-formed article 100 and flange portions 202a of the press-formed article 202 are welded together.

A structural member 200c includes the two press-formed articles 100. The two press-formed articles 100 are disposed so as to cause the inner regions thereof to face each other, and the flange portions 113 thereof are welded together. It is possible to regard one of the two press-formed articles 100 as a steel sheet member. In addition, the back sheet 201 and the press-formed article 202 are steel sheet members.

Figure 8D:
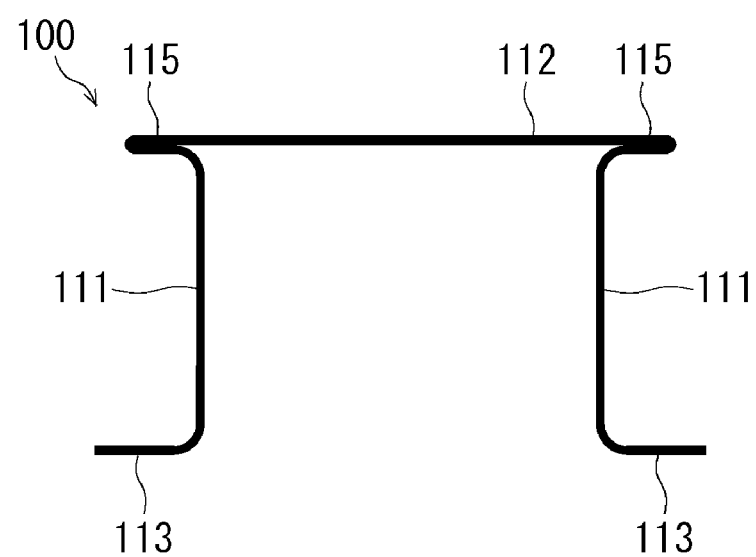
FIG. 8D is a cross-sectional view schematically showing an example of the press-formed article of the embodiment.

In the press-formed article 100 included in the structural member of the embodiment, as shown in FIG. 8D, another steel sheet member may be joined (fixed) to a portion of the flange portion 113. Furthermore, in the press-formed article 100, as shown in FIGS. 8E and 8F, a recessed part 112c may be formed in the top sheet portion 112.

Figure 8E:
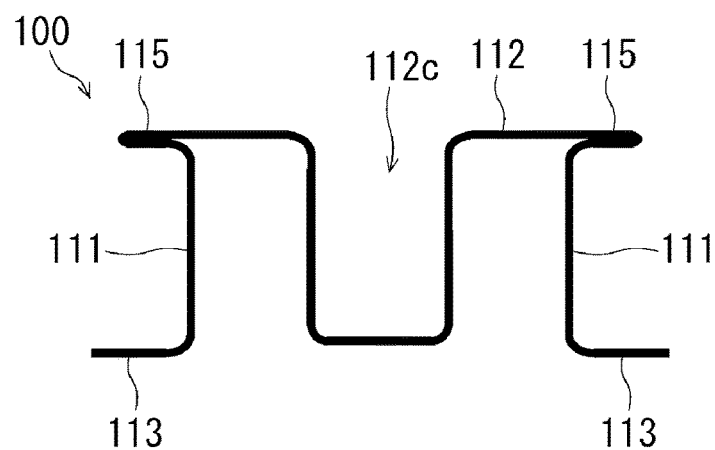
FIG. 8E is a cross-sectional view schematically showing another example of the press-formed article of the embodiment.
Figure 8F:
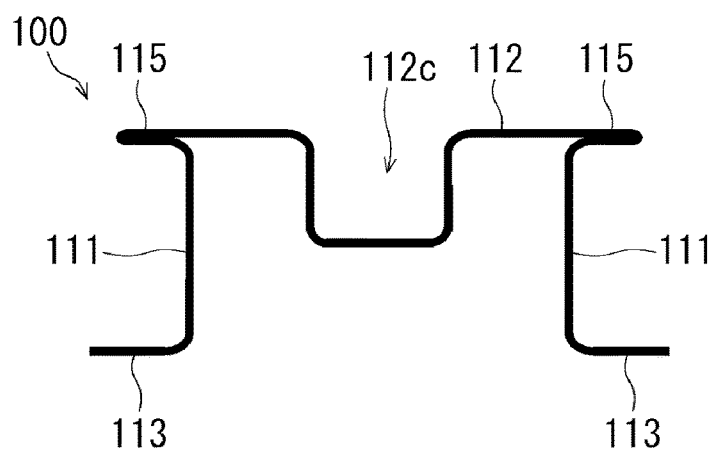
FIG. 8F is a cross-sectional view schematically showing another example of the press-formed article of the embodiment.

In the press-formed article 100 of FIG. 8E, the depth of the recessed part 112c is substantially the same as the height of the standing wall portion 111. In the press-formed article 100 of FIG. 8F, the depth of the recessed part 112c is about half the height of the standing wall portion 111. The press-formed articles 100 shown in FIGS. 8E and 8F can also be used in the structural member of the embodiment. In this case, the entire flange portion 113 may be joined to another steel sheet member, or only a portion of the flange portion 113 may be joined to another steel sheet member. In a case of joining only a portion of the flange portion 113 to another steel sheet member, the joint portion may be only in the vicinity of both end portions of the press-formed article in the longitudinal direction.

[Manufacturing Method of Press-Formed Article]

Hereinafter, a manufacturing method of a press-formed article according to the present invention will be described.

The manufacturing method of a press-formed article according to the present invention is a method for manufacturing the press-formed article (P) of the embodiment described above. Since the items described for the press-formed article (P) of the embodiment described above can be applied to the manufacturing method described below, overlapping descriptions will be omitted in some cases. In addition, items described in the following manufacturing method can be applied to the press-formed article (P) of the embodiment described above.

The manufacturing method of the following embodiment includes a first step and a second step. The first step is a step of deforming a base steel sheet including two standing wall portion equivalent portions which are to become the two standing wall portions, a top sheet portion equivalent portion which is to become the top sheet portion, and a protrusion portion equivalent portion which is to become the protrusion portion, thereby obtaining a deformed steel sheet (deformed steel sheet) in a state where the two standing wall portion equivalent portions are bent in the same direction with respect to the top sheet portion equivalent portion. The second step is a step of press-forming the deformed steel sheet, thereby forming the press-formed article (P). In the second step, the protrusion portion is formed by overlapping at least a portion of the protrusion portion equivalent portion.

In the deformed steel sheet, there is usually no well-defined boundary between the standing wall portion equivalent portions, the top sheet portion equivalent portion, and the protrusion portion equivalent portion. However, there may be some boundaries therebetween.

The deformed steel sheet may be in an elastically deformable state where deformation is relieved when a load is removed or may be in a plastically deformable state where deformation is not relieved even when a load is removed. That is, the deformed steel sheet may be in a plastically deformable state or an elastically deformable state. Hereinafter, the deformed steel sheet in a plastically deformable state is sometimes referred to as "preliminary formed article".

The first step is not particularly limited, and may be performed by a known press forming.

Although the second step will be described later, it is preferable to use hot-press-forming in the second step. The press-formed article obtained by the second step may be further subjected to a post-treatment. The press-formed article obtained by the second step (or obtained by the subsequent post-treatment) may be used as it is or may be used in combination with another member.

Hereinafter, the steel sheet (base steel sheet) which is a starting material is referred to as "blank" in some cases. The blank is usually a flat plate-shaped steel sheet and has a planar shape corresponding to the shape of the press-formed article (P) to be manufactured. The thickness and physical properties of the blank are selected according to the characteristics required for the press-formed article (P). For example, in a case where the press-formed article (P) is a structural member of a vehicle, a blank corresponding thereto is selected. The thickness of the blank may be, for example, in a range of 0.4 mm to 4.0 mm, and may be in a range of 0.8 mm to 2.0 mm.

The thickness of the press-formed article (P) of the embodiment is determined by the thickness of the blank and processing steps, and may be in the range of the thickness of the blank exemplified herein.

It is preferable that the blank is a high tensile strength steel sheet (high tensile material) having a tensile strength of 340 MPa or more (for example, a tensile strength of 500 to 800 MPa, 490 MPa or more, 590 MPa or more, 780 MPa or more, 980 MPa or more, or 1200 MPa or more). In order to achieve a reduction in weight while maintaining the strength as a structural member, it is preferable that the tensile strength of the formed article is high, and it is more preferable that a blank of 590 MPa or more (for example, 780 MPa or more, 980 MPa or more, or 1180 MPa or more) is used. The upper limit of the tensile strength of the blank is not limited, and is 2500 MPa or less in an example. The tensile strength of the press-formed article (P) of the embodiment is usually equal to or higher than the tensile strength of the blank and may also be in the range exemplified herein.

In a case where the tensile strength of the base steel sheet (blank) is 590 MPa or more, in order to obtain a press-formed article of equal to or greater than that of the blank, it is preferable to perform the second step by hot stamping (hot pressing).

Even in a case of using a blank having a tensile strength of less than 590 MPa, the second step may also be performed by hot stamping. In a case of performing hot stamping, a blank having a known composition suitable for that may be used.

In a case where the blank has a tensile strength of 590 MPa or more and a thickness of 1.4 mm or more, in order to suppress the occurrence of cracking in a protrusion portion even in a blank having low ductility, it is particularly preferable to perform the second step by hot stamping.

For the same reason, in a case where the blank has a tensile strength of 780 MPa or more and a thickness of 0.8 mm or more, it is particularly preferable to perform the second step by hot stamping. Since the ductility of the heated steel sheet is high, in a case of performing the second step by hot stamping, cracking is less likely to occur even if the thickness of the blank is 3.2 mm.

In a case where the tensile strength of the blank is high, cracking is likely to occur at the tip end portion of the protrusion portion during cold pressing. Therefore, in a case where the tensile strength of the steel sheet after forming becomes 1200 MPa or more (for example, 1500 MPa or more or 1800 MPa or more), it is more preferable to perform the second step by hot stamping. Even in a case where the tensile strength of the steel sheet after forming becomes less than 1200 MPa, the second step may be performed by hot stamping.

In a case where the tensile strength of the blank is 780 MPa or more, when the shape of the press-formed article (P) of the embodiment is formed by cold pressing, wrinkles or cracks may be generated in the protrusion portion and the like in some cases. However, in the manufacturing method of the press-formed article of the present invention, by performing the second step by hot stamping, the shape of the press-formed article (P) of the embodiment can be obtained even if the tensile strength of the blank is 780 MPa or more. That is, by performing the second step by hot stamping, the press-formed article (P) having a tensile strength of 780 MPa or more can be manufactured.

A manufacturing method using hot stamping is not disclosed in Patent Documents 4, 5, and 6. However, as described above, in order to obtain a press-formed article having a tensile strength of 590 MPa or more, it is preferable to perform the second step by hot stamping.

In the hot stamping, in order to secure a desired strength, the C content in the chemical composition of the blank needs to be 0.090 to 0.400 mass %. In addition, Mn also needs to be 1.00 to 5.00 mass %. Similarly, B also needs to be 0.00050 to 0.05000 mass %. A representative chemical composition of the blank having a tensile strength of 1500 MPa or more after quenching is not particularly limited, but includes C: 0.200 mass %, Si: 0.0200 mass %, Mn: 1.30 mass %, Al: 0.030 mass %, Ti: 0.02 mass %, and B: 0.00150 mass %.

The deformation in the first step is usually not that large. Therefore, regardless of the tensile strength of the blank, the first step can usually be performed by cold working (for example, cold pressing). However, as necessary, the first step may be performed by hot working (for example, hot pressing). In a preferable example, the first step is performed by cold working, and the second step is performed by hot stamping.

An example of hot stamp forming (hot stamping) used in the second step will be described below. In a case of performing hot stamping, first, a workpiece (blank or preliminary formed article) is heated to a predetermined quenching temperature. The quenching temperature is a temperature higher than an A3 transformation point (more specifically, Ac3 transformation point) at which the workpiece is austenitized, and for example, may be 910° C. or higher.

Next, the heated workpiece is pressed with a pressing apparatus. Since the workpiece is heated, cracking is less likely to occur even if the workpiece is greatly deformed. The workpiece is rapidly cooled when the workpiece is pressed. The workpiece is quenched by the rapid cooling during press working. The rapid cooling of the workpiece can be performed by cooling the die or spraying water from the die toward the workpiece. It is preferable that the cooling rate when the workpiece is rapidly cooled by the pressing apparatus is, for example, 30° C./s or more.

The procedure of the hot stamping (heating, pressing, and the like) and an apparatus used for the hot stamping are not particularly limited, and known procedures and apparatus may be used.

The preliminary formed article may include a U-shaped portion having a U-shaped cross section perpendicular to the longitudinal direction. The U-shaped portion becomes the two standing wall portions, the top sheet portion, and the protrusion portion. A portion to be the flange portion may be connected to the end portion of the U-shaped portion.

In the following description, the phrase "cross section" means, in principle, a cross section perpendicular to the longitudinal direction of a member such as a preliminary formed article.

[Manufacturing Method by Two Steps]

An example of a manufacturing method of a press-formed article (a manufacturing method of a press-formed article by two steps) in which the first and second steps described above are included and these steps are performed by different apparatuses or dies will be described below.

In the manufacturing method of a press-formed article by two steps, a heating step of heating the deformed steel sheet obtained by processing the base steel sheet in the first step is included after the first step and before the second step.

In the second step, hot-press-forming is performed by a press die including an upper die and a lower die and two cam dies. The lower die has a protrusion, and a step of disposing the protrusion of the lower die and the deformed steel sheet so as not to be brought into contact with each other. In addition, the second step includes (a) a step of pressing the top sheet portion equivalent portion using the upper die and the lower die and (b) a step of pressing the two standing wall portion equivalent portion using the lower die and the two cam dies.

In a manufacturing method of the fourth embodiment described below, the second step may include the following steps (a) and (b). The second step is preferably used in a case where the deformed steel sheet is a preliminary formed article which is plastically deformed.

In the step (a), the top sheet portion equivalent portion is pressed by the press die including the upper die and the lower die forming a pair. In the step (b), the two standing wall portion equivalent portions are pressed by the lower die and the two cam dies. In the manufacturing method of the following embodiment, a die which forms a protrusion portion when both the steps (a) and (b) are completed may be used. The cam dies mainly move in a direction (horizontal direction) perpendicular to the pressing direction. In a typical example, the cam die moves only in the horizontal direction.

Timings at which the steps (a) and (b) are performed can be selected depending on the situation, either one thereof may be completed first, or both thereof may be completed at the same time. Either one of the steps (a) and (b) may be started first, or both thereof may be started at the same time. First to third examples in which the timings at which the steps (a) and (b) are completed are different will be described below.

In the first example of the second step, the step (b) is completed after the step (a) is completed. The first example is preferably performed in a case where the angle X between the top sheet portion and the overlapping portion is larger than 90° and equal to or less than 135°.

As long as the step (b) is completed after the step (a) is completed, movement of the cam die in the step (b) may be started before the step (a) is completed.

In the second example of the second step, the step (a) is completed after the step (b) is completed. The second example is preferably performed in a case where the angle X between the top sheet portion and the overlapping portion is equal to or larger than 135° (for example, in a range of 135° to 180°).

As long as the step (a) is completed after the step (b) is completed, movement of the press die in the step (a) may be started before the step (b) is completed.

In the third example of the second step, the steps (a) and (b) are completed at the same time. As long as the steps (a) and (b) are completed at the same time, the timing at which movement of the press die is started in the step (a) and the timing at which movement of the cam die is started in the step (b) are not limited.

Fourth Embodiment

In a fourth embodiment, a method for manufacturing the press-formed article (P) will be described. In the fourth embodiment, an example of manufacturing the press-formed article (P) described in the first embodiment will be described.

In the fourth embodiment, an example in which the second step is performed by hot stamping will be described. In the fourth embodiment, a case where a preliminary formed article which is plastically deformed is used as a deformed steel sheet will be described.

First, in the first step, a preliminary formed article 301 (deformed steel sheet) including at least portions which are to become the two standing wall portions 111 (two standing wall portion equivalent portions), a portion which is to become the top sheet portion 112 (top sheet portion equivalent portion), and a portion which is to become the protrusion portion 115 (protrusion portion equivalent portion) is formed by deforming a base steel sheet. The first step can be performed according to the above-described method (for example, press working). The cross section of an example of the preliminary formed article 301 formed in the first step (a cross section perpendicular to the longitudinal direction) is schematically shown in FIG. 9.

Figure 9:
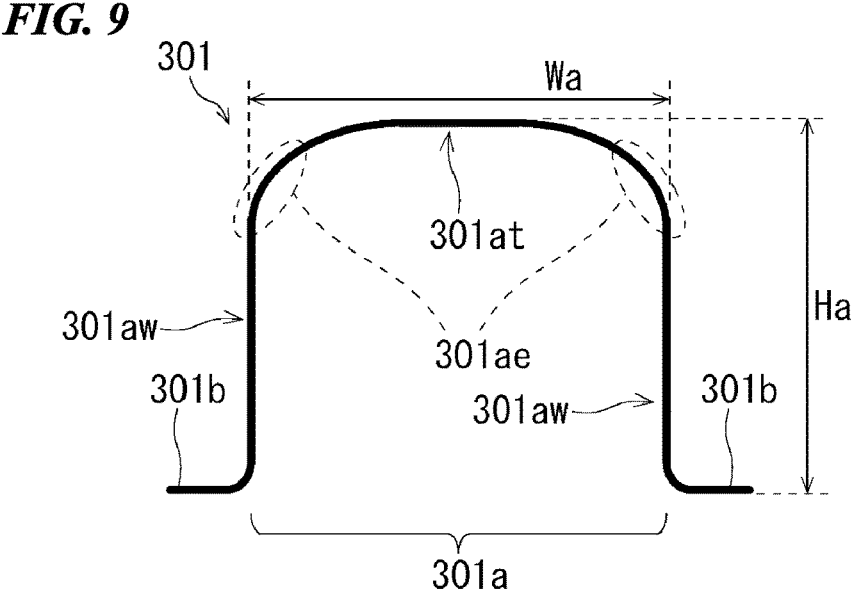
FIG. 9 is a cross-sectional view schematically showing an example of a preliminary formed article formed in a manufacturing method of the embodiment.

As shown in FIG. 9, the preliminary formed article 301 includes a U-shaped portion 301a, and flat parts 301b (flange portion equivalent portion) which are to become the flange portions 113. The U-shaped portion 301a includes two standing wall portion equivalent portions 301aw and a top sheet portion equivalent portion 301at, and further includes protrusion portion equivalent portions 301ae.

In the preliminary formed article 301, the two standing wall portion equivalent portions 301aw are bent in the same direction with respect to the top sheet portion equivalent portion 301at. That is, both the two standing wall portion equivalent portions 301aw are bent toward one principal surface side of the top sheet portion equivalent portion 301at.

The cross section of the preliminary formed article 301 is substantially hat-shaped. In addition, the cross section of the U-shaped portion 301a is substantially U-shaped (inverted in FIG. 7). The preliminary formed article 301 is plastically deformed and maintains the shape of FIG. 9 in a state where no load is applied.

The length (cross-sectional length) of the U-shaped portion 301a is assumed to be Lu. Furthermore, in the press-formed article (P), the height of the standing wall portion is assumed to be Hb (corresponding to Hb1 in FIG. 14A), and the width between the two standing wall portions is assumed to be Wb (corresponding to Wb1 in FIG. 14A). The U-shaped portion 301a includes, in addition to the standing wall portion equivalent portions 301aw and the top sheet portion equivalent portion 301at, the protrusion portion equivalent portions 301ae which are to become the protrusion portions 115 by the second step. Therefore, the length Lu, the width Wb, and the height Hb satisfy the relationship of Wb+2Hb<Lu. Furthermore, the width of the U-shaped portion 301a is assumed to be Wa, and the height thereof is assumed to be Ha. Usually, the relationship of Wb≤Wa and the relationship of Wb+2Hb<Wa+2Ha are satisfied.

In the U-shaped portion 301a of the preliminary formed article 301 shown in FIG. 9, there is no well-defined boundary between the protrusion portion equivalent portions 301ae and the other portions.

The end portion of the flat part 301b of the preliminary formed article 301 may extend downward (in a direction away from the top sheet portion 112). In FIGS. 10A to 10D below, an example in which the second step is performed by using the preliminary formed article 301 in which the end portion of the flat part 301b does not extend downward will be described. As shown in FIGS. 11A to 11D, the preliminary formed article 301 in which the end portion of the flat part 301b extends downward can be similarly formed.

The second step is performed by hot stamping. Therefore, the preliminary formed article 301 is heated to a temperature equal to or higher than the Ac3 transformation point (for example, a temperature higher than the Ac3 transformation point by 80° C. or higher). The heating is performed, for example, by heating the preliminary formed article 301 in a heating apparatus.

Figure 10A:
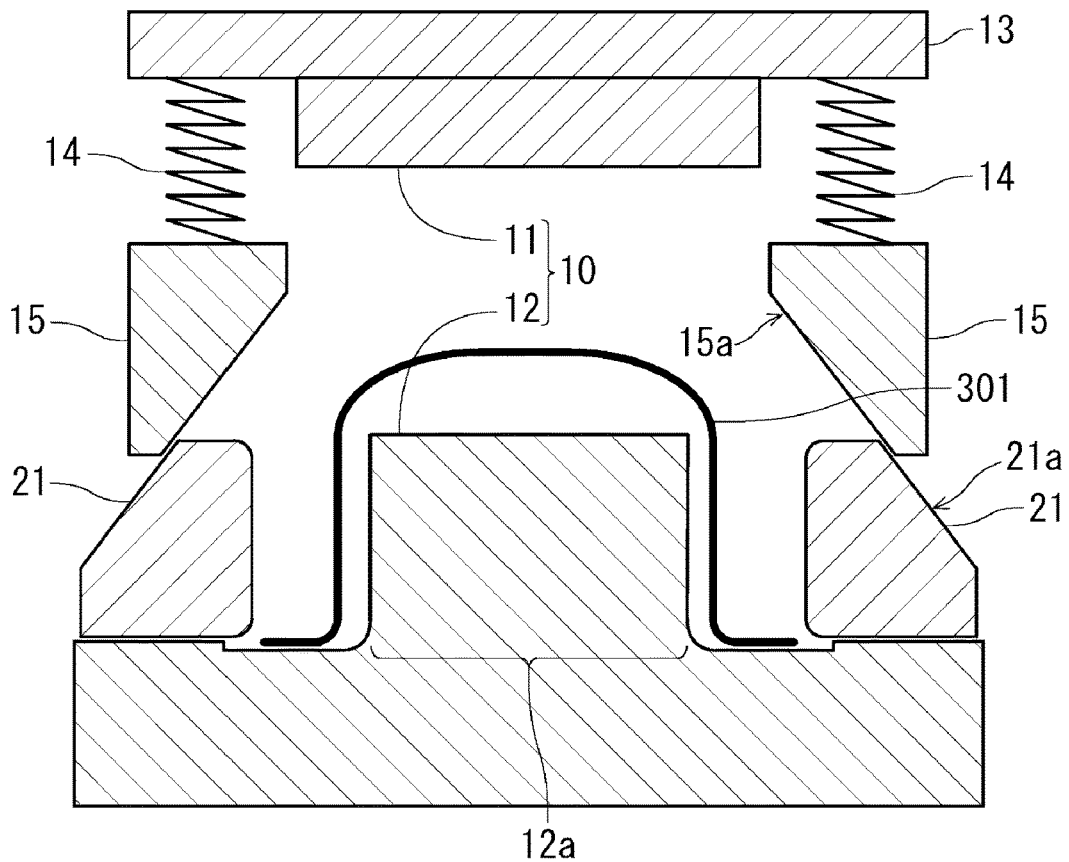
FIG. 10A is a cross-sectional view schematically showing a step in a second step in an example of the manufacturing method of the embodiment.

Next, the heated preliminary formed article 301 is subjected to press working by the pressing apparatus. An example of the configuration of the press die used for press working is shown in FIG. 10A. The pressing apparatus includes a press die 10, a plate 13, an extension and contraction mechanism 14, cam pressing dies 15, and cam dies (slide dies) 21.

The press die 10 includes an upper die 11 and a lower die 12 which form a pair. The lower die 12 includes a protrusion 12a of which the protruding surface faces the direction of the upper die 11. The cam pressing die 15 and the cam die 21 respectively have inclined surfaces 15a and 21a serving as a cam mechanism. The cam pressing die 15 is fixed to the plate 13 via the extension and contraction mechanism 14 which can extend and contract. As the extension and contraction mechanism, a known extension and contraction mechanism such as a spring or a hydraulic cylinder can be used.

As the plate 13 is lowered, the upper die 11 and the cam pressing die 15 are lowered. As the cam pressing die 15 is lowered, the cam die 21 is pressed by the cam pressing die 15 and moves toward the protrusion 12a side of the lower die 12. As is well known, the timing of the movement of the cam die 21 can be adjusted by changing the position and shape of the inclined surfaces 15a and 21a. That is, by the adjustment, it is possible to adjust the timings of the completion of the step (a) and the completion of the step (b) described above.

In the above example, the cam die 21 is moved by a cam mechanism. However, instead of using the cam mechanism, the cam die 21 may also be configured to be independently moved by a hydraulic cylinder or the like without depending on movement of another die.

In this embodiment, an example in which the upper die 11 and the cam pressing die 15 are attached to the same slide of a press via the plate 13 is exemplified. However, the upper die 11 and the cam pressing die 15 may be attached to different slides of the press to be moved individually. In addition, in this embodiment, an example in which the cam die 21 is moved by pressing the cam pressing die 15 is exemplified. However, the cam die 21 may be independently moved by a driving device directly attached to the cam die 21.

The press die 10 and the cam die 21 have a cooling function. For example, the press die 10 and the cam die 21 may be configured so as to cause cooling water to be circulated therein. By performing pressing using a cold die, the heated preliminary formed article 301 is formed and cooled. As a result, press forming and quenching are performed.

Cooling may be performed by spraying water from the die.

An example of a press-forming step using the apparatus in FIG. 10A will be described. FIGS. 10A to 10D schematically show an example of a case of performing the second step using the method of the second example described above. The method of the second example is preferably used in a case where the angle X is in a range of 135° to 180°.

First, as shown in FIG. 10A, the preliminary formed article 301 is disposed between the upper die 11 and the lower die 12. At this time, it is important to dispose the protrusion 12a of the lower die 12 and the deformed steel sheet 301 in a state of not being in contact with each other.

When the preliminary formed article 301 is disposed between the upper die 11 and the lower die 12, in a case where the U-shaped portion 301a of the deformed steel sheet 301 (the regions including the portions which are to become the two standing wall portions 111 (the two standing wall portion equivalent portions), the portion which is to become the top sheet portion 112 (the top sheet portion equivalent portion), and the portions which are to become the protrusion portions 115 (the protrusion portion equivalent portions)) is in a state of being in contact with the protrusion 12a of the lower die 12, the point of the deformed steel sheet 301 which is in contact with the protrusion 12a of the lower die 12 is cooled by the lower die 12. In this case, a steel sheet temperature necessary for hot pressing cannot be maintained at the time of press forming. Therefore, there is concern that cracks and wrinkles may be generated in the press-formed article, and a desired strength cannot be obtained. In addition, the necessary cooling rate for quenching cannot be obtained. The desired strength cannot be obtained.

In particular, cracks and wrinkles are likely to be generated in the vicinity of the portion which is to become the protrusion portion 115 (the protrusion portion equivalent portion) of the deformed steel sheet 301. Therefore, it is important to dispose the deformed steel sheet 301 in a state of not being in contact with the protrusion 12a of the lower die 12.

Figure 10B:
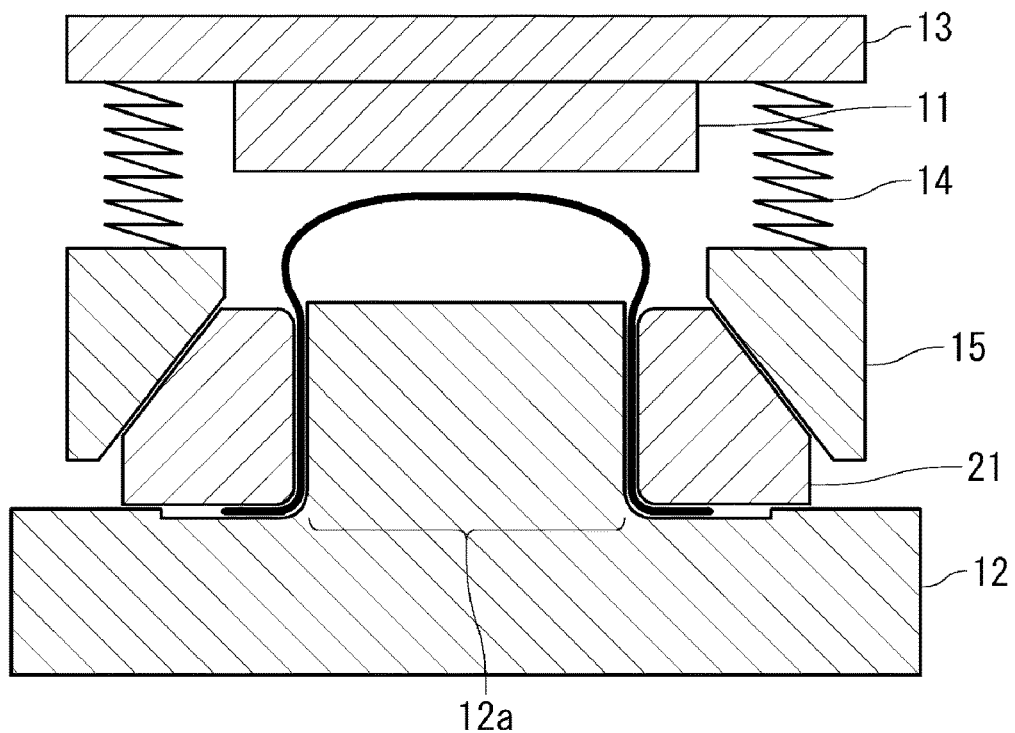
FIG. 10B is a cross-sectional view schematically showing a step subsequent to the step in FIG. 10A.

Next, the plate 13 is lowered. The cam dies 21 are pressed by the cam pressing dies 15 lowered along the plate 13 and slide toward the protrusion 12a side. As a result, as shown in FIG. 10B, the lower die 12 (the protrusion 12a) and the cam dies 21 press and restrain the portions which are to become the standing wall portions 111. In this manner, the step (b) is completed.

Figure 10C:
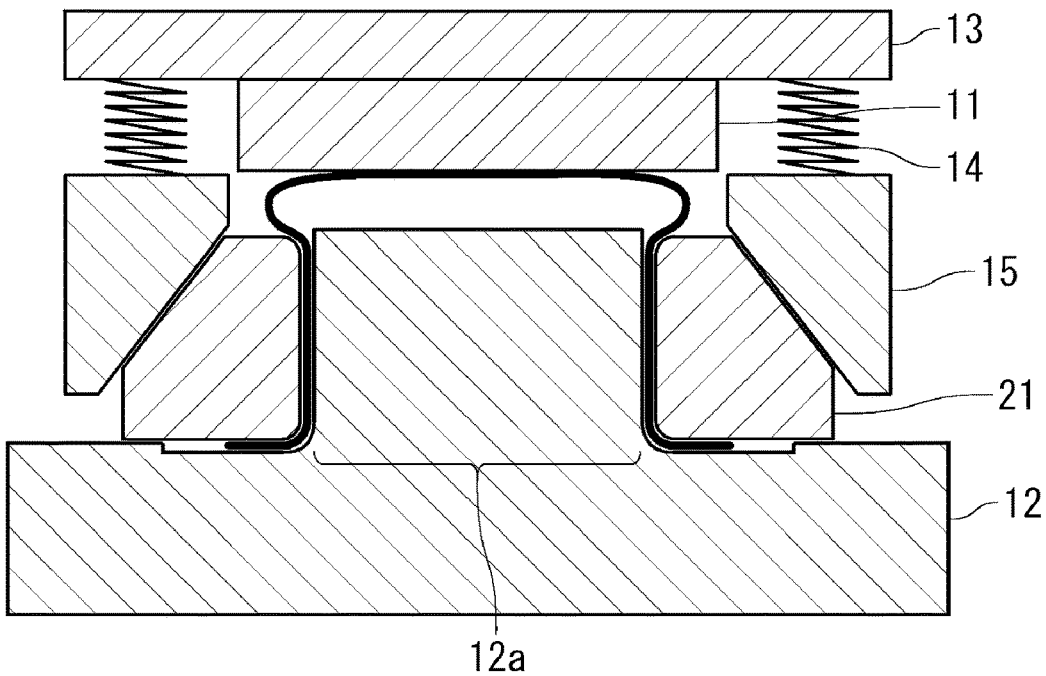
FIG. 10C is a cross-sectional view schematically showing a step subsequent to the step in FIG. 10B.

Next, as shown in FIG. 10C, the plate 13 is further lowered, whereby the portion which is to become the top sheet portion is started to be pressed. At this time, the extension and contraction mechanism 14 contracts. Since the preliminary formed article 301 has the protrusion portion equivalent portions, the protrusion portion equivalent portions protrude toward the cam dies 21 side.

Figure 10D:
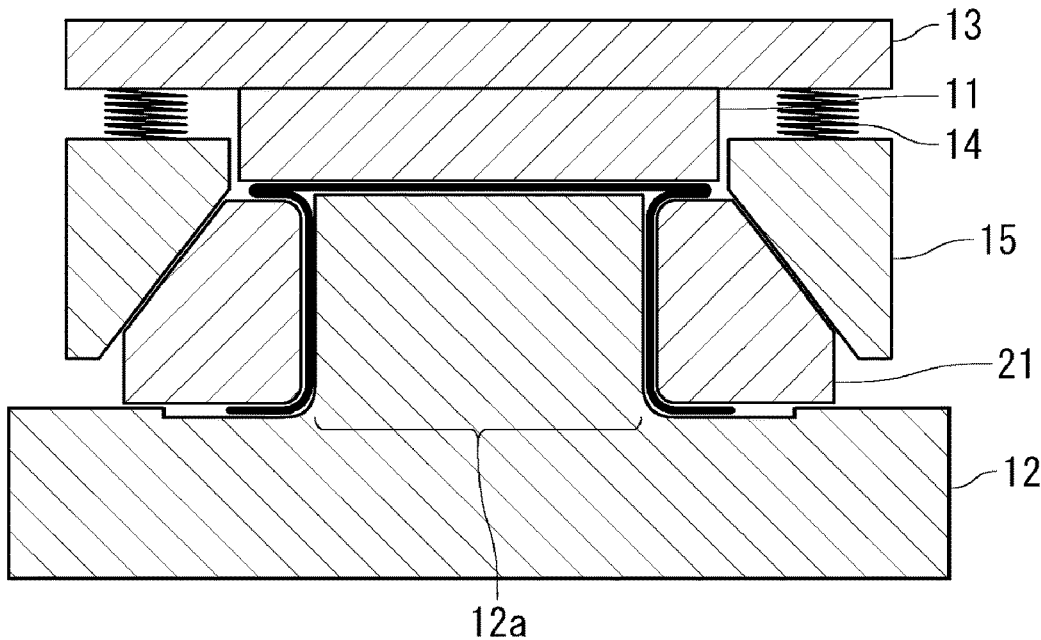
FIG. 10D is a cross-sectional view schematically showing a step subsequent to the step in FIG. 10C.

Next, as shown in FIG. 10D, the upper die 11 is lowered to the bottom dead point such that the portion which is to become the top sheet portion is pressed and restrained by the upper die 11 and the lower die 12 (the protrusion 12a). In this manner, the step (a) is completed.

In this manner, press forming is completed. The protrusion portion equivalent portion is folded between the upper die 11 and the cam die 21 and becomes the protrusion portion 115 having an overlapping portion 115d. In this manner, the press-formed article 100 of the embodiment is obtained.

When the hot stamping is performed, in order to secure the hardenability of the protrusion portion, that is, in order to cause the tensile strength of the protrusion portion of the press-formed article to be a predetermined target strength for the hot stamping, forming needs to be performed without a reduction in cooling rate during the forming. From this viewpoint, since both surfaces of the steel sheet excluding the protrusion portion are brought into contact with the dies, the material is cooled from both sides, and a predetermined cooling rate can be secured.

On the other hand, in the protrusion portion, cooling is performed only from one side of the steel sheet (outside the press-formed article). Therefore, there may be cases where the cooling rate decreases and a desired tensile strength cannot be obtained. Therefore, in a case where the angle X of the protrusion portion of the press-formed article is in a range of 135° to 180°, it is preferable that the top sheet portion is formed using the upper die 11 after the standing wall portions are formed using the cam dies 21.

Next, an example of a case of performing the second step in the method of the first example described above will be described. FIGS. 11A to 11D schematically show each step. The method of the first example is preferably used in a case where the angle X is larger than 90° and equal to or less than 135°.

FIGS. 11A to 11D show a case where the end portion of the flat part 301b (see FIG. 9) which is to become the flange portion 113 is bent downward and the lower die 12 has a shape corresponding thereto. With such a configuration, the end portion of the flat part 301b is easily inserted between the lower surface of the cam die 21 and the lower die 12.

As a matter of course, as shown in FIGS. 10A to 10D, the end portion of the flat part 301b may not be bent downward. That is, in the manufacturing method of the embodiment, the end portion of the portion which is to become the flange portion in the preliminary formed article may be bent downward or may not be bent. In a case where the end portion of the portion which is to become the flange portion is bent downward, a recessed part corresponding thereto may be formed in the lower die.

Figure 11A:
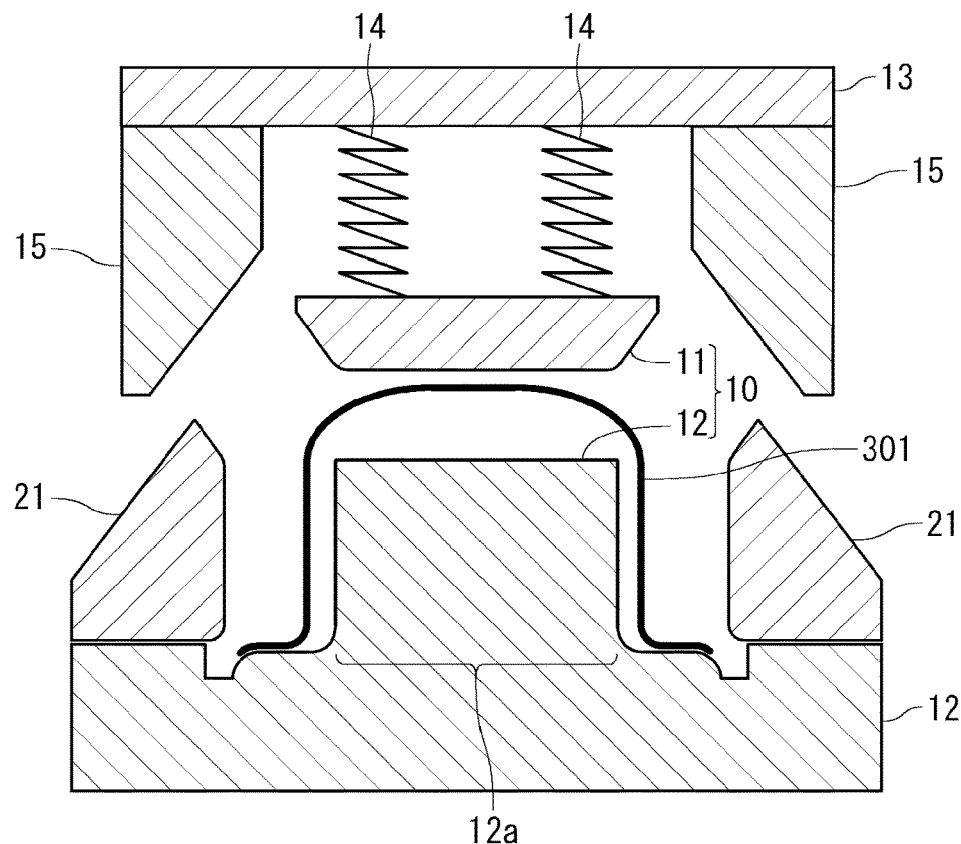
FIG. 11A is a cross-sectional view schematically showing a step in the second step in another example of the manufacturing method of the embodiment.

In the apparatus shown in FIG. 11A, the upper die 11 is fixed to the plate 13 via the extension and contraction mechanism 14 which can extend and contract. On the other hand, the cam pressing dies 15 are fixed to the plate 13 without the extension and contraction mechanism 14 interposed therebetween.

In the second step, first, as shown in FIG. 11A, the preliminary formed article 301 is disposed between the upper die 11 and the lower die 12. At this time, it is important to dispose the protrusion 12a of the lower die 12 and the deformed steel sheet 301 in a state of not being in contact with each other.

Figure 11B:
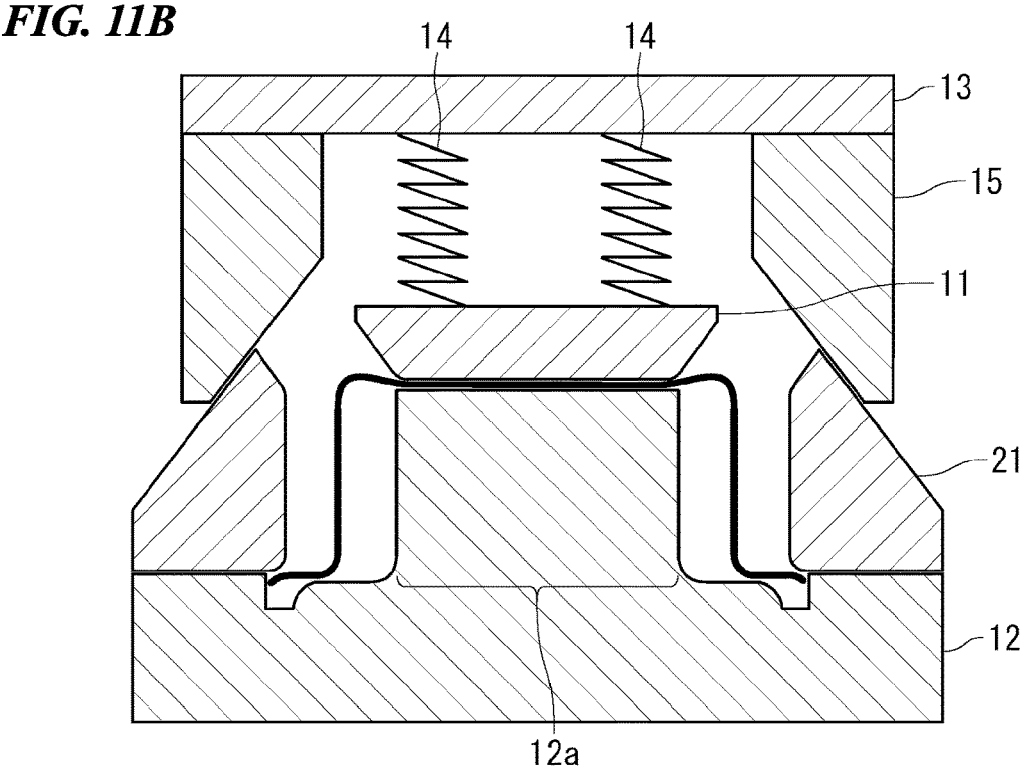
FIG. 11B is a cross-sectional view schematically showing a step subsequent to the step in FIG. 11A.

Next, as shown in FIG. 11B, the plate 13 is lowered, whereby the portion which is to become the top sheet portion is pressed and restrained by the upper die 11 and the lower die 12 (the protrusion 12a). In this manner, the step (a) is completed.

Figure 11C:
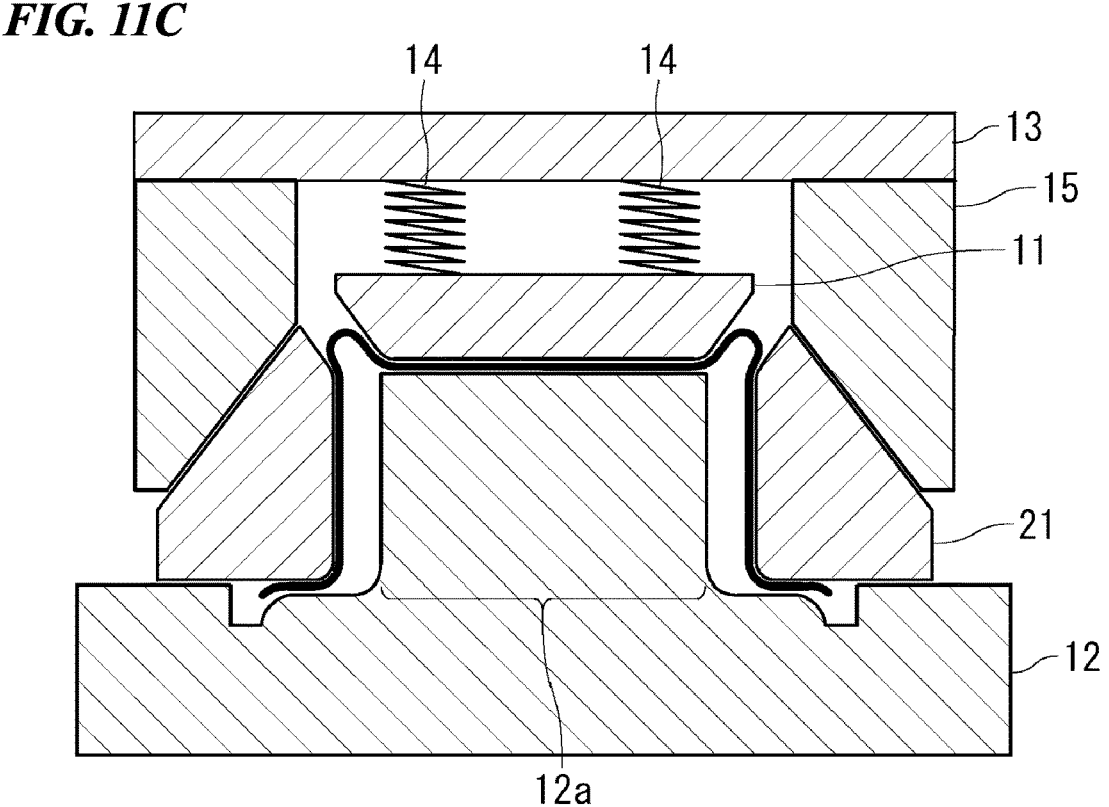
FIG. 11C is a cross-sectional view schematically showing a step subsequent to the step in FIG. 11B.

Next, the plate 13 is further lowered while the extension and contraction mechanism 14 constricts. Accordingly, as shown in FIG. 11C, the cam dies 21 are caused to slide toward the protrusion 12a side. Since the preliminary formed article 301 has the protrusion portion equivalent portion, the protrusion portion equivalent portion protrudes upward.

Figure 11D:
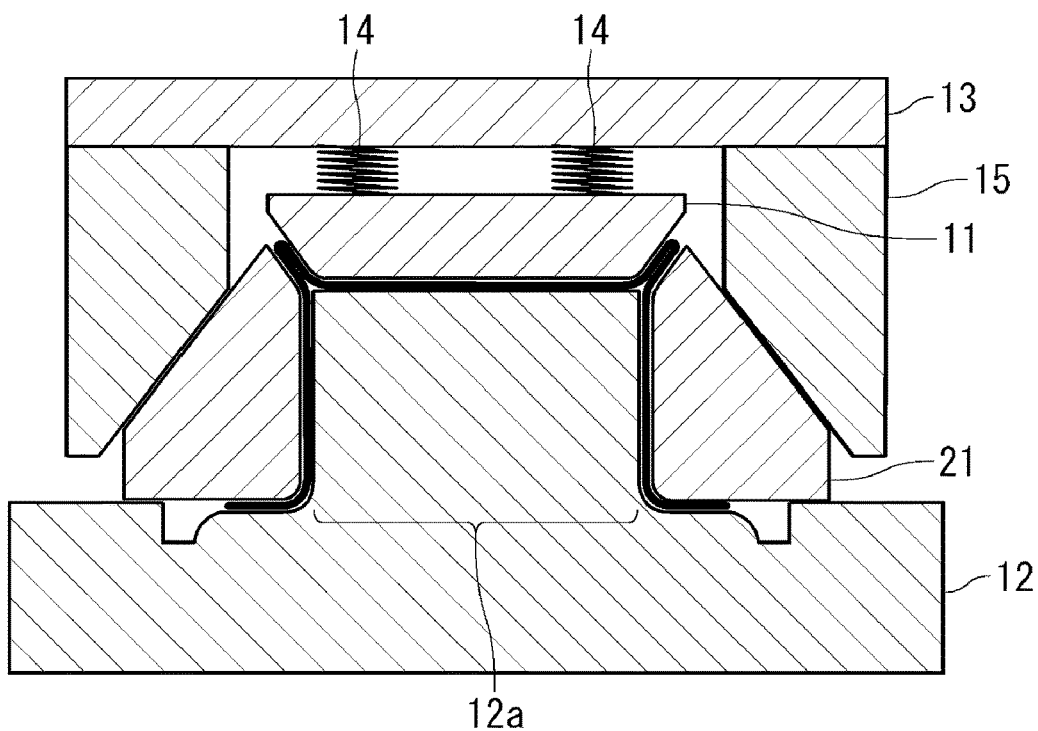
FIG. 11D is a cross-sectional view schematically showing a step subsequent to the step in FIG. 11C.

Next, as shown in FIG. 11D, the plate 13 is lowered to the bottom dead point such that the portions which are to become the standing wall portions are pressed and restrained by the cam dies 21 and the lower die 12 (the protrusion 12a). At this time, the protrusion portion equivalent portions are folded between the upper die 11 and the cam dies 21 and become the protrusion portions 115. In this manner, the step (b) is completed. In this manner, the press forming is completed, and the press-formed article 100 of the embodiment is obtained.

As described above as the third example of the second step, in the second step, the step (a) and the step (b) may be completed at the same time. By adjusting the shape and arrangement of the dies, the step (a) and the step (b) can be completed at the same time.

In a case of performing the second step by the hot stamping, since proper quenching is performed in the second step, at the time when the movement of the dies (the press die 10 and the cam dies 21) is completed, the dies and the press-formed article 100 are preferably in close contact with each other. The press-formed article 100 obtained in the second step is subjected to a post-treatment as necessary. The obtained formed article is used in combination with another component as necessary.

The second step may be performed using a press die including a pin protruding from at least one of the upper die and the lower die of the press die (the same is applied to other embodiments). An example of the second step is schematically shown in FIG. 12.

Figure 12:
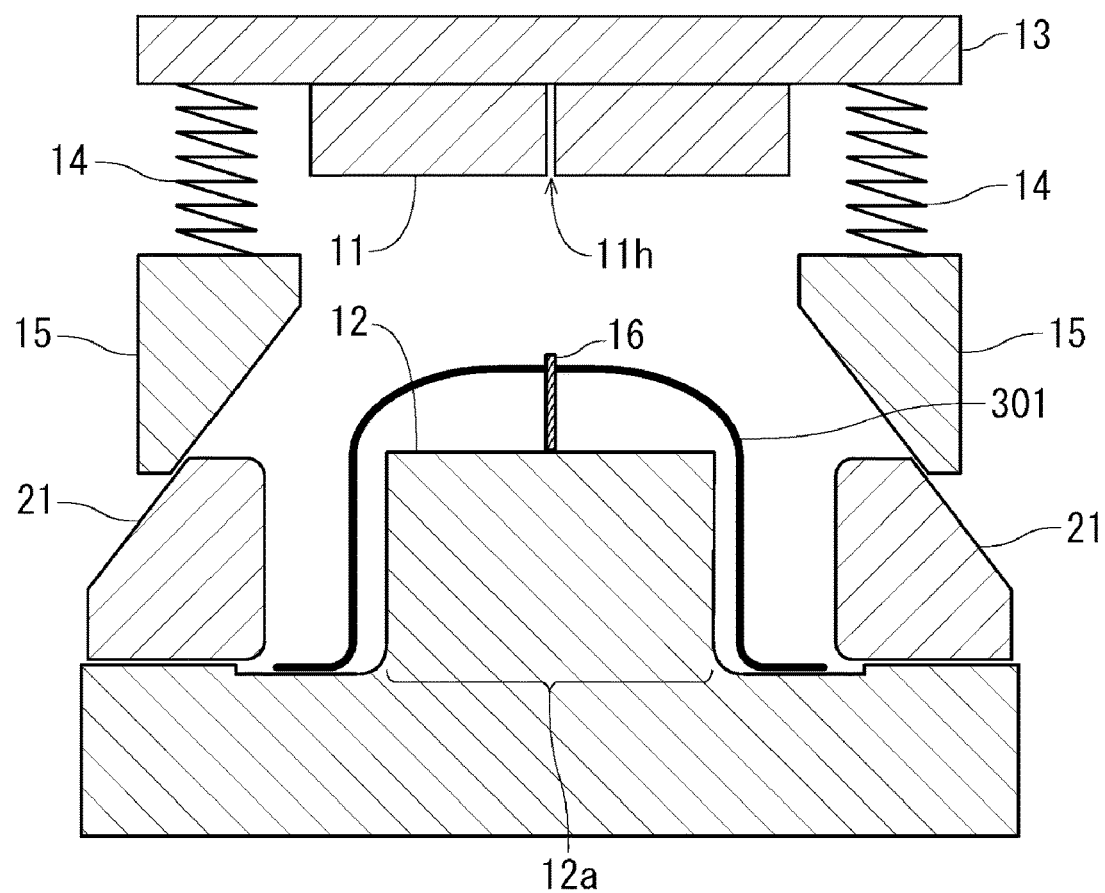
FIG. 12 is a cross-sectional view schematically showing an example of an apparatus that can be used in the manufacturing method of the embodiment.

A press die in FIG. 12 includes a pin 16 protruding from the protrusion 12a of the lower die 12. In the upper die 11, a hole 11h into which the pin 16 is inserted when the upper die 11 is lowered is formed. The pin 16 is inserted into a through-hole formed in the preliminary formed article 301. By performing press forming of the second step in this state, the protrusion portion can be formed with high accuracy. In addition, the press die may have a mechanism in which at least a portion of the pin 16 is accommodated in the lower die 12 when the pin 16 is pressed from above.

Figure 13A:
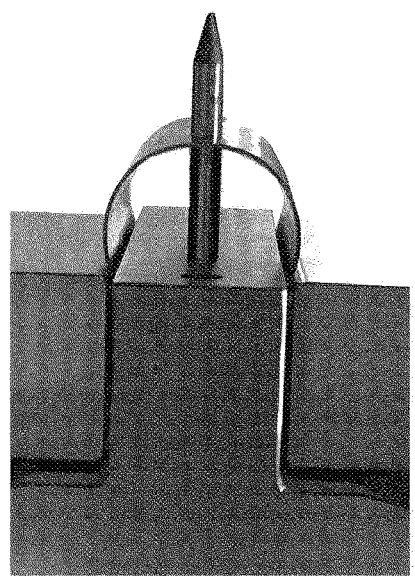
FIG. 13A is a photograph showing a step of an example in which the press-formed article of the embodiment is actually manufactured.
Figure 13B:
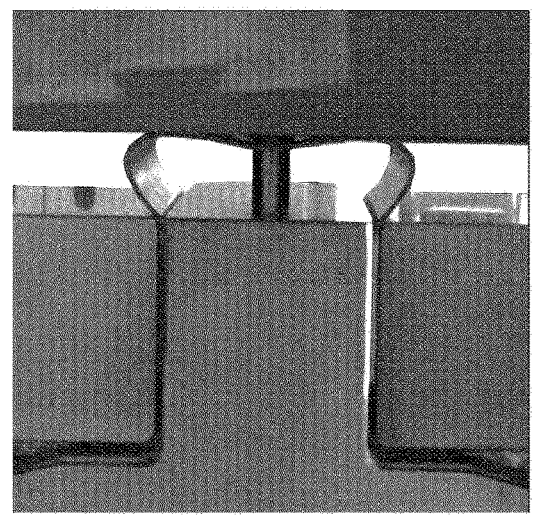
FIG. 13B is a photograph showing a step subsequent to the step in FIG. 13A.
Figure 13C:
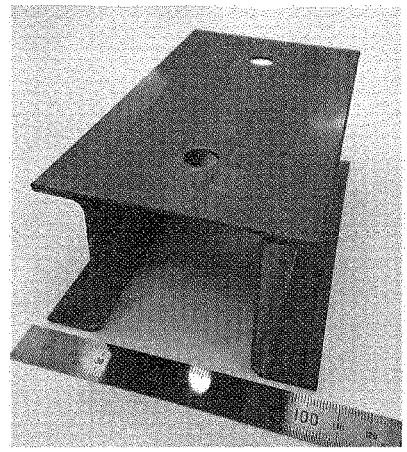
FIG. 13C is a photograph of a press-formed article manufactured by the manufacturing method including the steps shown in FIGS. 13A and 13B.

The press-formed article 100 was actually manufactured according to the manufacturing method described above. Specifically, the press-formed article 100 was manufactured by using the apparatus including the pin 16 shown in FIG. 12. Photographs during manufacturing are shown in FIGS. 13A to 13C. FIGS. 13A and 13B are photographs of steps corresponding to the steps shown in FIGS. 10B and 10C, respectively.

FIG. 13C is a photograph of a manufactured press-formed article. The press-formed article shown in FIG. 13C was manufactured using a 1500 MPa grade base steel sheet (thickness 1.4 mm). The second step is performed by hot stamping.

When the press-formed article is manufactured from a 590 MPa grade base steel sheet (thickness 1.4 mm) without hot stamping, a formed article having the same shape as that of the press-formed article in FIG. 13C could be manufactured. This is because the ductility of the base steel sheet (blank) is high.

When a 590 MPa grade base steel sheet is to be formed without hot stamping, the base steel sheet can be processed in a case of a steel sheet having high ductility. However, in a case where the ductility of the steel sheet is low, cracking occurs and the base steel sheet cannot be processed. The ductility of the base steel sheet is preferably 35% or more in a tension test with a gauge length of 50 mm. When the ductility of the base steel sheet is in the range, it is possible to perform close bending for forming the protrusion portion with a desired shape.

In a case where the angle X of the protrusion portion of the press-formed article is larger than 90° and equal to or less than 135°, in order to obtain a target strength by increasing the cooling rate of the protrusion portion of the press-formed article, it is preferable to form the standing wall portions using the cam dies 21 after forming the top sheet portion using the upper die 11.

[Manufacturing Method Using Single Step]

Another example of the manufacturing method including the first step and the second step described above will be described below. According to the manufacturing method of the example, it is possible to perform the first step and the second step using a single apparatus.

In the manufacturing method, the first step and the second step are performed using a pressing apparatus including an upper die, a lower die, and two movable dies which are movable in a vertical direction and a horizontal direction. The lower die includes a punch die, and two movable plates which are disposed with the punch die interposed therebetween and can move at least in the vertical direction. In addition, the first step includes a step (Ia) and a step (Ib) described below in this order, and the second step includes a step (IIa) and a step (IIb) described below in this order.

Here, the vertical direction and the horizontal direction as directions in which the movable dies are movable, include not only one direction of a simple vertical direction and one direction of a simple horizontal direction, but also an oblique direction in which both the vertical direction and the horizontal direction overlap.

In addition, a step of heating the base steel sheet before the first step is included.

The step (Ia) is a step of disposing the base steel sheet between the upper die, the two movable dies, and the lower die in a state where the punch die and the base steel sheet are not in contact with each other.

The step (Ib) is a step of lowering the two movable dies together with the two movable plates and moving the two movable dies toward the punch die, thereby obtaining a deformed steel sheet in a state where two flange portion equivalent portions are interposed between the two movable dies and the movable plates, or a step of by lowering the two movable dies together with the two movable plates and moving the two movable dies toward the punch die to cause the end portion of the base steel sheet to approach the punch die, thereby obtaining a deformed steel sheet.

The step (IIa) is a step of further moving the two movable dies toward the punch die, thereby restraining two standing wall portion equivalent portions by the two movable dies and the side surface portions of the punch die while a state where the upper surface portion of the punch die and the deformed steel sheet are not in contact with each other is maintained.

The step (IIb) is a step of pressing the top sheet portion equivalent portion against the upper die and the punch die by lowering the upper die, and overlapping at least a portion of the protrusion portion equivalent portion between the upper die and the movable dies, thereby forming the press-formed article (P).

In the manufacturing method of the following embodiment, a through-hole may be formed in the top sheet portion equivalent portion. In addition, in the second step, by causing a pin protruding from the press die to pass through the through-hole, the movement of the top sheet portion equivalent portion may be suppressed. The pin usually protrudes any one of the upper die and the lower die of the press die.

The other one of the press die, a through-hole through the pin passes is formed. The through-hole is generally formed in a stage of the blank, but may also be formed in another stage before the second step. Even in the first step, the movement of the blank may be suppressed by causing the pin to pass through the through-hole.

Hereinafter, the embodiments of the present invention will be described with reference to the drawings. The embodiments described below are examples, the present invention is not limited to the following embodiments, and various variations described above can be applied. In the following description, like elements are denoted by like reference numerals, and overlapping descriptions will be omitted.

Furthermore, in the following drawings, for ease of understanding, there are cases where a gap between the steel sheets overlapping at the overlapping portion is shown. However, the steel sheets overlapping at the overlapping portion are preferably in close contact with each other.

Fifth Embodiment

In the fifth embodiment, an example of a manufacturing method by a single step for manufacturing a press-formed article (P) will be described. The manufacturing method includes the steps (Ia), (Ib), (IIa), and (IIb) described above. The press-formed article (P) manufactured by the manufacturing method includes two flange portions. Therefore, a deformed steel sheet includes two flange portion equivalent portions which are to become the two flange portions.

In the manufacturing method, the first step and the second step are performed by a single pressing apparatus. Therefore, in a case where press forming is performed by hot stamping, the base steel sheet (blank) needs to be heated before the first step.

Figure 23A:
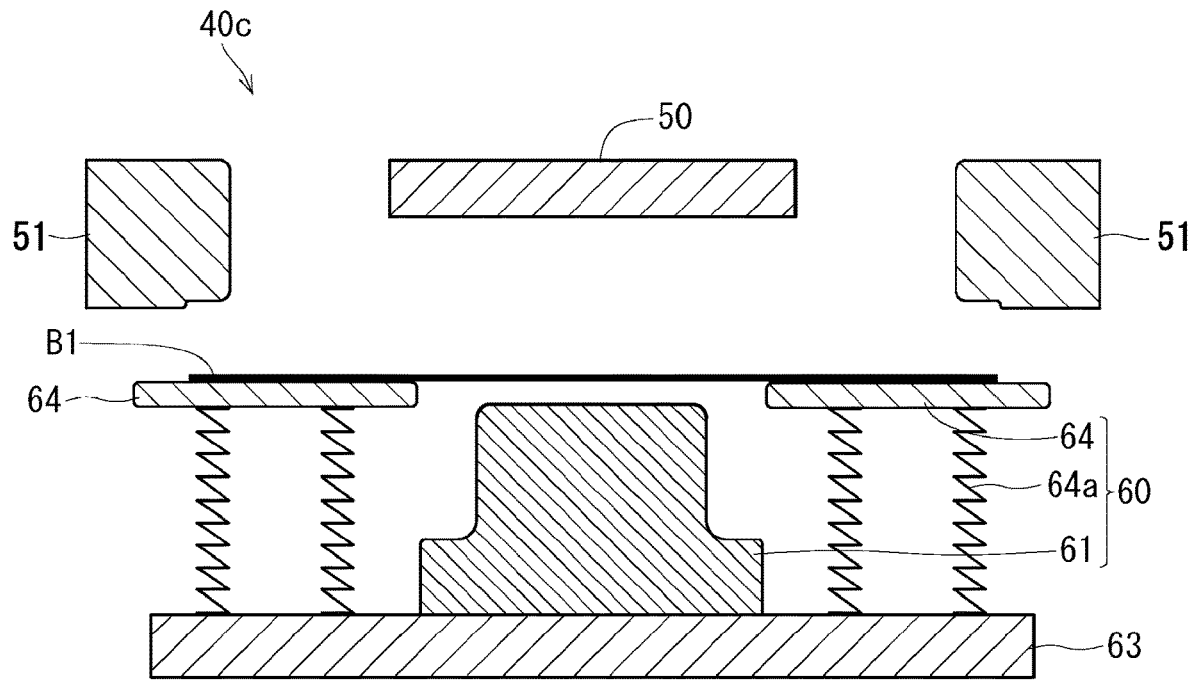
FIG. 23A is a cross-sectional view schematically showing a step in another example of the manufacturing method of the embodiment.
Figure 23B:
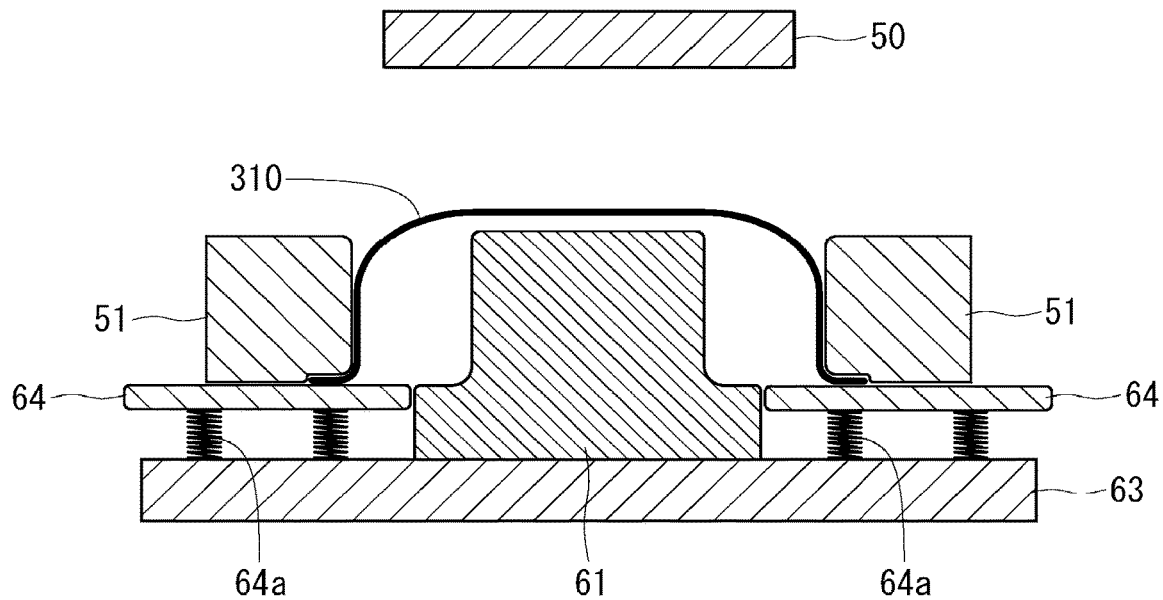
FIG. 23B is a cross-sectional view schematically showing a step subsequent to the step in FIG. 23A.

An example of the pressing apparatus used in the manufacturing method is shown in FIG. 23A. A pressing apparatus 40c in FIG. 23A includes an upper die 50, a lower die 60, two movable dies 51, and a plate 63. The two movable dies 51 can move in each of the vertical direction and the horizontal direction. The lower die 60 includes a punch die 61, and two movable plates 64 which are disposed with the punch die 61 interposed therebetween and can move in the vertical direction. In addition, FIG. 23A shows an example in which the movable plates 64 are connected to the plate 63 via extension and contraction mechanisms 64a. As the extension and contraction mechanism 64a, a mechanism exemplified by an extension and contraction mechanism 61b can be used. The movable plates 64 can be moved independently of the movable dies 51 by a driving device directly attached to the movable plates 64.

An example of a manufacturing process for manufacturing the press-formed article (P) using the pressing apparatus 40c will be described below. First, as shown in FIG. 23A, a base steel sheet B1 is disposed between the upper die 50, the movable dies 51, and the lower die 60 (step (Ia)). The base steel sheet B1 has a top sheet portion equivalent portion at the center, and includes protrusion portion equivalent portions, standing wall portion equivalent portions, and flange portion equivalent portions on both sides in this order. In the step (Ia), as shown in FIG. 23A, it is important to dispose the base steel sheet B1 between the upper die 50, the two movable dies 51, and the lower die 60 in a state where the punch die 61 and the base steel sheet B1 are not in contact with each other.

Next, as shown in HG 23B, the two movable dies 51 are lowered to cause the two flange portion equivalent portions to be interposed between the two movable dies 51 and the movable plates 64, the two movable dies 51 are further lowered together with the two movable plates 64, and the two movable dies 51 are moved toward the punch die 61, thereby obtaining a deformed steel sheet 310 (step (Ib)). At this time, the two flange portion equivalent portions are in a state of being interposed between the two movable dies 51 and the movable plates 64.

Furthermore, it is preferable that the state where the upper surface portion of the punch die 61 and the deformed steel sheet 310 are not in contact with each other is maintained.

In the subsequent second step, by lowering the upper die 50, the top sheet portion equivalent portion is pressed by the upper die 50 and the punch die 61, and at least a portion of the protrusion portion equivalent portion is overlapped between the upper die 50 and the movable dies 51 to form the protrusion portion 115. An example of the second step will be described below.

Figure 23C:
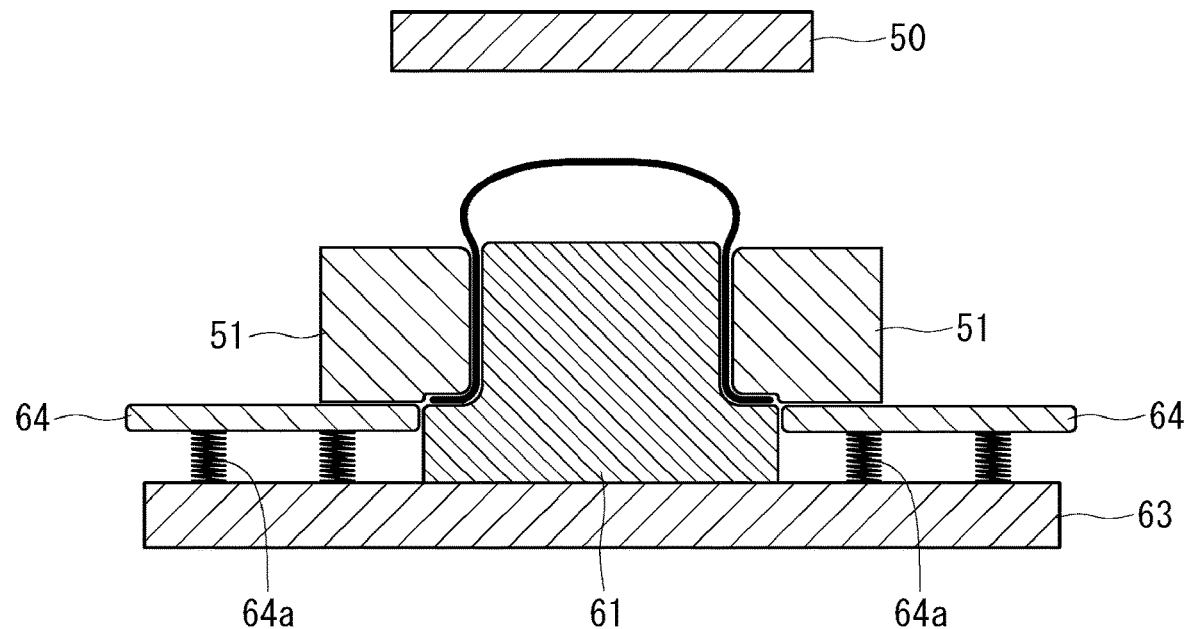
FIG. 23C is a cross-sectional view schematically showing a step subsequent to the step in FIG. 23B.

First, as shown in FIG. 23C, by further moving the two movable dies 51 toward the punch die 61, the two standing wall portion equivalent portions are restrained by the two movable dies 51 and the side surface portions of the punch die 61 (step (IIa)). By this step, the standing wall portion equivalent portions are restrained at predetermined positions. At this time, the two flange portion equivalent portions (flange portions) are moved from above the movable plates 64 onto the punch die 61 as the movable dies 51 move. At this time, it is preferable that the state where the upper surface portion of the punch die 61 and the deformed steel sheet 310 are not in contact with each other is maintained.

As shown in FIG. 23C, the punch die 61 includes portions (stepped portions) having a shape corresponding to the flange portion. During the step (IIa), the portions and the movable plates 64 are made substantially flush with each other. In the step (IIa), the flange portion equivalent portions transition from the state of being disposed between the movable dies 51 and the movable plates 64 to a state of being disposed between the movable dies 51 and the punch die 61. It is preferable that the distance between the two with the flange portion equivalent portion interposed therebetween is a length larger than the sheet thickness of the flange portion equivalent portion by about 0.1 to 0.3 mm. With such a configuration, smooth movement in the horizontal direction becomes possible.

Figure 23D:
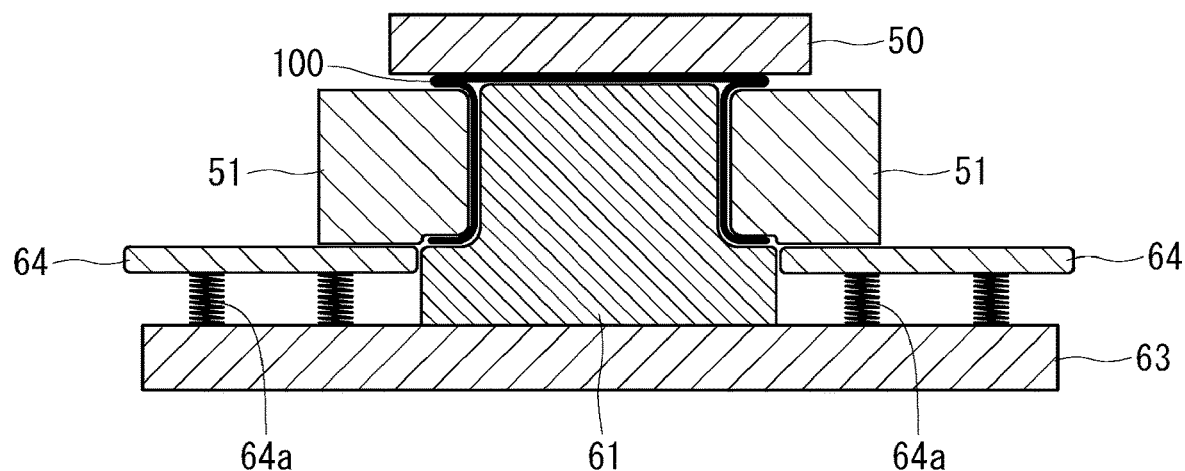
FIG. 23D is a cross-sectional view schematically showing a step subsequent to the step in FIG. 23C.

Next, as shown in FIG. 23D, by lowering the upper die 50, the top sheet portion equivalent portion is pressed by the upper die 50 and the punch die 61, and at least a portion of the protrusion portion equivalent portion is overlapped between the upper die 50 and the movable dies 51, thereby forming the press-formed article 100 (step (IIb)).

In the step (IIa), the two movable dies 51 are lowered to cause the two flange portion equivalent portions to be interposed between the two movable dies 51 and the movable plates 64, and the two movable dies 51 are further lowered to the bottom dead point. Thereafter, by moving the two movable dies 51 in the horizontal direction, the two standing wall portion equivalent portions are restrained by the two movable dies 51 and the punch die 61 (see FIG. 23C).

On the other hand, the two movable dies 51 may be lowered to cause the two flange portion equivalent portions to be interposed between the two movable dies 51 and the movable plates 64, and thereafter the two movable dies 51 may be moved in an oblique direction to restrain the two standing wall portion equivalent portions to be restrained by the two movable dies 51 and the punch die 61 (see FIG. 23C).

Figure 23E:
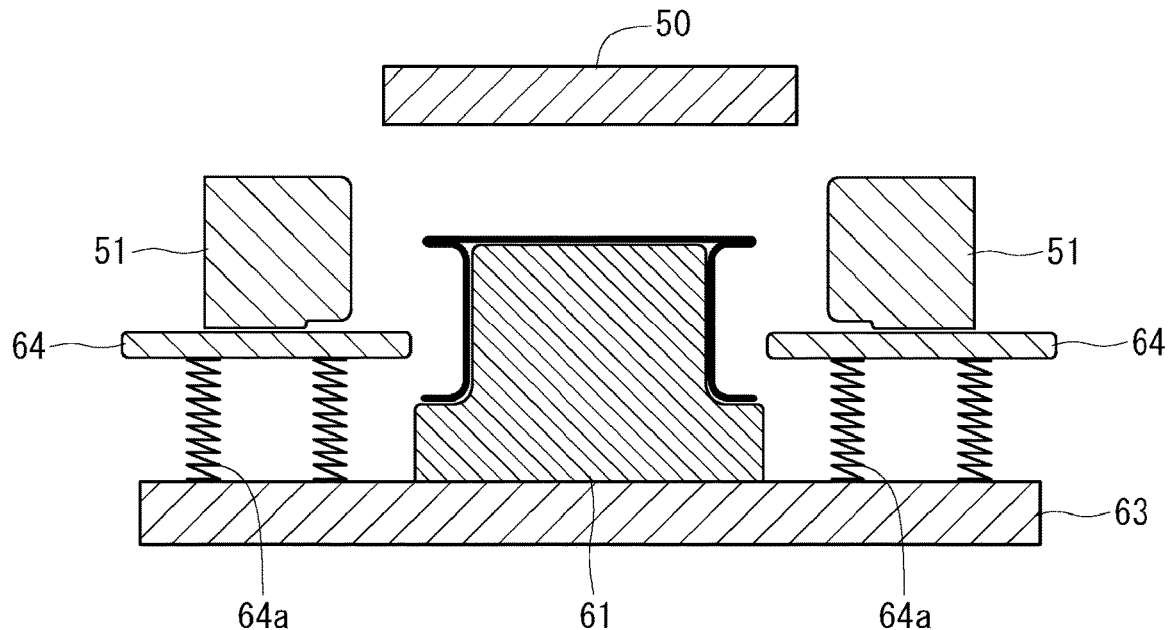
FIG. 23E is a cross-sectional view schematically showing a step subsequent to the step in FIG. 23D.

Next, as shown in FIG. 23E, the movable dies 51, the movable plates 64, and the upper die 50 are raised after moving the movable dies 51 in the horizontal direction until the movable dies 51 are separated from the protrusion portions. In addition, the press-formed article 100 is unloaded from the pressing apparatus 40c. In the manufacturing method using the pressing apparatus 40c, the movable dies 51 and the movable plates 64 can be raised at the same time. Therefore, it is possible to reduce the time needed for the manufacturing.

In the example described with reference to FIGS. 23A to 23E, the entire flange portion equivalent portions (for the flange portions) are disposed on the punch die 61 in the step (IIa) and the step (IIb). Hereinafter, an example in which at least a portion of the flange portion equivalent portions (or the flange portions) is disposed on the movable plate 64 in the step (IIa) and the step (IIb) will be described.

A manufacturing process of this example is shown in FIGS. 24A to 24E. For parts similar to the example described with reference to FIGS. 23A to 23E, overlapping descriptions will be omitted in some cases.

Figure 24A:
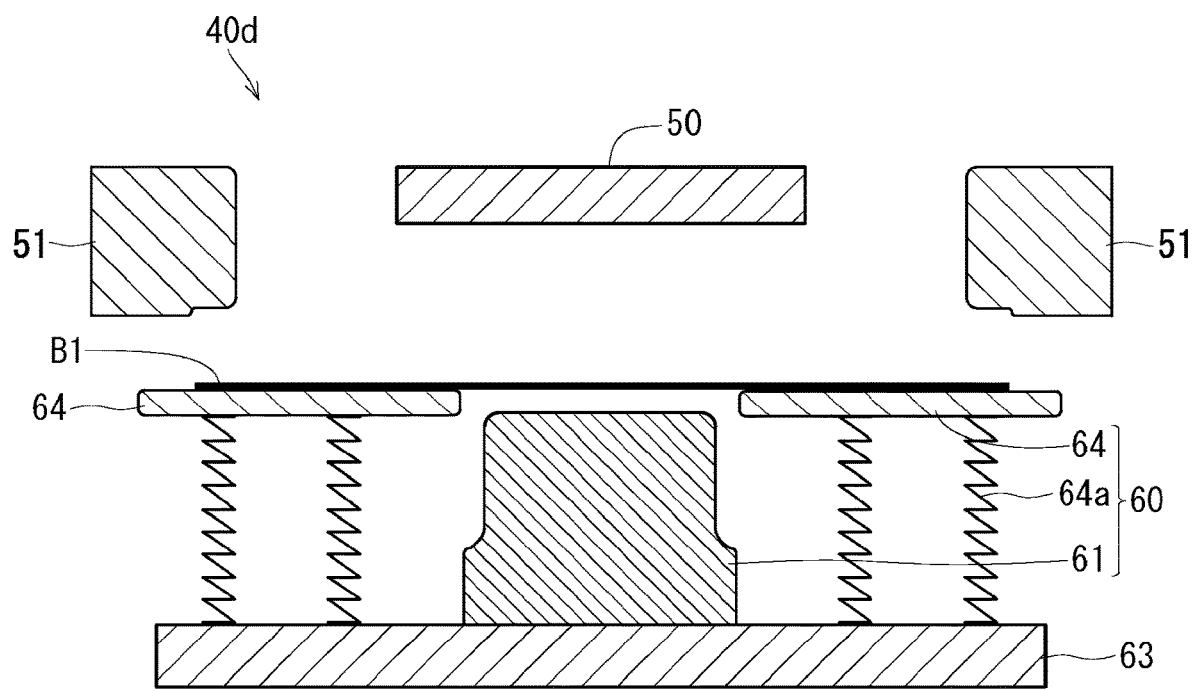
FIG. 24A is a cross-sectional view schematically showing a step in another example of the manufacturing method of the embodiment.
Figure 24B:
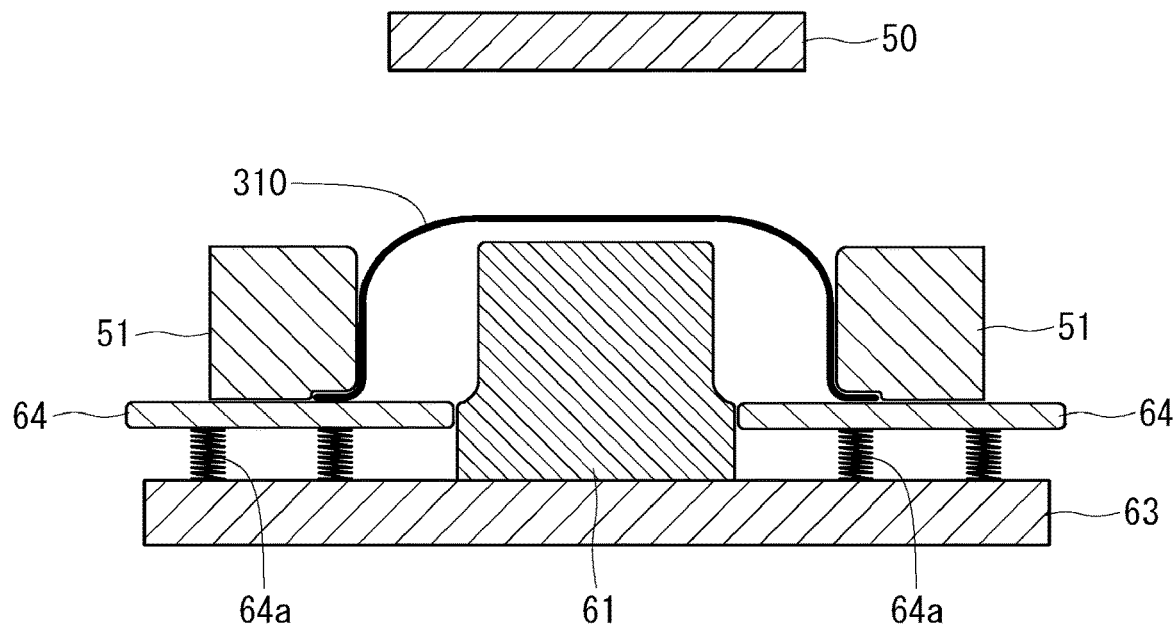
FIG. 24B is a cross-sectional view schematically showing a step subsequent to the step in FIG. 24A.

An example of a pressing apparatus used in the manufacturing method is shown in FIG. 24A. A pressing apparatus 40d in FIG. 24A is different from the pressing apparatus 40c shown in FIG. 23A in the shape of the punch die 61 and the length of the movable plate 64. The punch die 61 of the pressing apparatus 40d is not shaped to take the entire flange portion equivalent portions (or the flange portions), and the movable plates 64 are correspondingly lengthened.

An example of a manufacturing process for manufacturing the press-formed article (P) using the pressing apparatus 40d will be described below. First, as shown in FIG. 24A, the base steel sheet B1 is disposed between the upper die 50, the movable dies 51, and the lower die 60 (step (Ia)).

Next, as shown in HG 24B, in a state where the two flange portion equivalent portions are interposed between the two movable dies 51 and the movable plates 64 by lowering the two movable dies 51, the deformed steel sheet 310 is obtained (step (Ib)).

In the subsequent second step, by lowering the upper die 50, the top sheet portion equivalent portion is pressed by the upper die 50 and the punch die 61, and at least a portion of the protrusion portion equivalent portion is overlapped between the upper die 50 and the movable dies 51 to form the protrusion portion 115. An example of the second step will be described below.

Figure 24C:
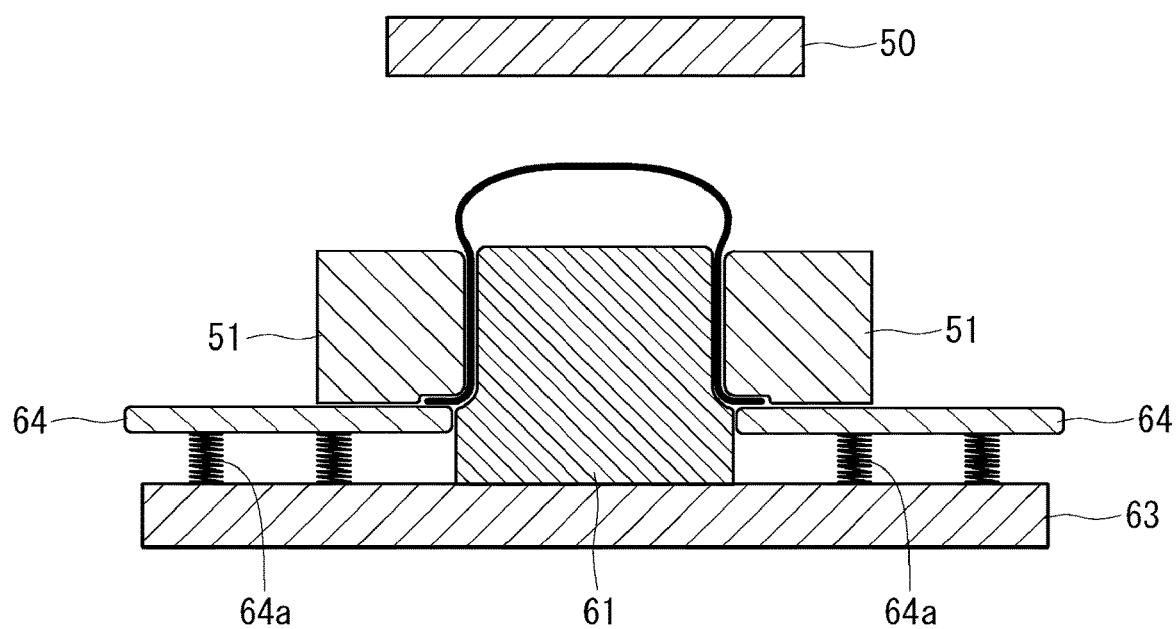
FIG. 24C is a cross-sectional view schematically showing a step subsequent to the step in FIG. 24B.

First, as shown in FIG. 24C, by further moving the two movable dies 51 toward the punch die 61, the two standing wall portion equivalent portions are restrained by the two movable dies 51 and the side surface portions of the punch die 61 (step (IIa)). By this step, the standing wall portion equivalent portions are restrained at predetermined positions. In this manufacturing method, unlike the manufacturing method shown in FIG. 23C, the two flange portion equivalent portions (the flange portions) are still present on the movable plates 64.

Figure 24D:
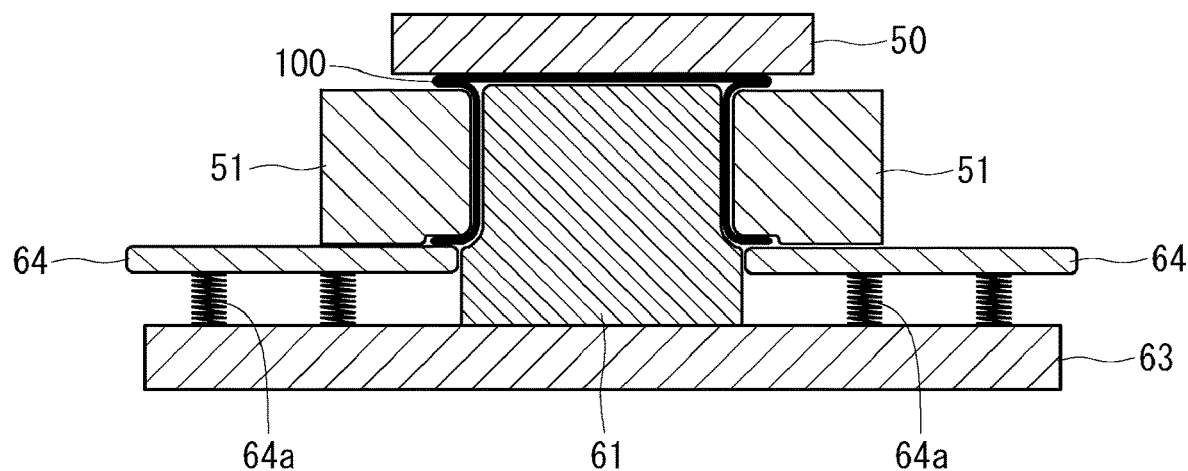
FIG. 24D is a cross-sectional view schematically showing a step subsequent to the step in FIG. 24C.

Next, as shown in FIG. 24D, by lowering the upper die 50, the top sheet portion equivalent portion is pressed by the upper die 50 and the punch die 61, and at least a portion of the protrusion portion equivalent portion is overlapped between the upper die 50 and the movable dies 51, thereby forming the press-formed article 100 (step (IIb)).

Figure 24E:
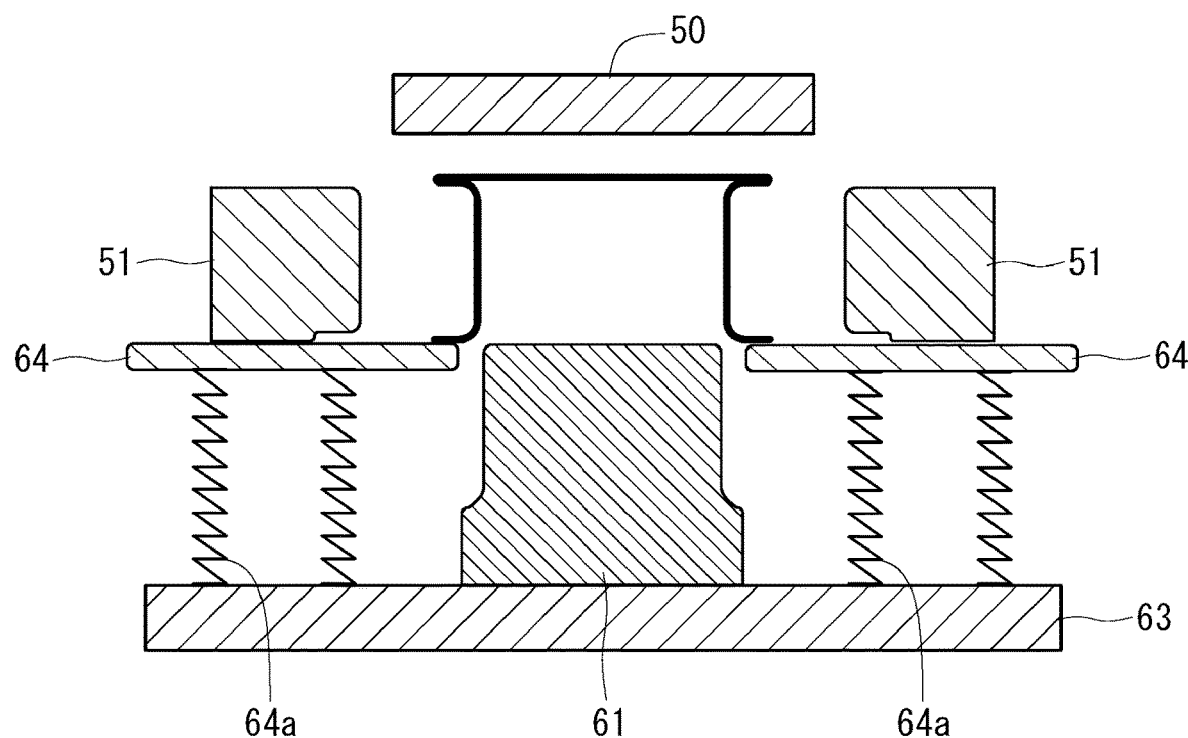
FIG. 24E is a cross-sectional view schematically showing a step subsequent to the step in FIG. 24D.

Next, as shown in FIG. 24E, the upper die 50, the movable dies 51, and the movable plates 64 are raised. In addition, the movable dies 51 are moved in the horizontal direction. In this manufacturing method, since the press-formed article 100 is raised as the movable plates 64 are raised, the upper die 50, the movable dies 51, and the movable plates 64 can be raised at the same time. In this manufacturing method using the pressing apparatus 40d, it is possible to further reduce the time needed for the manufacturing.

In the step (IIa), the two movable dies 51 are lowered to cause the two flange portion equivalent portions to be interposed between the two movable dies 51 and the movable plates 64, and the two movable dies 51 are further lowered to the bottom dead point. Thereafter, by moving the two movable dies 51 in the horizontal direction, the two standing wall portion equivalent portions are restrained by the two movable dies 51 and the punch die 61 (see FIG. 24C).

On the other hand, the two movable dies 51 may be lowered to cause the two flange portion equivalent portions to be interposed between the two movable dies 51 and the movable plates 64, and thereafter the two movable dies 51 may be moved in an oblique direction to restrain the two standing wall portion equivalent portions to be restrained by the two movable dies 51 and the punch die 61 (see FIG. 24C).

Sixth Embodiment

In a sixth embodiment, another example of a manufacturing method by a single step for manufacturing the press-formed article (P) will be described. In this manufacturing method, the basic procedure and the like are the same as those in the fifth embodiment, but the press-formed article (P) manufactured by this manufacturing method does not include two flange portions.

In the sixth embodiment, in the step (Ib), by lowering the two movable dies and the two movable plates simultaneously and moving the two movable dies toward the punch die, the end portion of the base steel sheet is caused to approach the punch die, thereby obtaining a deformed steel sheet. At this time, it is preferable that the state where the upper surface portion of the punch die and the deformed steel sheet are not in contact with each other is maintained.

In the step (IIa) of restraining the two standing wall portion equivalent portions by the two movable dies and the side surface portions of the punch die, the end portion of the deformed steel sheet may be positioned on the stepped portion of the punch die (the stepped portion positioned on the lower side of the punch die 61 as in FIG. 23A and the like) or may be positioned on the movable plate.

In a case of employing a configuration in which the end portion of the deformed steel sheet is positioned on the stepped portion of the punch die, after press forming, the movable dies and the movable plates can be raised at the same time. Therefore, it is possible to reduce the time needed for the manufacturing. In a case of employing a configuration in which the end portion of the deformed steel sheet is positioned on the movable plate, the press-formed article is raised as the movable plate is raised, so that the upper die, the movable dies, and the movable plates can be raised at the same time. Therefore, it is possible to further reduce the time needed for the manufacturing.

EXAMPLES

The present invention will be explained in more detail by the following examples.

Example 1

In Example 1, a simulation of a three-point bending test was conducted on a structural member using the press-formed article (hot-stamping formed article) of the embodiment and an article in the related art. For the simulation, a general-purpose finite element method (FEM) software (manufactured by LIVERMORE SOFTWARE TECHNOLOGY CORPORATION, trade name LS-DYNA) was used.

Figure 14A:
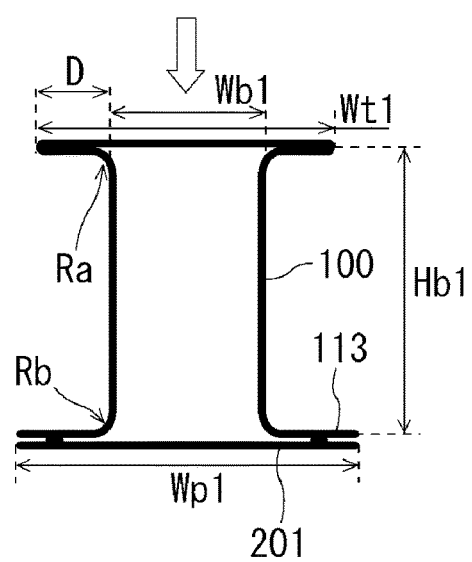
FIG. 14A is a cross-sectional view schematically showing the shape of a sample 1 used in Example 1.

A cross-sectional view of a sample 1 used for the simulation as the structural member according to the embodiment is schematically shown in FIG. 14A. The structural member in FIG. 14A is constituted by the press-formed article 100 of the embodiment and the back sheet 201 welded to the flange portions 113 thereof. The size of the sample 1 shown in FIG. 14A is as follows. However, the thickness of the steel sheet is not considered in the size described below.

Angle X: 180°
Angle Y: 90°
Length D of the protrusion portion: 15 mm
Height Hb1 of the standing wall portion: 60 mm Width Wt1 between the tip end portions of the two protrusion portions: 80 mm Distance (width of top sheet portion) Wb1 between the two standing wall portions: 50 mm (80-2D)

Width Wp1 of the back sheet: 90 mm (120-2D)

Radius of curvature at corner portions Ra and Rb: 5 mm

Length in the longitudinal direction: 1000 mm

Figure 14B:
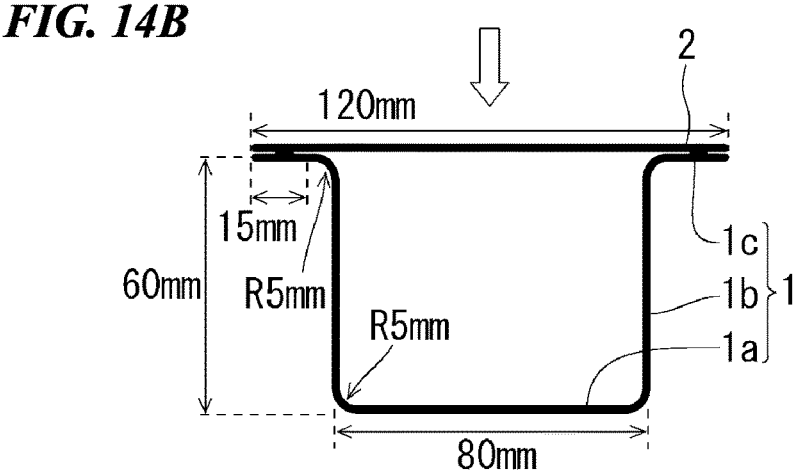
FIG. 14B is a cross-sectional view schematically showing the shape of a sample 2 used in Example 1.
Figure 14C:
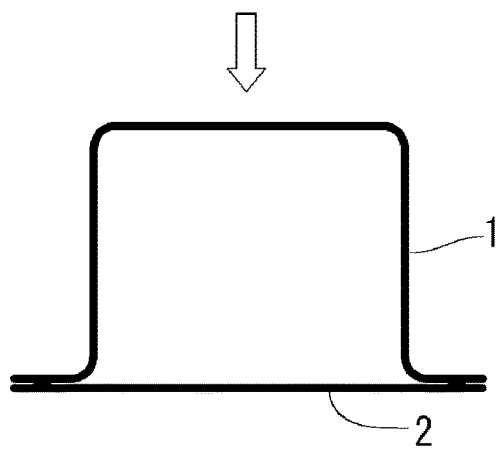
FIG. 14C is a cross-sectional view schematically showing the shape of a sample 3 used in Example 1.

Cross-sectional views of a sample 2 and a sample 3 used in the simulation as structural members in examples of the related art are schematically shown in FIGS. 14B and 14C. The sample 2 shown in FIG. 14B is constituted by a press-formed article 1 having a hat-shaped cross section and a back sheet 2 welded to flange portions 1c thereof. The press-formed article 1 is constituted by a top sheet portion 1a, standing wall portions 1b, and flange portions 1c. The size of the sample 2 shown in FIG. 14B is as follows.

Width of the top sheet portion 1a: 80 mm

Height of the standing wall portion 1b: 60 mm

Width of the back sheet 2: 120 mm

Radius of curvature at corner portions: 5 mm

Length in the longitudinal direction: 1000 mm

The sample 2 and the sample 3 have exactly the same structure and are different only in arrangement. Specifically, in the sample 2, the back sheet 2 side is disposed on the upper side (impactor side), and in the sample 3, the top sheet portion 1a side is disposed on the upper side (impactor side). Hereinafter, the arrangement in which the back sheet side is disposed on the upper side (the arrangement of the sample 2) is referred to as an inverted hat arrangement. Furthermore, the arrangement in which the top sheet portion side is disposed on the upper side (the arrangement of the sample 3) is referred to as a positive hat arrangement.

As will be described later, a collision that occurs in an actual structural member mainly occurs in the positive hat arrangement. Therefore, a comparative example of the sample 1 (example of the present invention) of the embodiment is the sample 3 having the positive hat arrangement, and the sample 2 having the inverted hat arrangement is described as a reference example.

It was assumed that the samples 1 to 3 are formed of a steel sheet having a thickness of 1.4 mm and a tensile strength of 1500 MPa. It was assumed that the flange portions of the press-formed article and the back sheet were spot-welded and fixed to each other at a pitch of 40 mm. The samples 1 to 3 were designed so that the mass per unit length in the longitudinal direction was the same.

Figure 15:
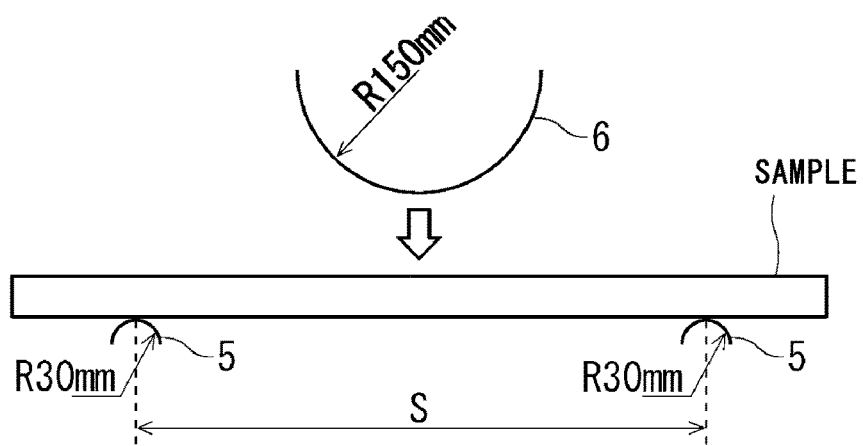
FIG. 15 is a view schematically showing a three-point bending test simulated in examples.

A method of the three-point bending test using the simulation is schematically shown in FIG. 15. The three-point bending test was conducted by placing the sample on two fulcrums 5 and pressing the sample from above by an impactor 6. In the test of Example 1, the distance S between the two fulcrums 5 was set to 400 mm or 700 mm. The radius of curvature of the fulcrum 5 was set to 30 mm. The radius of curvature of the impactor 6 was set to 150 mm. The collision speed of the impactor 6 was set to 7.5 km/h.

In the three-point bending test, the impactor 6 was caused to collide with each sample from above. Specifically, six kinds of tests shown in Table 1 below were conducted. The collision direction of the impactor 6 is indicated by arrows in FIGS. 14A to 14C.

TABLE 1

| | Fulcrum-to-fulcrum distance S (mm) | Sample | Collision position of impactor |
|---|---|---|---|
| Test 1-1 | 400 | Sample 1 (Example of invention) | Top sheet portion side (positive hat arrangement) |
| Test 1-2 | | Sample 2 (Reference example) | Back sheet side (inverted hat arrangement) |
| Test 1-3 | | Sample 3 (Comparative example) | Top sheet portion side (positive hat arrangement) |
| Test 2-1 | 700 | Sample 1 (Example of invention) | Top sheet portion side (positive hat arrangement) |
| Test 2-2 | | Sample 2 (Reference example) | Back sheet side (inverted hat arrangement) |
| Test 2-3 | | Sample 3 (Comparative example) | Top sheet portion side (positive hat arrangement) |

Figure 16:
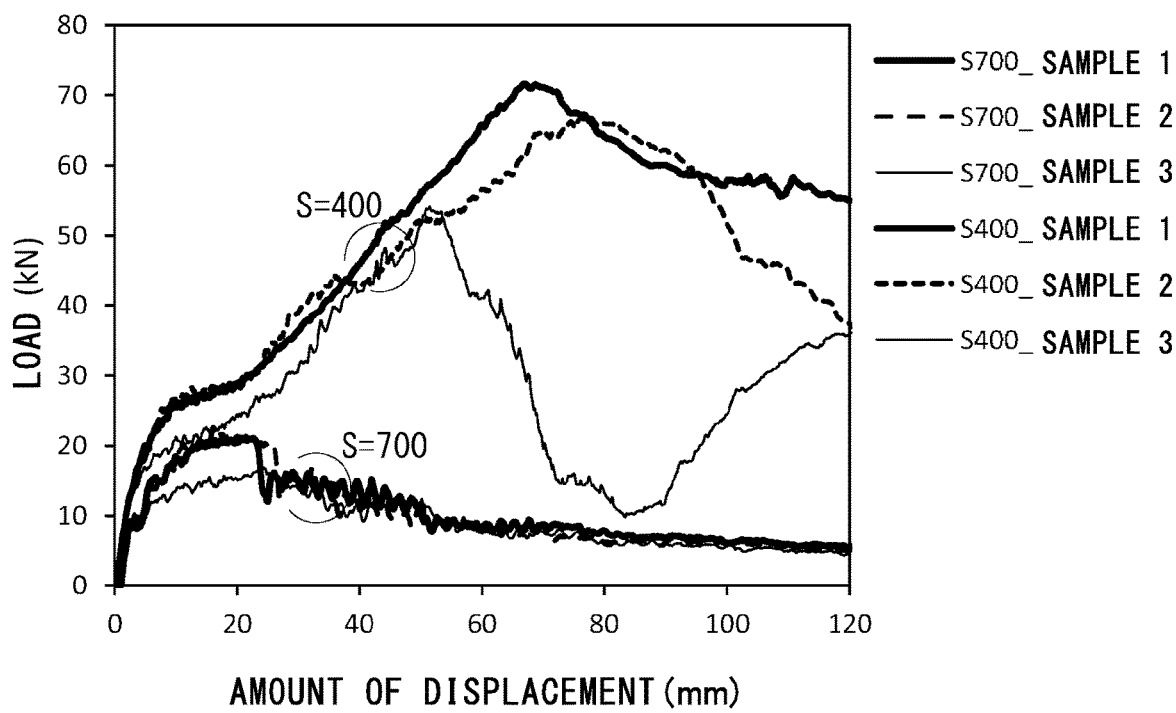
FIG. 16 is a graph showing the relationship between the amount of displacement and a load obtained by a simulation of Example 1.

The simulation result of the three-point bending test is shown in FIG. 16. In the simulation result of FIG. 16, cracking in the steel sheet and cracking in the spot-welding portions are not considered. As shown in FIG. 16, in a case where the fulcrum-to-fulcrum distance S was 400 mm, the sample 1 (present invention) exhibited characteristics equal to or higher than those of the sample 2 having the inverted hat arrangement.

The result of a test 1-3 (S=400 mm) indicates that local buckling had occurred in the sample 3 having the positive hat arrangement when the amount of displacement was around 50 mm. In the case where the fulcrum-to-fulcrum distance S was 400 mm, the sample 1 exhibited good characteristics compared to the sample 3 having the positive hat arrangement. Similarly, even in a case where the fulcrum-to-fulcrum distance S was 700 mm, the sample 1 exhibited good characteristics compared to the sample 3.

Figure 17A:
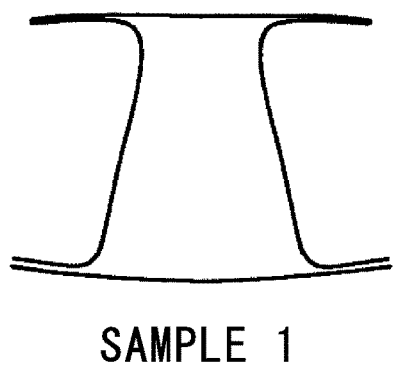
FIG. 17A is a cross-sectional view schematically showing an example of a shape change in the sample 1 in the simulation of Example 1.
Figure 17B:
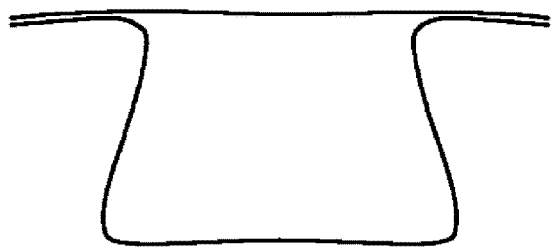
FIG. 17B is a cross-sectional view schematically showing an example of a shape change in the sample 2 in the simulation of Example 1.
Figure 17C:
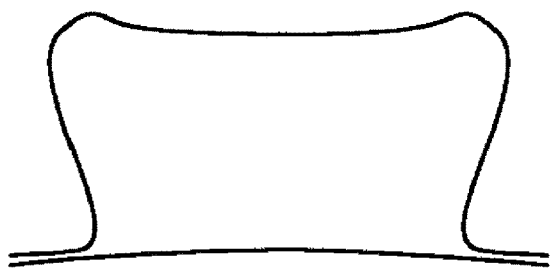
FIG. 17C is a cross-sectional view schematically showing an example of a shape change in the sample 3 in the simulation of Example 1.

In tests 1-1 to 1-3 (distance S=400 mm), the cross-sectional shape of each sample when the amount of displacement was 20 mm are show in FIGS. 17A to 17C. In the sample 1, the standing wall portions fall inward. This is because the angle X is larger than 90°. In the sample 2 having the inverted hat arrangement, the standing wall portions also fall inward. On the other hand, in the sample 3 having the positive hat arrangement, the standing wall portions fall outward. This deformation is a deformation in which the second moment of area decreases, which is considered to be a deformation in which the cross section falls and local buckling easily occurs. It is considered that local buckling occurs when the amount of displacement in the test 1-3 is about 50 mm because the standing wall portions fall outward.

Figure 18A:
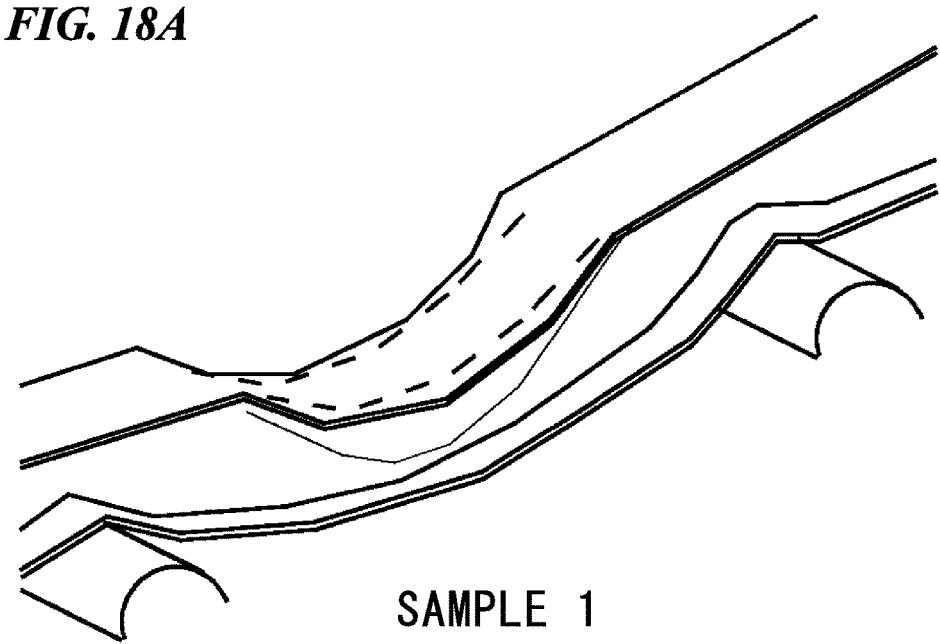
FIG. 18A is a perspective view schematically showing another example of a shape change in the sample 1 in the simulation of Example 1.
Figure 18B:
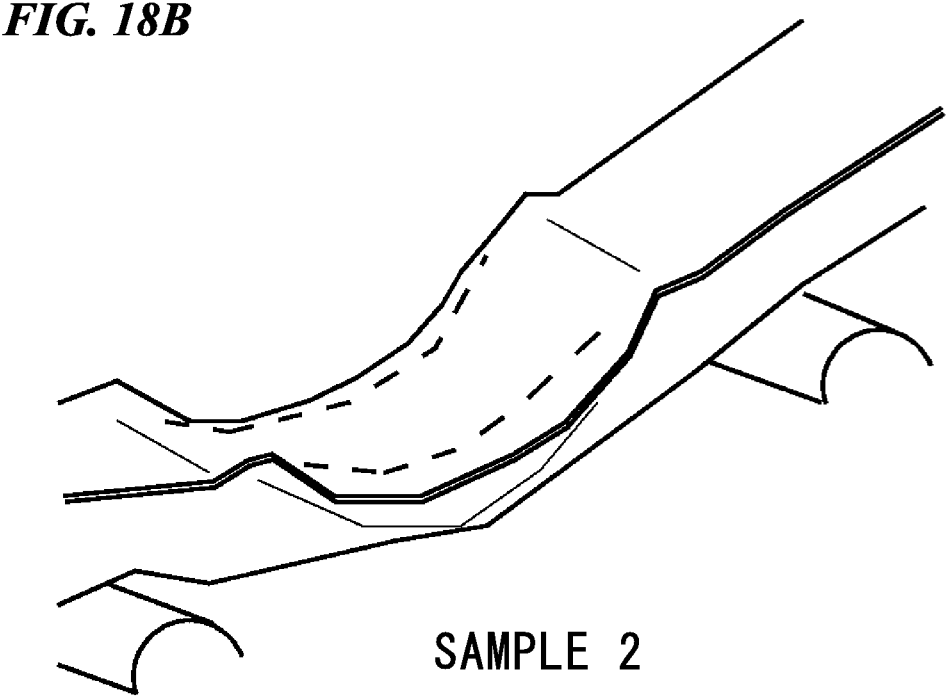
FIG. 18B is a perspective view schematically showing another example of a shape change in the sample 2 in the simulation of Example 1.
Figure 18C:
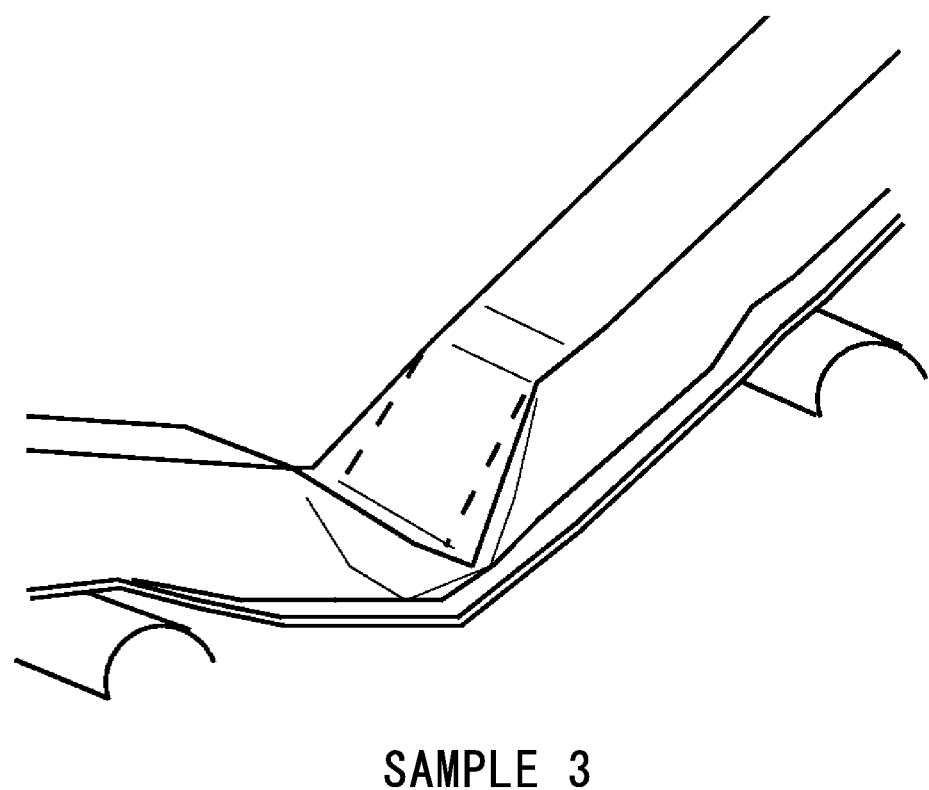
FIG. 18C is a perspective view schematically showing another example of a shape change in the sample 3 in the simulation of Example 1.

Perspective views of the samples when the amount of displacement is 70 mm in the tests 1-1 to 1-3 (distance S=400 mm) are schematically shown in FIGS. 18A to 18C. As shown in these figures, in the sample 1 having the positive hat arrangement and the sample 2 having the inverted hat arrangement, the standing wall portions are bent in a long range. Contrary to this, in the sample 3 having the positive hat arrangement, a portion of the standing wall portion is locally buckled.

Figure 19A:
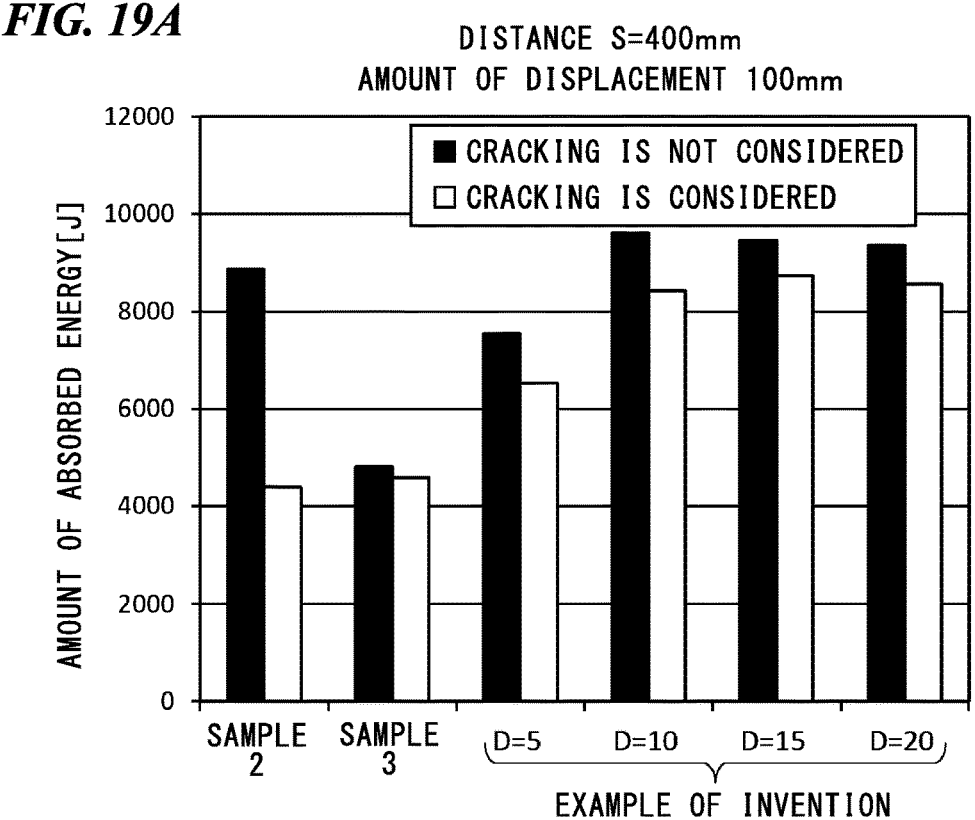
FIG. 19A is a graph schematically showing an example of the amount of absorbed energy of each sample in the simulation of Example 1.
Figure 19B:
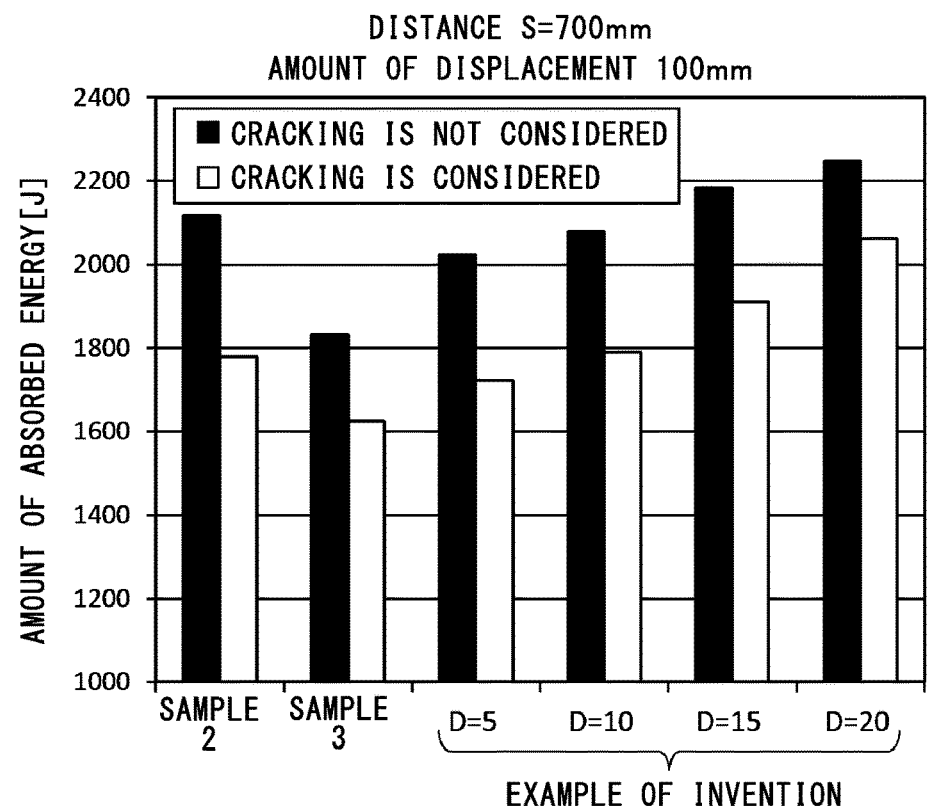
FIG. 19B is a graph schematically showing another example of the amount of absorbed energy of each sample in the simulation of Example 1.

In the tests 1-1 to 1-3 and tests 2-1 to 2-3, the amount of absorbed energy of each sample when the amount of displacement was 100 mm was obtained. The results are shown in FIGS. 19A and 19B. FIG. 19A shows the results of the tests 1-1 to 1-3 (distance S=400 mm), and FIG. 19B shows the results of the tests 2-1 to 2-3 (distance S=700 mm) A vehicle structural component having a large amount of absorbed energy means that the safety of an occupant against collision is high.

FIGS. 19A and 19B show the results in a case where the length D of the protrusion portion of the sample 1 was set to 5 mm, 10 mm, 15 mm, and 20 mm. In a case where the length D is 5 mm, only the tip end portion of the protrusion portion becomes the overlapping portion. In addition, any of the samples was designed so that the mass per unit length in the longitudinal direction is the same. Furthermore, in FIGS. 19A and 19B, simulation results in which cracking in the steel sheet and cracking in the spot-welding portions are not considered and simulation results in which such cracking is considered are also shown.

As shown in FIGS. 19A to 19B, all the samples of the present invention having the protrusion portions had a higher amount of absorbed energy compared to the sample 3 (comparative example) having the positive hat arrangement. Furthermore, the sample 1 according to the present invention exhibited higher characteristics than the sample 2 (reference example) in most cases. FIG. 19A shows that it is preferable to set the length D of the protrusion portion to 10 mm or more in the case where the fulcrum-to-fulcrum distance S is 400 mm. FIG. 19B shows that it is preferable that the length D of the protrusion portion is long in the case where the fulcrum-to-fulcrum distance S is 700 mm.

The sample of the present invention in which the length D of the protrusion portion is 10 mm exhibited energy absorption characteristics equal to or higher than those of the sample 2 having the inverted hat arrangement. Furthermore, the sample of the present invention in which the length D of the protrusion portion is 15 mm or more exhibited better energy absorption characteristics than the sample 2 having the inverted hat arrangement. FIGS. 19A and 19B show that by causing the length D of the protrusion portion to be 10 mm or more, it is possible to obtain characteristics equal to or higher than those of the sample 2 having the inverted hat arrangement.

As shown in FIGS. 19A and 19B, in the result of the sample 2 (inverted hat arrangement), the amount of absorbed energy in the case of considering the cracking in the steel sheet and in the spot weld was significantly smaller than the amount of absorbed energy in the case of not considering such cracking. The result suggests that cracking (for example, cracking in the spot-welding portion) easily occurs in a case where the impactor 6 collides from the back sheet side.

In a case where the press-formed article having a substantially hat-shaped cross section is used as a structural member for a vehicle or others, the top sheet portion side is disposed to face the outside of the body in many cases. Therefore, it is necessary to postulate that a collision at the time of an accident occurs from the top sheet portion side other than the back sheet side. From this viewpoint, even if the characteristics of the sample 2 having the inverted hat arrangement were good, it is meaningless in a case where the sample 2 is applied to an actual structural member in many cases. Therefore, characteristics against the collision from the top sheet portion side are important. In a case of a comparison in terms of a collision from the top sheet portion side, the sample 1 of the present invention exhibited excellent characteristics compared to the sample 3 having the positive hat arrangement. Therefore, the sample 1 of the present invention is very useful as a structural member.

In the sample 1 according to the present invention, as in the sample 2 having the inverted hat arrangement, the standing wall portion falls inward against the collision from the top sheet portion side. Therefore, the sample 1 has a larger amount of absorbed energy during a collision than the comparative sample 3 having the positive hat arrangement. Furthermore, in the sample 1, there is no welded portion between the back sheet and the flange portion on the postulated collision side. Therefore, in the sample 1, deterioration in the characteristics due to cracking in the welded portion is small compared to the sample 2 having the inverted hat arrangement. As described above, it is considered that the sample 1 according to the present invention has both the advantage of the inverted hat arrangement and the advantage of the positive hat arrangement.

Example 2

In Example 2, in the same manner as in Example 1, a simulation of a three-point bending test was conducted on samples in which only the angle X of the sample 1 was changed. The angle X was set to 105°, 120°, 135°, and 180°. The amount of absorbed energy of each sample when the amount of displacement was 100 mm was obtained by the simulation.

Figure 20A:
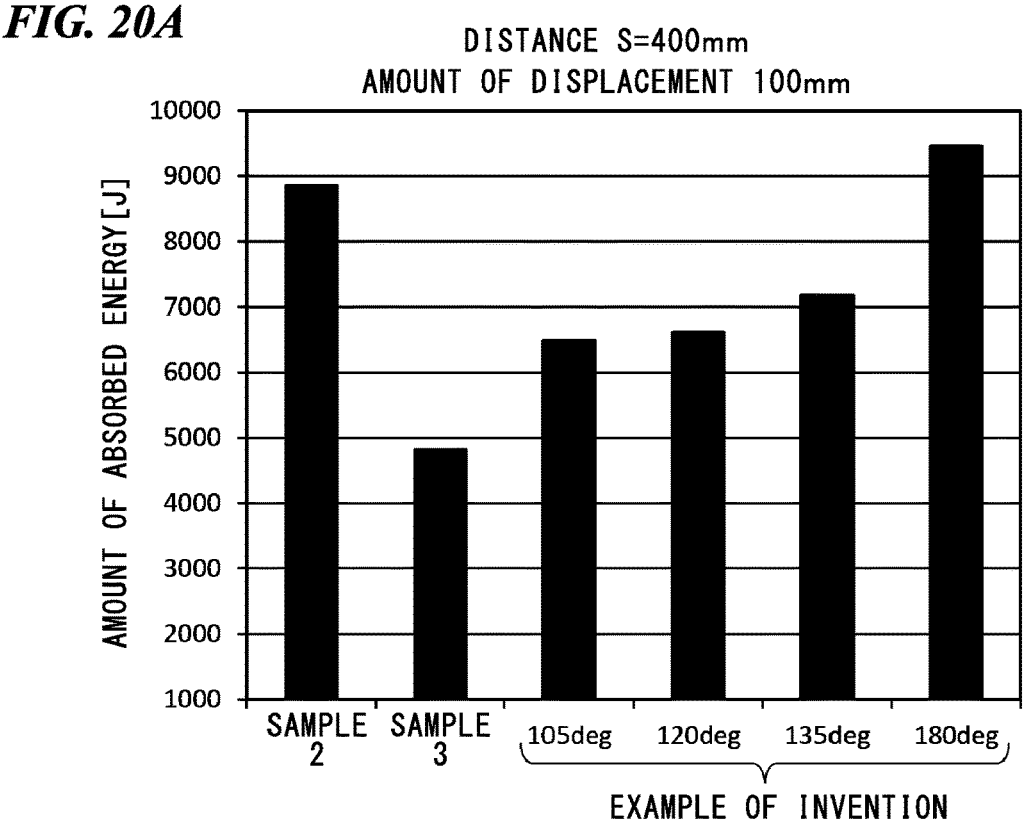
FIG. 20A is a graph schematically showing an example of the amount of absorbed energy of each sample in a simulation of Example 2.
Figure 20B:
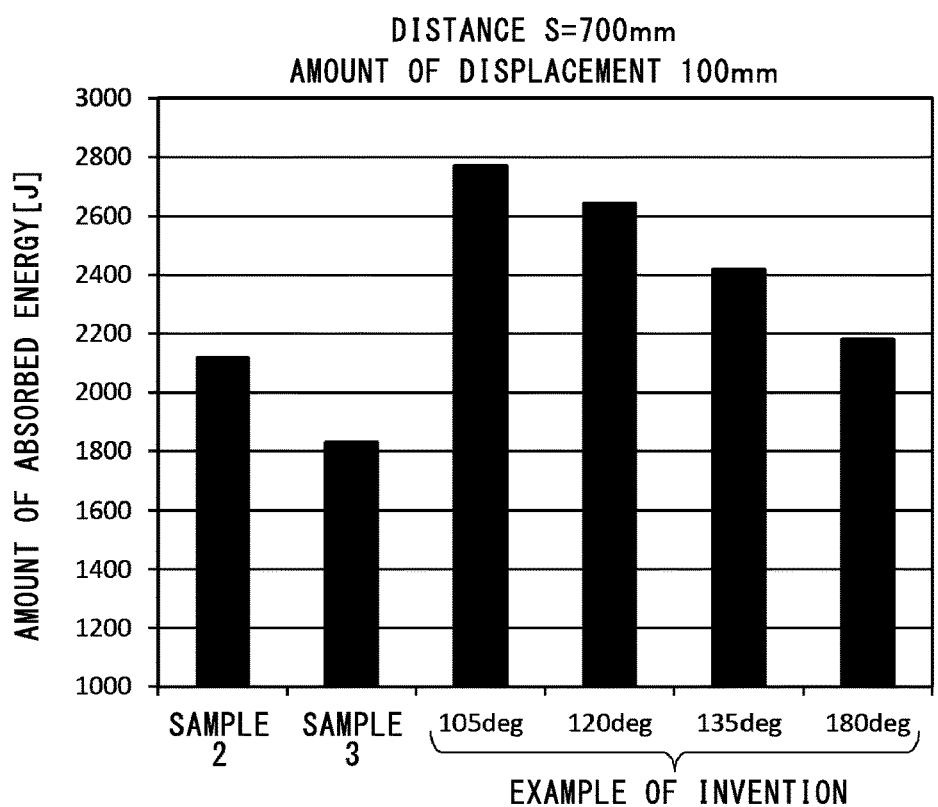
FIG. 20B is a graph schematically showing another example of the amount of absorbed energy of each sample in the simulation of Example 2.

The result in the case where the fulcrum-to-fulcrum distance S is 400 mm is shown in FIG. 20A. The result in the case where the fulcrum-to-fulcrum distance S is 700 mm is shown in FIG. 20B. In the simulation of Example 2, cracking in the steel sheet and cracking in the spot-welding portion are not considered.

Figure 21A:
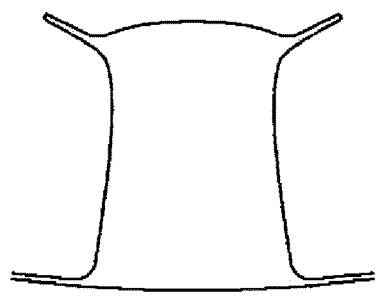
FIG. 21A is a cross-sectional view schematically showing an example of a shape change in the sample in the simulation of Example 2.
Figure 21B:
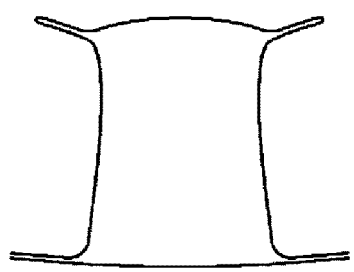
FIG. 21B is a cross-sectional view schematically showing another example of a shape change in the sample in the simulation of Example 2.
Figure 22A:
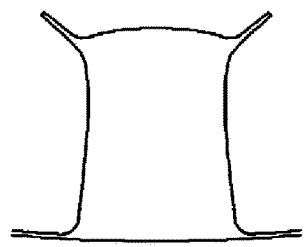
FIG. 22A is a cross-sectional view schematically showing another example of a shape change in the sample in the simulation of Example 2.
Figure 22B:
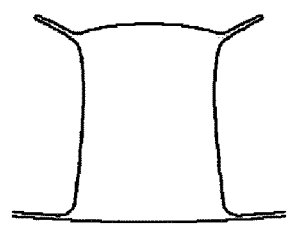
FIG. 22B is a cross-sectional view schematically showing another example of a shape change in the sample in the simulation of Example 2.

The simulation results of cross-sectional shapes when the fulcrum-to-fulcrum distance S is 400 mm and the amount of displacement is 10 mm in each of the samples having an angle X of 105° and 120° are shown in FIGS. 21A and 21B. Furthermore, the simulation results of cross-sectional shapes when the fulcrum-to-fulcrum distance S is 700 mm and the amount of displacement is 10 mm in each of the samples having an angle X of 105° and 120° are shown in FIGS. 22A and 22B.

As shown in FIGS. 20A and 20B, even when the angle X was changed, the sample according to the present invention exhibited better characteristics than the sample 3 having the positive hat arrangement. As shown in FIG. 20A, in the case where the fulcrum-to-fulcrum distance S was 400 mm, the larger the angle X, the larger the amount of absorbed energy. On the other hand, as shown in FIG. 20B, in the case where the fulcrum-to-fulcrum distance S was 700 mm, the smaller the angle X, the larger the amount of absorbed energy.

Example 3

In Example 3, the relationship between the martensite fraction and the Vickers hardness of the protrusion portion was investigated.

The martensite fraction was measured in the vicinity of the center position of the protrusion portion in a cross section perpendicular to the longitudinal direction in the steel sheet extending from the top sheet portion, that is, in the vicinity of the position of half the length of the protrusion portion. At the center position of the protrusion portion, from a sheet surface of the steel sheet positioned inside the hot-stamping formed article (sheet surface positioned on the steel sheet side extending from the standing wall portion), along the sheet thickness direction of the steel sheet, the position of a ¼ distance (t/4) of the sheet thickness t of the steel sheet was used as a measurement position.

The measurement position may have a range to some extent, and from the measurement position, along the sheet thickness direction of the steel sheet, in each of a sheet surface direction inside the hot-stamping formed article and a sheet surface direction outside the hot-stamping formed article, the range to a ⅛ distance of the sheet thickness t (t/8) of the steel sheet may be used as a measurement range.

The Vickers hardness (MHv) at the protrusion portion was also measured in the vicinity of the center position of the protrusion portion in a cross section perpendicular to the longitudinal direction in the steel sheet extending from the top sheet portion, that is, in the vicinity of the position of half the length of the protrusion portion. Similarly to the measurement of the martensite fraction, at the center position of the protrusion portion, from the sheet surface of the steel sheet positioned inside the hot-stamping formed article (sheet surface positioned on the steel sheet side extending from the standing wall portion), along the sheet thickness direction of the steel sheet, the position of the ¼ distance (t/4) of the sheet thickness t of the steel sheet was used as a measurement position.

Regarding the Vickers hardness (MHv), the range to the ⅛ distance (t/8) of the sheet thickness t of the steel sheet along the sheet thickness direction of the steel sheet in each of the sheet surface direction inside the hot-stamping formed article and the sheet surface direction outside the hot-stamping formed article may also be used as a measurement range.

At the measurement position, the martensite fraction and the Vickers hardness (MHv) of the protrusion portion were measured. The steel sheet to be tested is a 1500 MPa grade hot-stamping formed article. A cross section as the measurement object was a cross section passing through the center in the longitudinal direction of the hot-stamping formed article.

The martensite fraction was read from a photograph of the metallographic structure in the above cross section.

For the Vickers hardness (MHv), a Vickers test specified in JIS Z 2244 was conducted on the cross section perpendicular to the longitudinal direction. A load of the Vickers test was set to 1 kgf. In the measurement position, the Vickers hardnesses of five different points were measured.

The measurement results of the martensite fraction and the Vickers hardness (MHv) of the protrusion portion are shown in Table 2.

No. 1 is an experimental example in which the top sheet portion equivalent portion of the steel sheet was in contact with the die. No. 2 is an experimental example in which hot stamping was performed while the state where the top sheet portion equivalent portion of the steel sheet was not in contact with the die was maintained. No. 3 is an experimental example in which the top sheet portion equivalent portion of the steel sheet was not in contact with the die and the forming procedure was changed depending on the angle X. In No. 3, in a case where the angle X between the protrusion portion and the top sheet portion was equal to or larger than 135° and equal to or smaller than 180°, after the standing wall portions were formed by the cam dies, the top sheet portion was formed by the press die, and in a case where the angle X between the protrusion portion and the top sheet portion was larger than 95° and equal to or smaller than 135°, after the top sheet portion was formed by the press die, the standing wall portions were formed by the cam dies.

TABLE 2

| Number | | Martensite fraction (%) | Vickers hardness MHv | MHv/WHv |
|---|---|---|---|---|
| 1 | Experimental example in which the top sheet portion equivalent portion of the steel sheet was in contact with the die | 80 | 420 | 0.91 |
| 2 | Experimental example in which the state where the top sheet portion equivalent portion of the steel sheet was not in contact with the die was maintained | 90 | 460 | 1.01 |
| 3 | Experimental example in which the top sheet portion equivalent portion of the steel sheet was not in contact with the die and the forming procedure was changed depending on the angle X | 95 | 480 | 1.05 |

In addition, Table 2 shows the ratio (MHv/WHv) of the Vickers hardness (MHv) in the protrusion portion to the Vickers hardness (WHv) in the standing wall portion. The Vickers hardness (WHv) in the standing wall portion was measured similarly in the same cross section as for the Vickers hardness (MHv) in the protrusion portion. In addition, this measurement was performed in the vicinity of the center position of the standing wall portion, that is, in the vicinity of the position of half the height of the standing wall portion.

As shown in Table 2, in the hot-stamping formed articles according to the present invention (experimental examples of Nos. 2 and 3), the martensite fraction is 90% or more, and the Vickers hardness (MHv) in the protrusion portion is 460 or more. In addition, the ratio (MHv/WHv) of the Vickers hardness (MHv) in the protrusion portion to the Vickers hardness (WHAT) in the standing wall portion is 1.01 or more.

In the hot-stamping formed article according to the present invention, since the martensite fraction of the protrusion portion is 90% or more, the protrusion portion can obtain a predetermined hardness. It can be seen that the hardness of the protrusion portion is equal to or higher than the hardness of the standing wall portion in the same cross section of the hot-stamping formed article.

INDUSTRIAL APPLICABILITY

The present invention can be used as a hot-stamping formed article, a structural member using the same, and a manufacturing method of a hot-stamping formed article.

BRIEF DESCRIPTION OF THE REFERENCE SYMBOLS

10: press die
11: upper die (press die)
12: lower die (press die)
40c, 40d: pressing apparatus
100: press-formed article
101, 101a, 101b: steel sheet
111: standing wall portion
112: top sheet portion
113: flange portion
114: boundary portion
114p: boundary point
115: protrusion portion
115d: overlapping portion 200a, 200b, 200c: structural member (vehicle component)
201: back sheet (steel sheet member)
301: preliminary formed article (deformed steel sheet)
301at: top sheet portion equivalent portion
301aw: standing wall portion equivalent portion
301ae: protrusion portion equivalent portion
310: deformed steel sheet
D: protruding length from boundary portion in length of protrusion portion
X: angle between top sheet portion and overlapping portion

The invention claimed is:

1. A hot-stamping formed article which is long and formed of a single steel sheet, the hot-stamping formed article comprising:
   two standing wall portions;
   a top sheet portion adjacent to the two standing wall portions; and
   a protrusion portion including an overlapping portion in which a portion of the steel sheet extending from at least one standing wall portion of the two standing wall portions and a portion of the steel sheet extending from the top sheet portion overlap,
   wherein an angle between the top sheet portion and the protrusion portion in a case where a plane perpendicular to a longitudinal direction of the hot-stamping formed article is viewed in a cross section is larger than 90°, and
   wherein the portion of the steel sheet extending from the standing wall portion and the portion of the steel sheet extending from the top sheet portion are in close contact with each other in the protrusion portion.

2. The hot-stamping formed article according to claim 1, wherein an angle between the top sheet portion and the overlapping portion when viewed in the cross section is larger than 90° and equal to or less than 180°.

3. The hot-stamping formed article according to claim 1, wherein a length from a boundary point where lines extending from the standing wall portion and the top sheet portion intersect to a tip end portion of the protrusion portion when viewed in the cross section is 3 mm or more.

4. The hot-stamping formed article according to claim 1, wherein the steel sheet extending from the standing wall portion and the steel sheet extending from the top sheet portion are joined to each other in the protrusion portion.

5. The hot-stamping formed article according to claim 1, further comprising:
   two flange portions extending from end portions of the two standing wall portions.

* * * * *